United States Patent
Babaei

(10) Patent No.: US 11,418,292 B2
(45) Date of Patent: Aug. 16, 2022

(54) WIRELESS DEVICE AND WIRELESS NETWORK PROCESSES FOR FEEDBACK ENHANCEMENT

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

(*) Notice: Subject to any disclaimer, the term of this patent is extended or adjusted under 35 U.S.C. 154(b) by 0 days.

(21) Appl. No.: 17/492,945

(22) Filed: Oct. 4, 2021

(65) Prior Publication Data

US 2022/0109528 A1  Apr. 7, 2022

Related U.S. Application Data

(60) Provisional application No. 63/087,266, filed on Oct. 4, 2020.

(51) Int. Cl.
 *H04L 1/18* (2006.01)
 *H04W 72/04* (2009.01)

(52) U.S. Cl.
 CPC ........... *H04L 1/1812* (2013.01); *H04W 72/04* (2013.01)

(58) Field of Classification Search
 CPC . H04L 1/1812; H04L 41/0803; H04L 5/0055; H04L 4/0896; H04L 1/1819; H04L 1/1896; H04L 49/25; H04L 47/50; H04L 1/1887; H04W 72/042; H04W 72/0413; H04W 72/0453; H04W 24/08; H04W 72/1263; H04W 72/1289; H04W 72/1257; H04W 72/0446; H04W 84/08; H04W 72/04

See application file for complete search history.

(56) References Cited

U.S. PATENT DOCUMENTS

| | | | |
|---|---|---|---|
| 11,122,622 B2* | 9/2021 | Hosseini | H04W 74/0825 |
| 2020/0228173 A1* | 7/2020 | Ye | H04W 72/0413 |
| 2021/0153204 A1* | 5/2021 | Takeda | H04L 5/0055 |
| 2021/0234640 A1* | 7/2021 | Cirik | H04L 1/1819 |
| 2021/0359796 A1* | 11/2021 | Zhang | H04L 1/1812 |
| 2022/0029748 A1* | 1/2022 | Fu | H04L 1/1887 |

OTHER PUBLICATIONS

3GPP TS 38.211 V16.3.0 (Sep. 2020); Technical Specification; 3rd Generation Partnership Project; Technical Specification Group Radio Access Network; NR; Physical channels and modulation; (Release 16).

(Continued)

*Primary Examiner* — Hanh N Nguyen
(74) *Attorney, Agent, or Firm* — Alireza Babaei

(57) ABSTRACT

A wireless device may receive a first TB and second TB(s). A first HARQ feedback, associated with the first TB, may be deferred from an initial timing to a first timing. Second HARQ feedback(s), associated with the second TB(s), may be scheduled for initial transmission in the first timing. The wireless device may transmit a HARQ feedback codebook in the first timing. The HARQ feedback codebook may comprise the first HARQ feedback and the second HARQ feedback(s). Based on the first HARQ feedback being deferred, a first position of the first HARQ feedback in the HARQ feedback codebook may be after second position(s) of the second HARQ feedback(s) in the HARQ feedback codebook.

34 Claims, 32 Drawing Sheets

(56) References Cited

OTHER PUBLICATIONS

3GPP TS 38.212 V16.3.0 (Sep. 2020); Technical Specification; 3rd Generation Partnership Project; Technical Specification Group Radio Access Network; NR; Multiplexing and channel coding; (Release 16).
3GPP TS 38.213 V16.3.0 (Sep. 2020); Technical Specification; 3rd Generation Partnership Project Technical Specification Group Radio Access Network; NR; Physical layer procedures for control; (Release 16).
3GPP TS 38.214 V16.3.0 (Sep. 2020); Technical Specification; 3rd Generation Partnership Project; Technical Specification Group Radio Access Network; NR; Physical layer procedures for data; (Release 16).
3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).
3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).
3GPP TS 38.331 V16.1.0 (Jul. 2020); Technical Specification; 3rd Generation Partnership Project; Technical Specification Group Radio Access Network; NR; Radio Resource Control (RRC); Protocol specification; (Release 16).
3GPP TSG RAN WG1 Meeting #102-e; R1-2005243; E-meeting, Aug. 17-28, 2020; Agenda Item: 8.3.1.1; Source Huawei, HiSilicon; Title: UE feedback enhancements for HARQ-ACK; Document for: Discussion and Decision.
3GPP TSG RAN WG1#102-e; R1-2005374; e-Meeting, Aug. 17-28, 2020; Source: vivo; Title: HARQ-ACK enhancements for Rel-17 URLLC; Agenda Item: 8.3.1.1; Document for: Discussion and Decision.
3GPP TSG RAN WG1 Meeting #102-e; R1-2005431; e-Meeting, Aug. 17-28, 2020; Source: ZTE; Title: Discussion on HARQ-ACK enhancements for eURLLC; Agenda item: 8.3.1.1; Document for: Discussion and Decision.
3GPP TSG-RAN WG1 Meeting #102-e; R1-2005513; e-Meeting, Aug. 17-28, 2020; Agenda Item: 8.3.1.1; Source: Ericsson; Title: HARQ-ACK Enhancements for IIoT/URLLC; Document for: Discussion, Decision.
3GPP TSG RAN WG1 #102-e; R1-2005569; e-Meeting, Aug. 17-28, 2020; Agenda Item: 8.3.1.1; Source Sony; Title: HARQ-ACK enhancement to reduce retransmission time; Document for: Discussion / decision.
3GPP TSG RAN WG1 Meeting #102-e; R1-2005633; e-Meeting, Aug. 17-Aug. 28, 2020; Agenda Item 8.3.1.1; Source: MediaTek Inc.; Title: On UE feedback enhancements for HARQ-ACK; Document for: Discussion and Decision.
3GPP TSG RAN WG1 #102-e; R1-2005701; e-Meeting, Aug. 17-28, 2020; Source: CATT; Title: UE feedback anhancements for HARQ-ACK; Agenda Item: 8.3.1.1; Document for: Discussion and Decision.
3GPP TSG RAN WG1 #102-e; R1-2005760; e-Meeting, Aug. 17-28, 2020; Source: NEC; Title: Enhancements an URLLC HARQ-ACK feedback; Agenda Item: 8.3.1.1; Document for: Discussion and Decision.
3GPP TSG RAN WG1 #102-e; R1-2005869; e-Meeting, Aug. 17-28, 2020; Source: Intel Corporation; Title: UE HARQ feedback enhancements in Release 17 URLLC/IIoT; Agenda item: 8.3.1.1; Document for: Discussion and Decision.
3GPP TSG RAN WG1 Meeting #102-e; R1-2005929; e-Meeting, Aug. 17-28, 2020; Agenda item: 8.3.1.1; Source: Lenovo, Motorola Mobility; Title: HARQ-ACK feedback enhancement for IIoT/URLLC; Document for: Discussion.
3GPP TSG RAN WG1 Meeting #102-e; R1-2005967; e-Meeting, Aug. 17-28, 2020; Agenda Item: 8.3.1.1; Source: TCL Communication; Title: UE feedback enhancements for HARQ-ACK; Document for: Discussion and decision.
3GPP TSG RAN WG1 #102-e; R1-2006058; e-Meeting, Aug. 17-28, 2020; Source: OPPO; Title: HARQ-ACK anhancements for Rel-17 URLLC/IIoT; Agenda Item: 8.3.1.1; Document for: Discussion and Decision.
3GPP TSG RAN WG1 #102-e; R1-2006070; e-Meeting, Aug. 17-28, 2020; Agenda Item: 8.3.1.1; Source InterDigital, Inc.; Title: UE HARQ-ACK Feedback enhancements; Document for: Discussion and Decision.
3GPP TSG RAN WG1 #102-e; R1-2006139; e-Meeting, Aug. 17-28, 2020; Agenda Item: 8.3.1.1; Source Samsung; Title: HARQ-ACK feedback enhancements for Rel-17 URLLC/IIoT; Document for: Discussion and decision.
3GPP TSG RAN WG1 #102-e; R1-2006207; e-Meeting, Aug. 17-28, 2020; Agenda item: 8.3.1.1; Title: Discussion on UE feedback enhancements for HARQ-ACK; Source: CMCC; Document for: Discussion and Decision.
3GPP TSG RAN WG1 #102-e; R1-2006252; e-Meeting, Aug. 17-28, 2020; Agenda item: 8.3.1.1; Source Spreadtrum Communications; Title: Discussion on necessity and support of Physical Layer feedback enhancements; Document for: Discussion and decision.
3GPP TSG RAN WG1 #102-e; R1-2006314; e-Meeting, Aug. 17-28, 2020; Agenda Item: 8.3.1.1; Source: LG Electronics; Title: Discussion on UE feedback enhancement for HARQ-ACK; Document for: Discussion and decision.
3GPP TSG RAN WG1 Meeting #102-e; R1-2006339; e-Meeting, Aug. 17-28, 2020; Agenda item: 8.3.1.1; Source: Nokia, Nokia Shanghai Bell; Title: On the necessity and support of Rel-17 URLLC HARQ-ACK feedback enhancements; Document for: Discussion and Decision.
3GPP TSG RAN WG1 #102-e; R1-2006342; e-Meeting, Aug. 17-28, 2020; Source: Panasonic; Title: Discussion on UE feedback enhancements for HARQ-ACK; Agenda Item: 8.3.1.1; Document for: Discussion.
3GPP TSG RAN WG1 #102; R1-2006514; e-Meeting, Aug. 17-28, 2020; Agenda Item: 8.3.1.1; Source: Apple Inc.; Title: UE feedback enhancements for HARQ-ACK; Document for: Discussion/Decision.
3GPP TSG RAN WG1#102-e; R1-2006572; eMeeting, Aug. 17-28, 2020; Source: Sharp; Title: UE feedback enhancements for HARQ-ACK; Agenda Item: 8.3.1.1; Document for: Discussion and Decision.
3GPP TSG-RAN WG1 Meeting #102-e; R1-2006639; e-Meeting, Aug. 17-28, 2020; Source: Asia Pacific Telecom; Title: Discussion on HARQ-ACK enhancements; Agenda item: 8.3.1.1; Document for: Discussion and Decision.
3GPP TSG RAN WG1 #102-e; R1-2006728; e-Meeting, Aug. 17-28, 2020; Source: NTT Docomo, Inc.; Title Discussion on HARQ-ACK feedback enhancements for Rel.17 URLLC; Agenda Item: 8.3.1.1; Document for: Discussion and Decision.
3GPP TSG RAN WG1 #102-e; R1-2006799; e-Meeting, Aug. 17-28, 2020; Agenda item: 8.3.1.1; Source Qualcomm Incorporated; Title: HARQ-ACK enhancement for IOT and URLLC; Document for: Discussion/Decision.
3GPP TSG RAN WG1 #102-e; R1-2006887; e-Meeting, Aug. 17-28, 2020; Source: WILUS Inc.; Title: Discussion on HARQ-ACK enhancement for IIoT/URLLC; Agenda item: 8.3.1.1; Document for: Discussion/Decision.
3GPP TSG RAN WG1 #102-e; R1-2006899; e-Meeting, Aug. 17-28, 2020; Agenda Item: 8.3.1.1; Source Google, Inc.; Title: HARQ enhancement for SPS; Document for: Discussion and decision.
3GPP TSG RAN Meeting #86; RP-193233; Sitges, Spain, Dec. 9-12, 2019; Source: Nokia, Nokia Shanghai Bell; Title: New WID on enhanced Industrial Internet of Things (IoT) and URLLC support; Document for: Approval; Agenda Item: 9.1.2.
3GPP TSG RAN Meeting #88e; RR-201310; Electronic meeting, Jun. 29-Jul. 3, 2020; Revision of RP-193233; Source: Nokia, Nokia Shanghai Bell; Title: Revised WID: Enhanced Industrial Internet of

(56) References Cited

OTHER PUBLICATIONS

Things (IoT) and ultra-reliable and low latency communication (URLLC) support for NR; Document for: Approval; Agenda Item: 9.10.5.

* cited by examiner

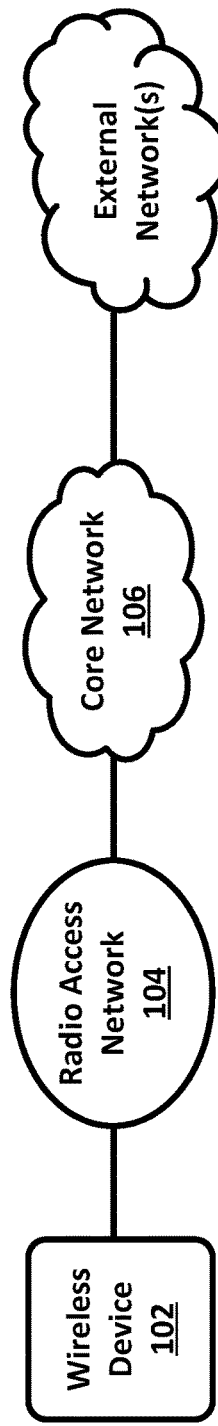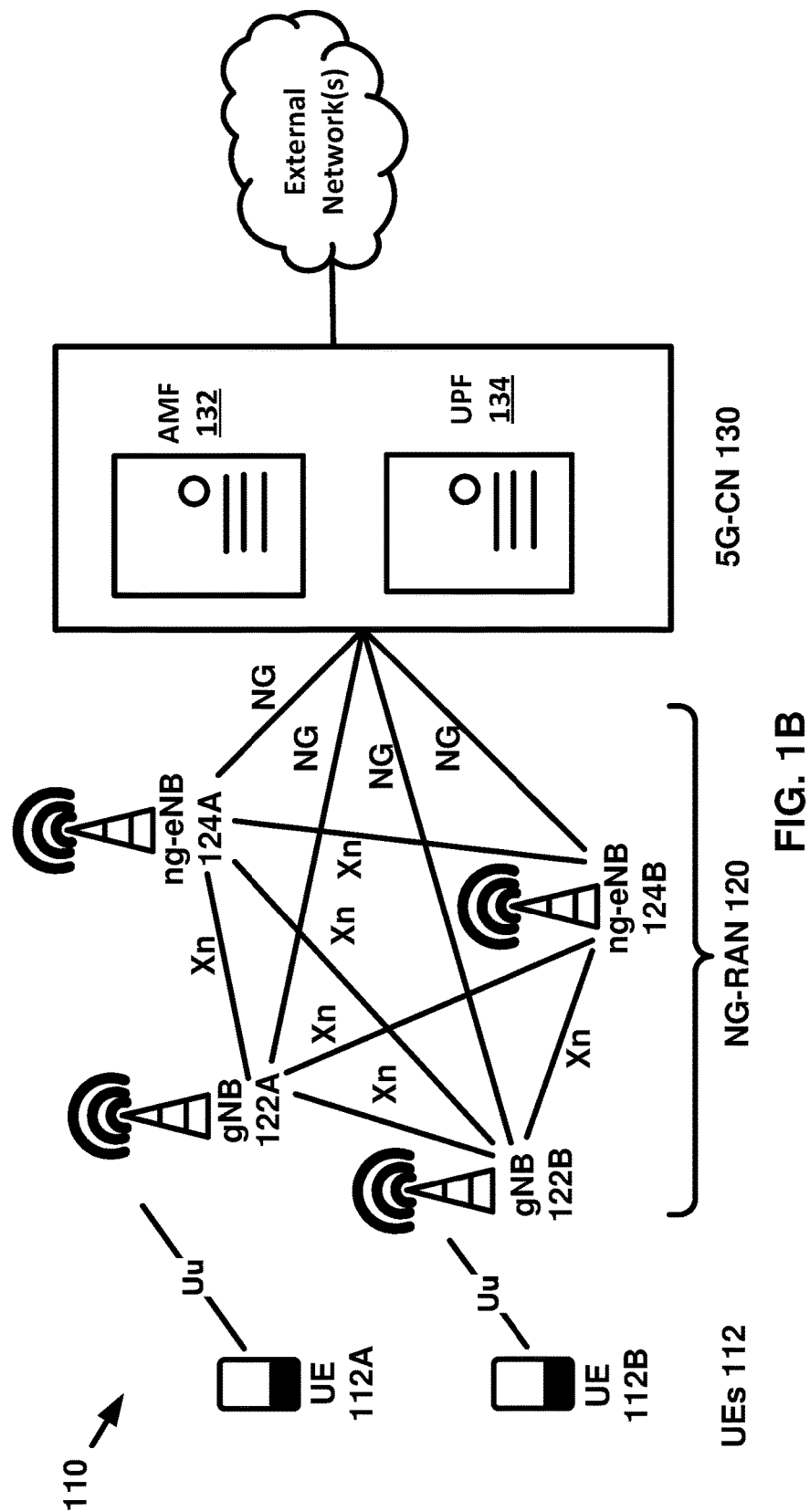

```
PDSCH-ServingCellConfig ::=    SEQUENCE {
    ...,
    pucch-Cell                 SEQUENCE (SIZE (1..4)) OF ServCellIndex    -- Cond SCellAddOnly
    ...,
}
```

FIG. 17

WIRELESS DEVICE AND WIRELESS NETWORK PROCESSES FOR FEEDBACK ENHANCEMENT

CROSS-REFERENCE TO RELATED APPLICATIONS

This application claims the benefit of U.S. Provisional Application No. 63/087,266, filed Oct. 4, 2020, which is hereby incorporated by reference in its entirety.

BRIEF DESCRIPTION OF THE DRAWINGS

FIG. 1A and FIG. 1B show examples of mobile communications systems in accordance with several of various embodiments of the present disclosure.

FIG. 17 shows an example information element in accordance with several of various embodiments of the present disclosure.

DETAILED DESCRIPTION

Figure 2A:
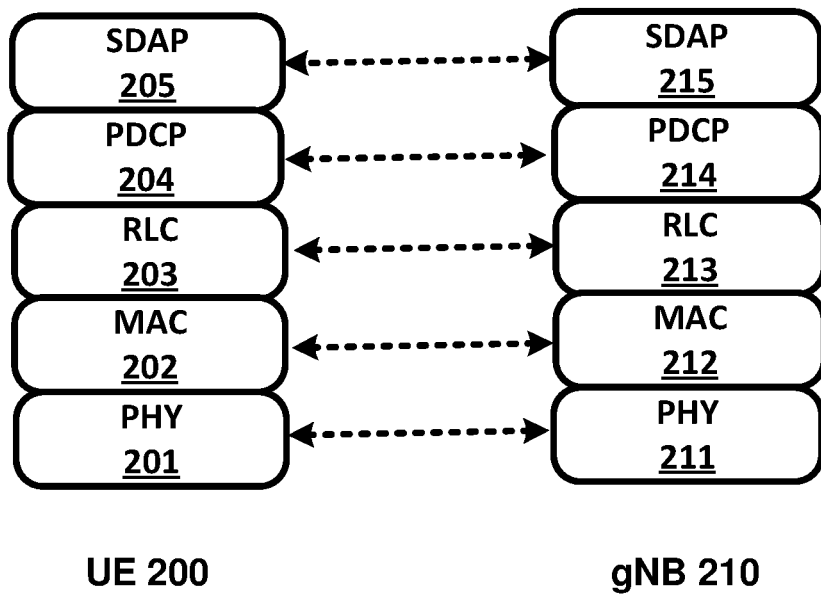
FIG. 2A and FIG. 2B show examples of user plane and control plane protocol layers in accordance with several of various embodiments of the present disclosure.

The exemplary embodiments of the disclosed technology enable processes for a wireless device and/or one or more base stations for feedback enhancement. The exemplary disclosed embodiments may be implemented in the technical field of wireless communication systems. More particularly, the embodiments of the disclosed technology may relate to enhancement of hybrid automatic repeat request (HARQ) feedback and related processes.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
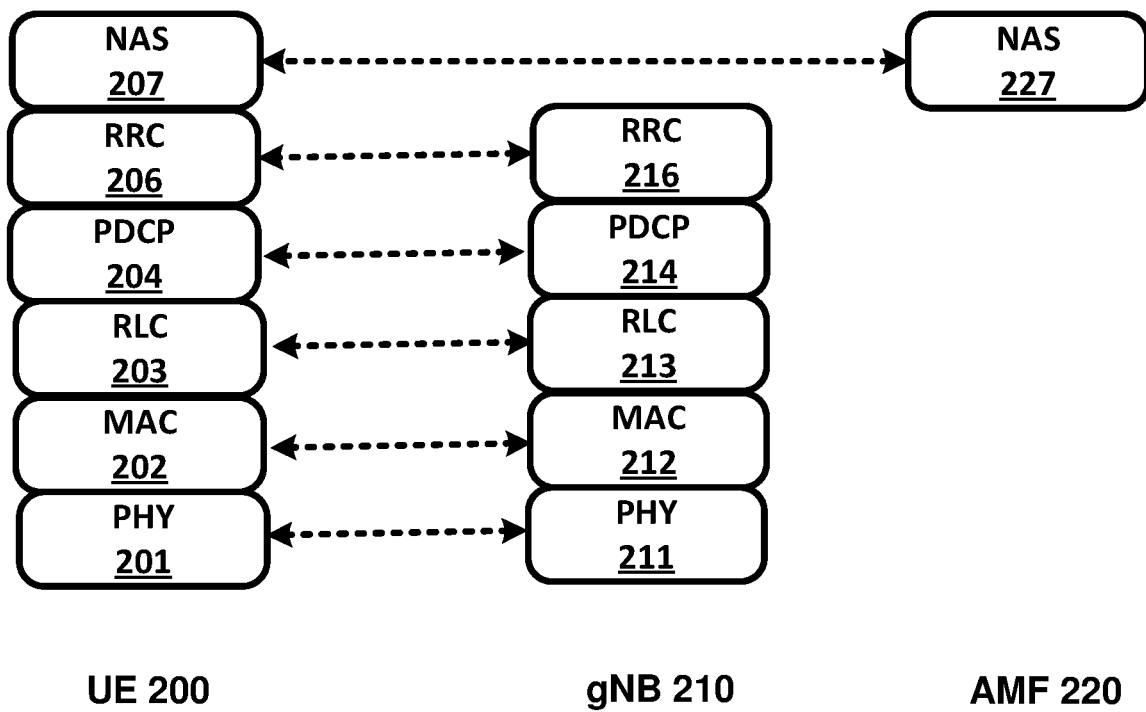

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
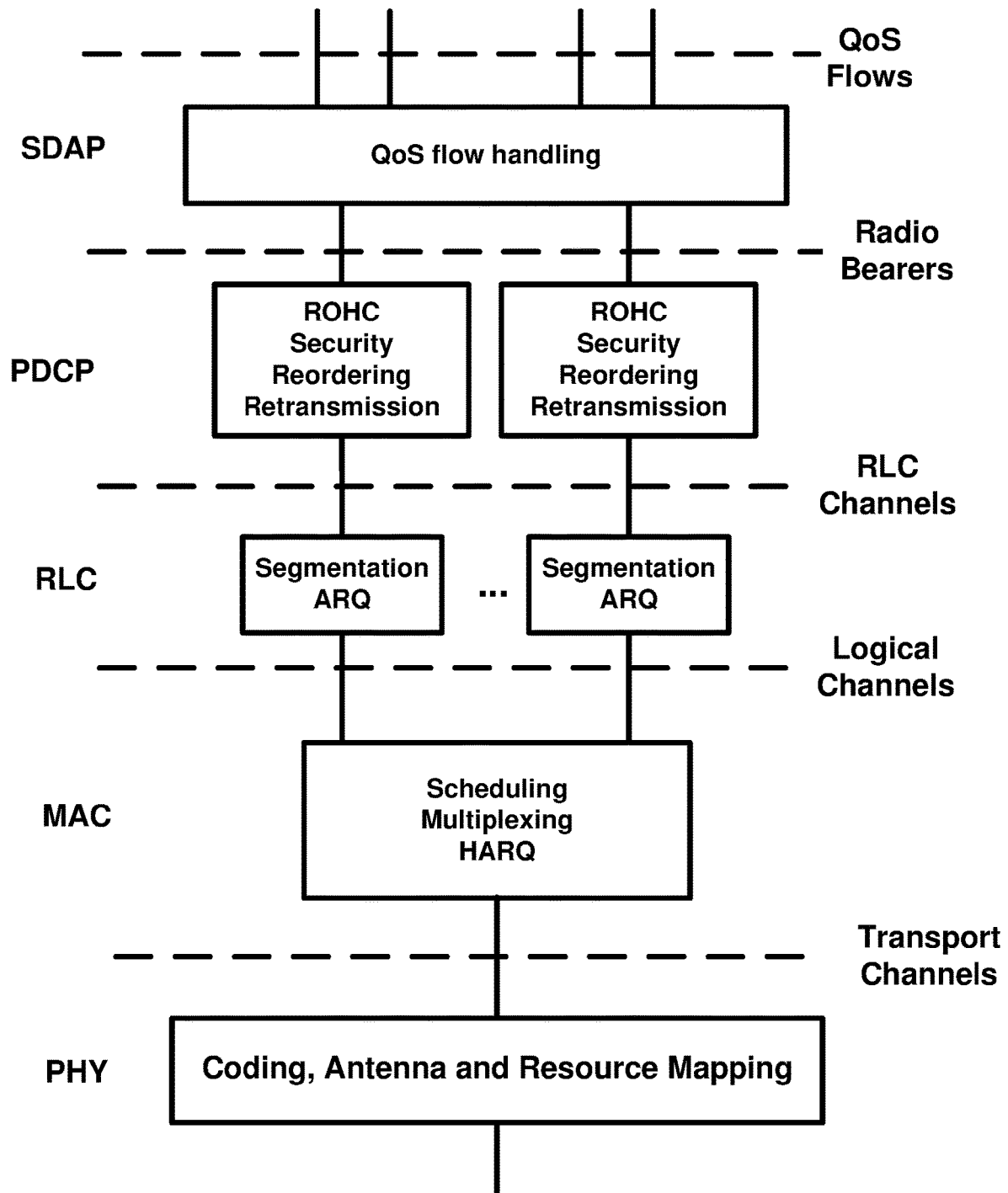
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARM), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
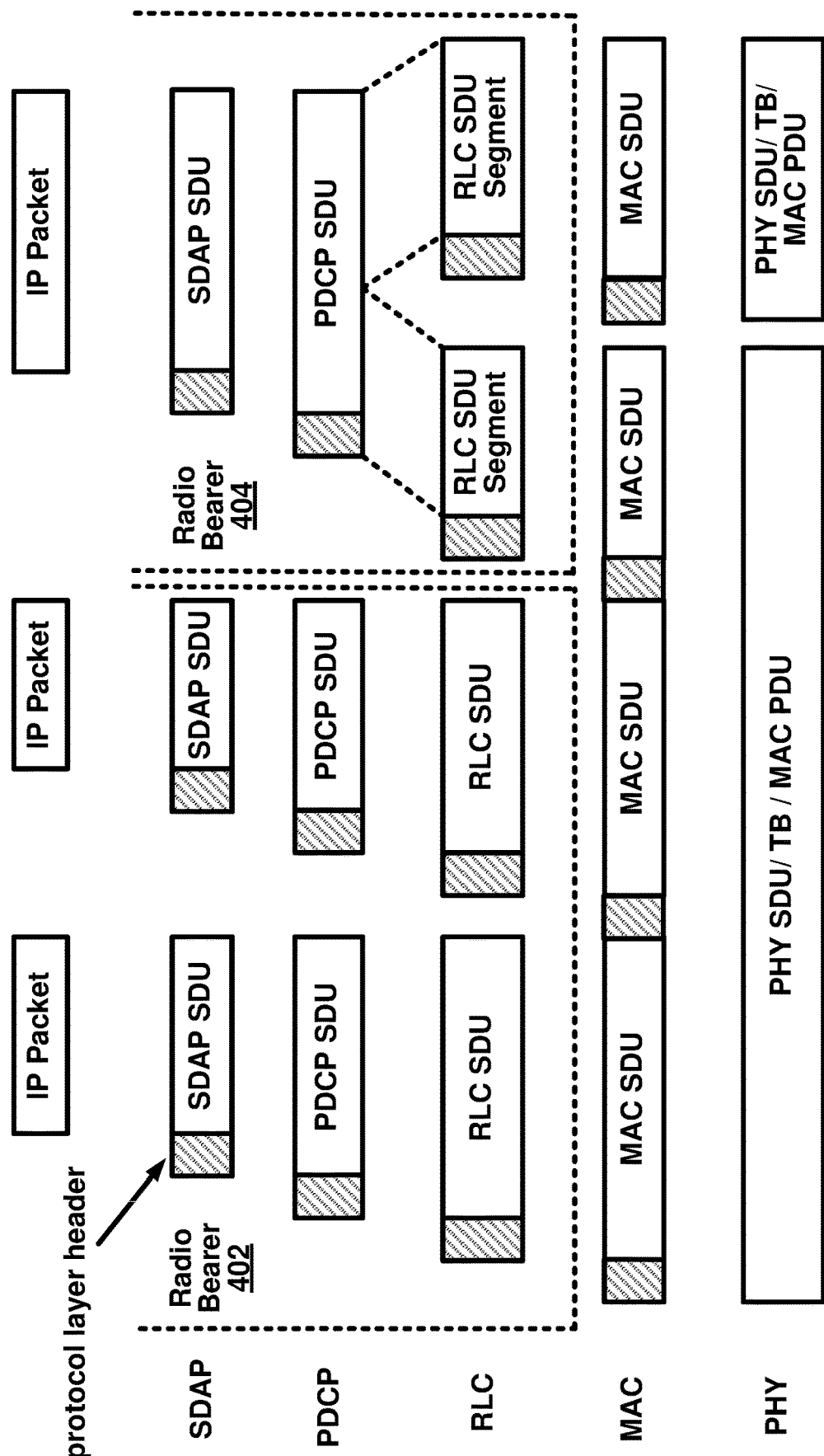
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
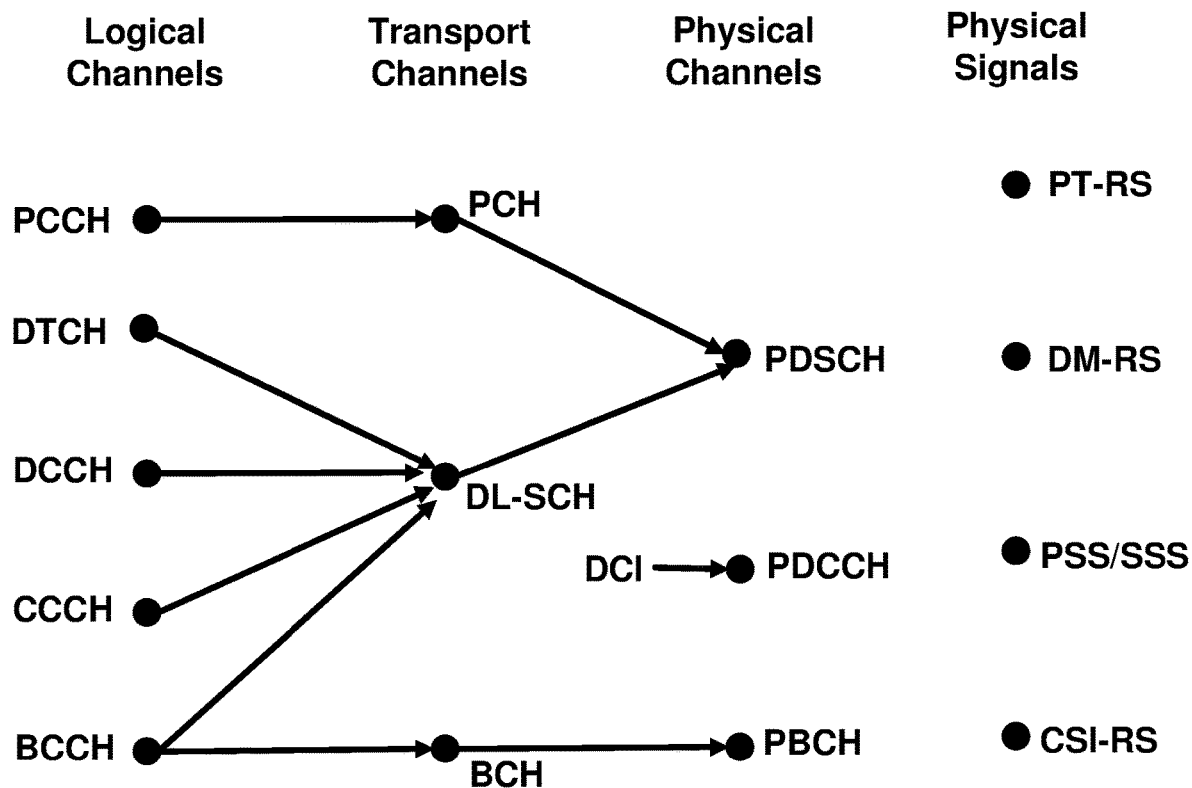
FIG. 5A shows example mapping of channels between layers of the protocol stack and different physical signals in downlink in accordance with several of various embodiments of the present disclosure.
Figure 5B:
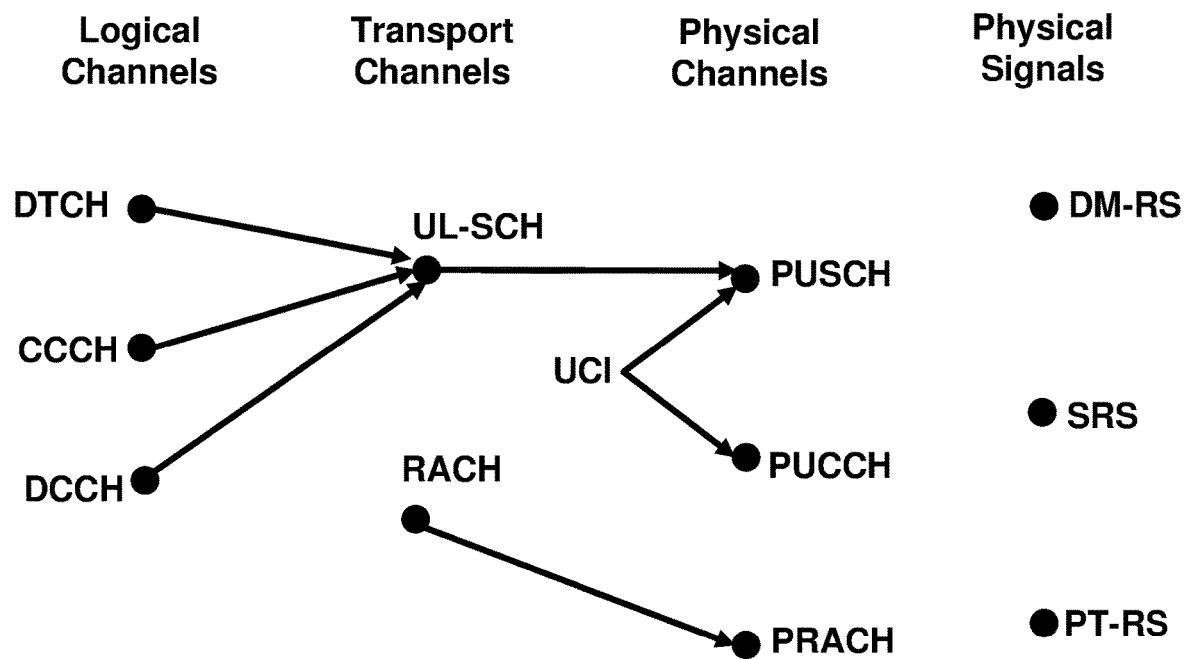
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
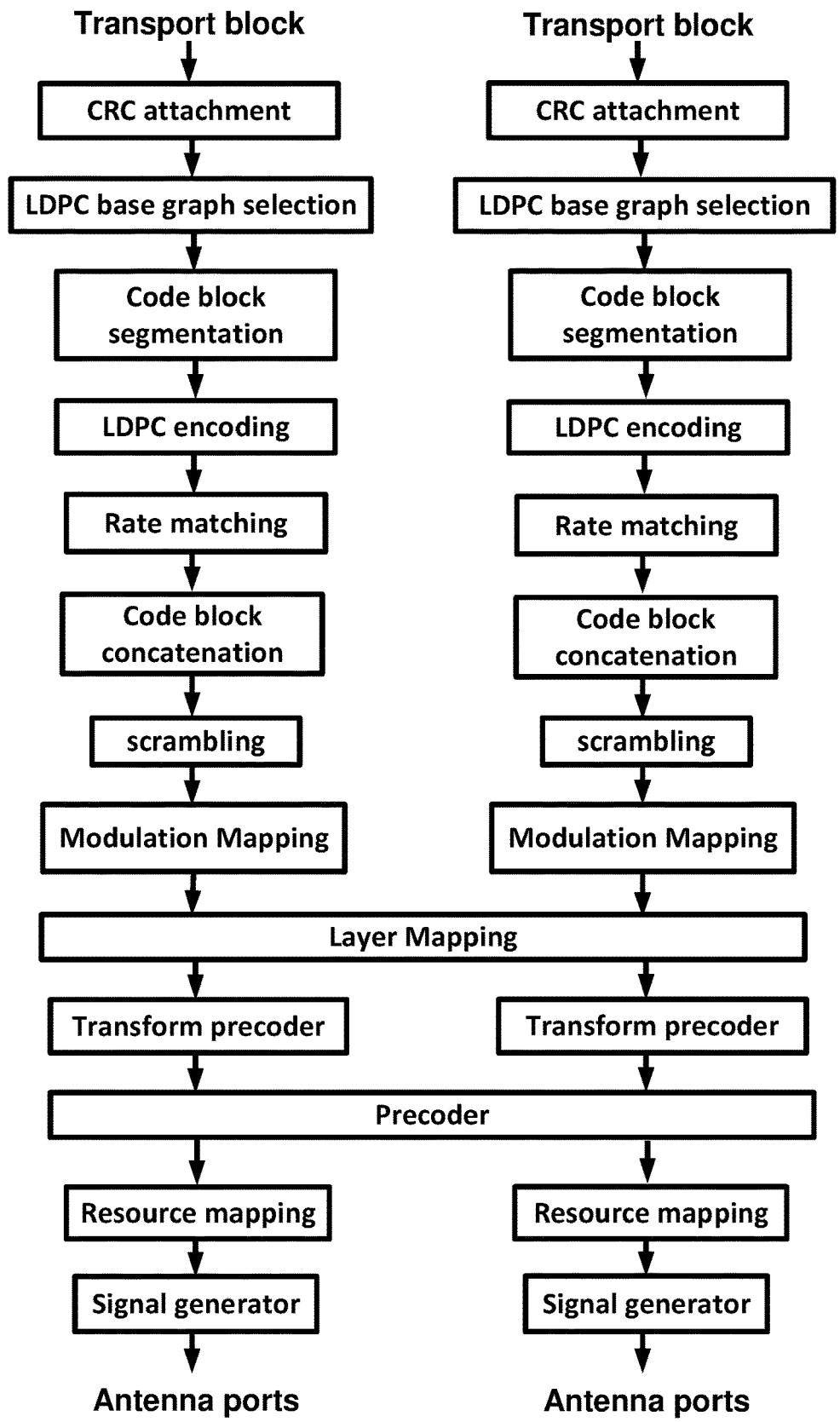
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
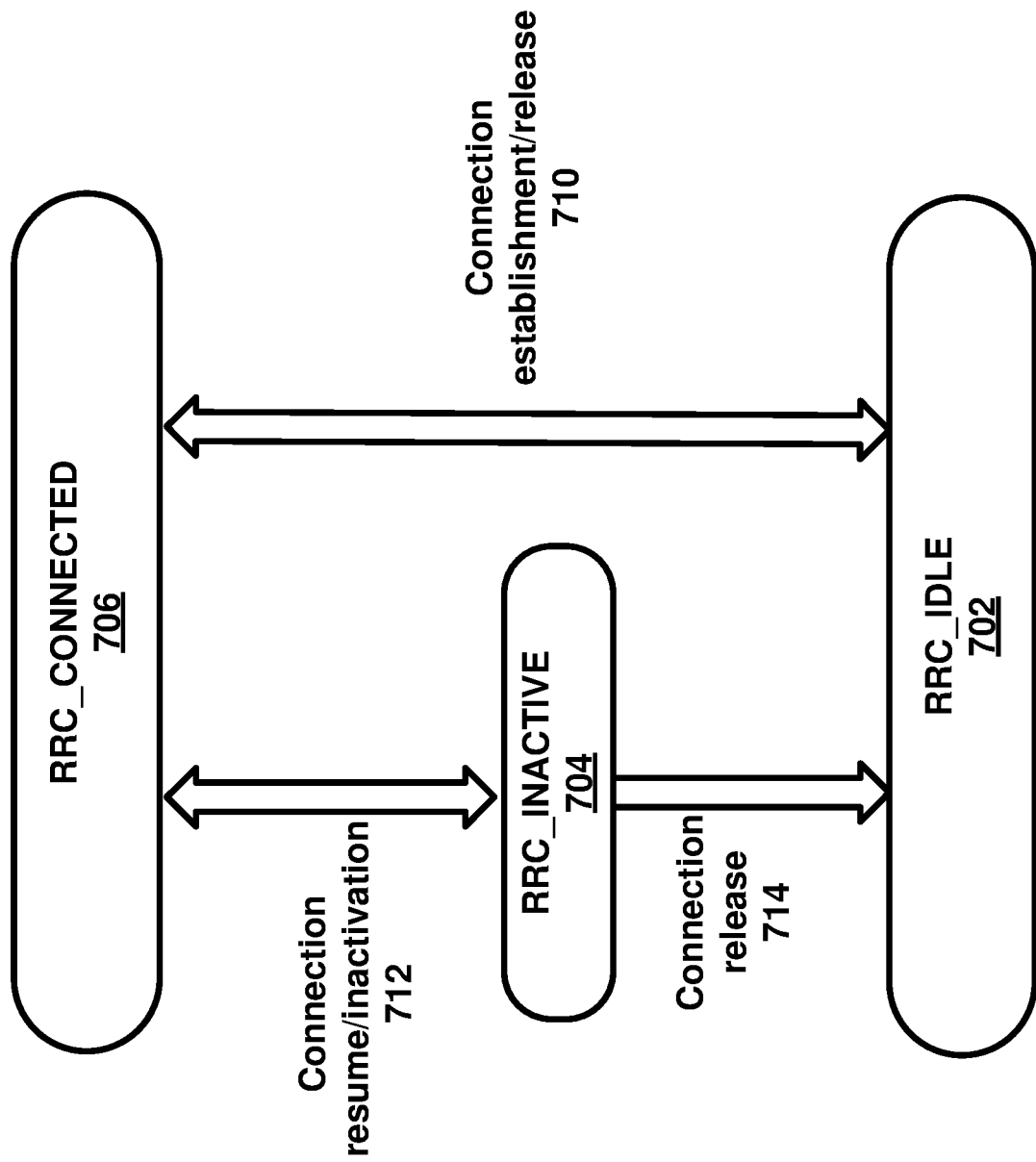
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), $\pi/2$-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the $\mu$ value).

Figure 8:
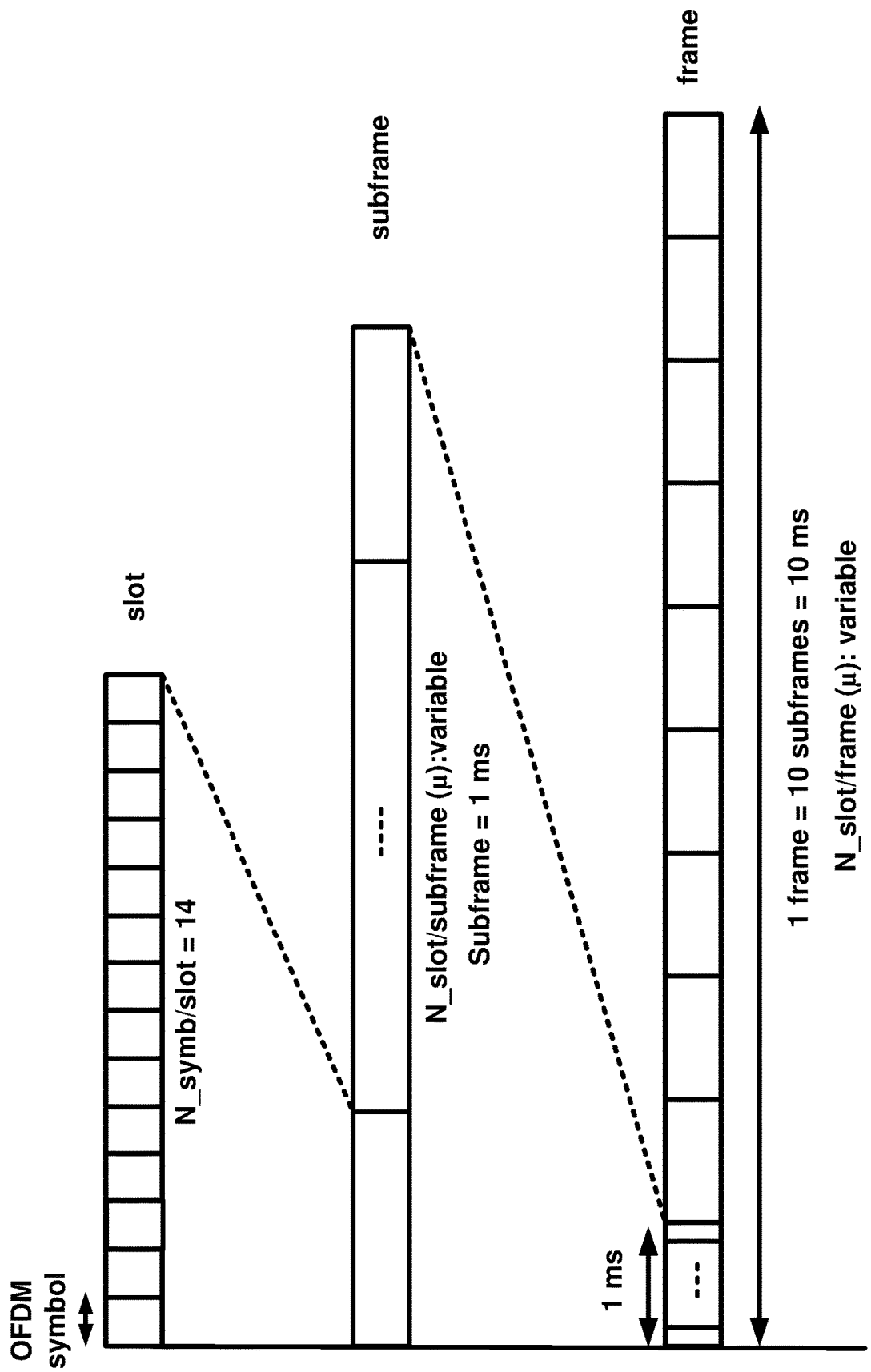
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of $\mu$ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
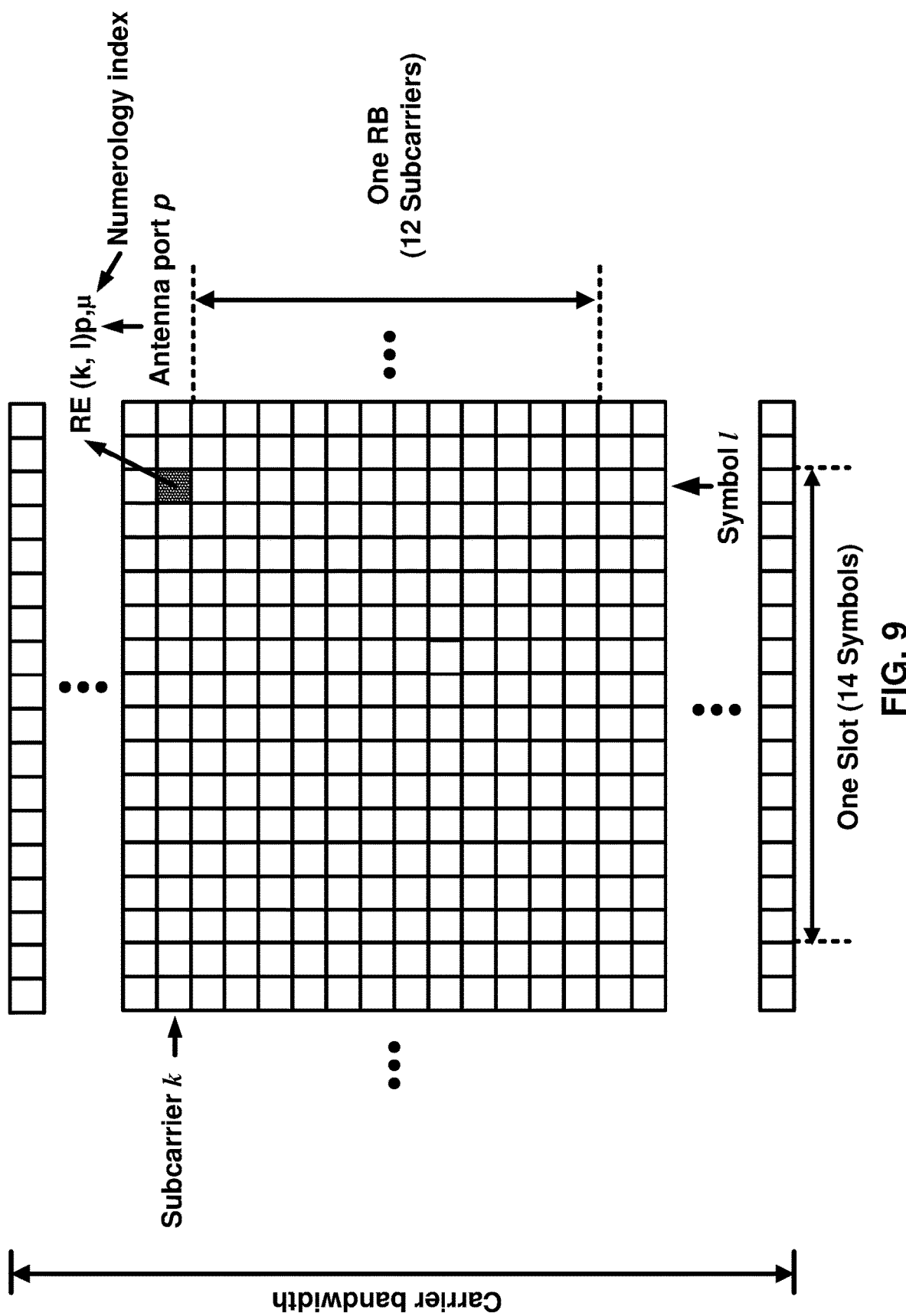
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration $\mu$ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
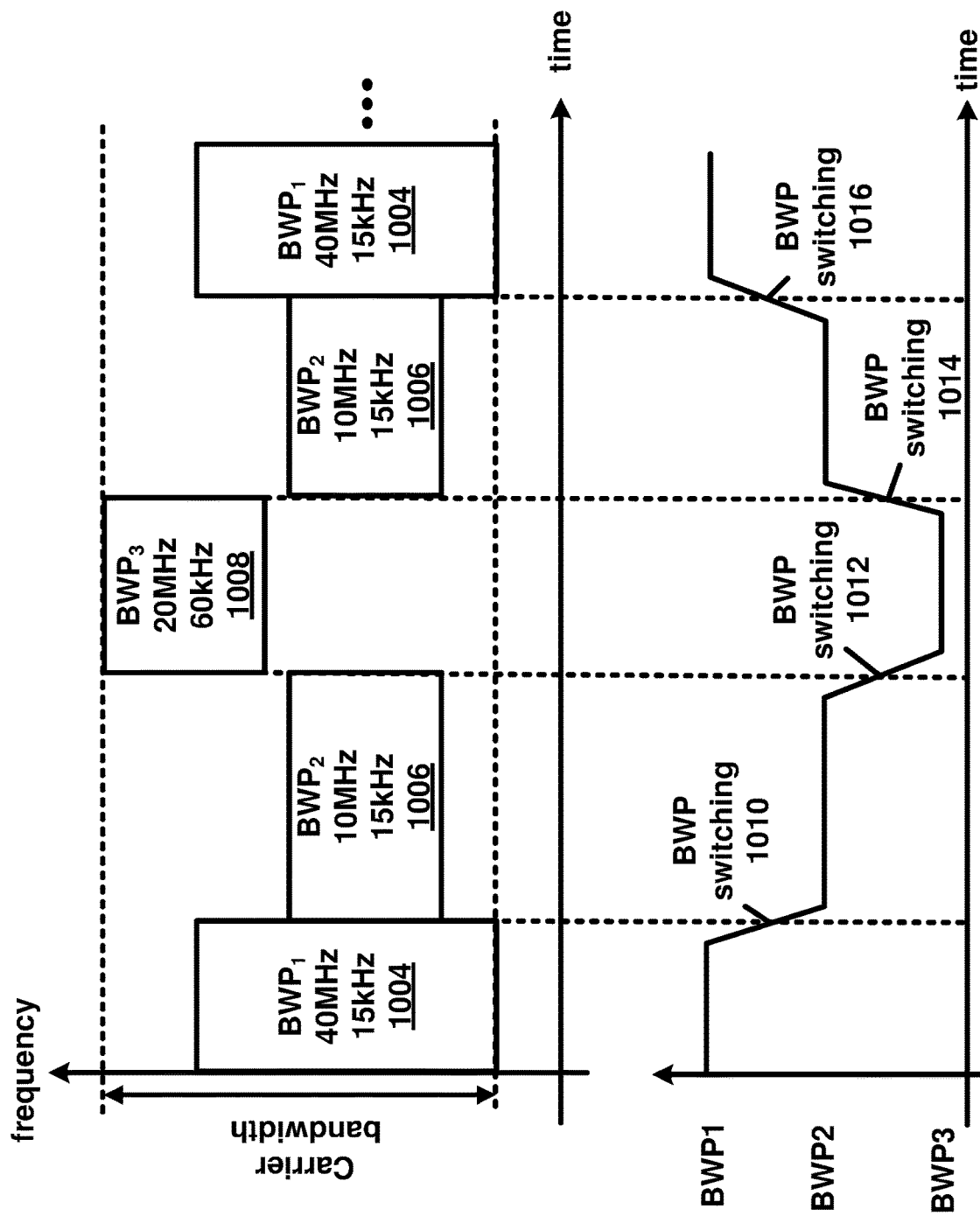
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
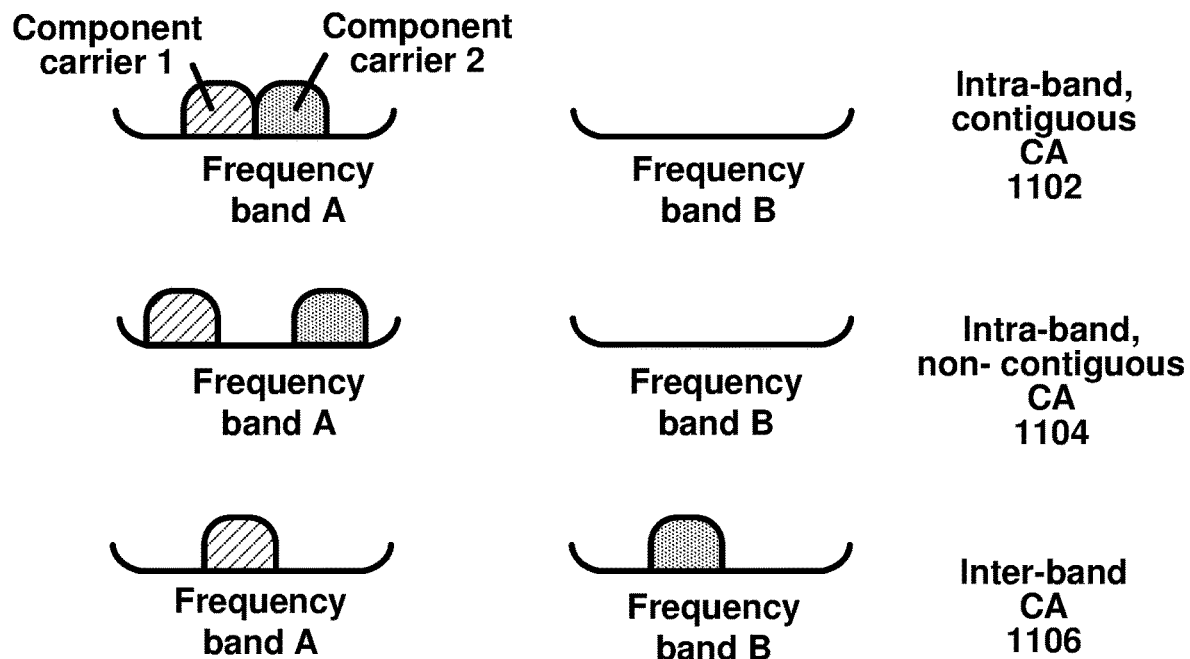
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
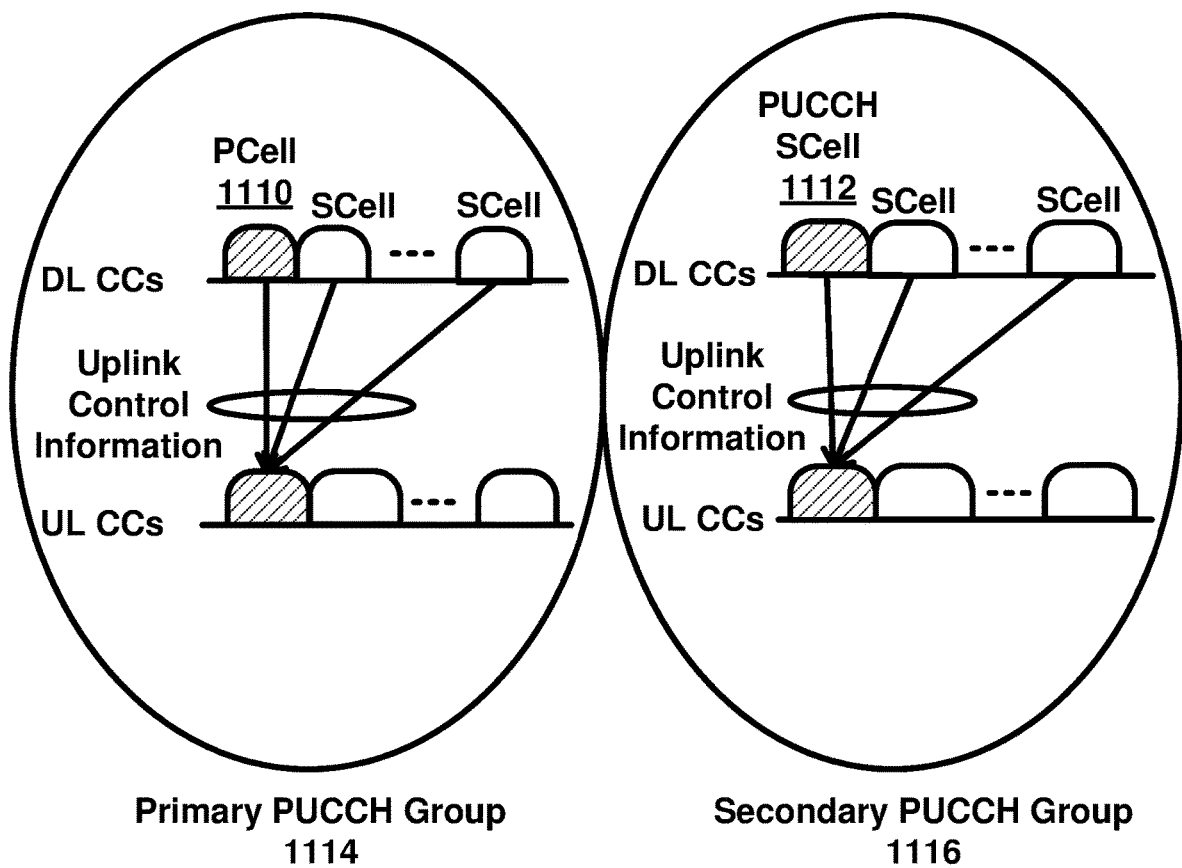
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
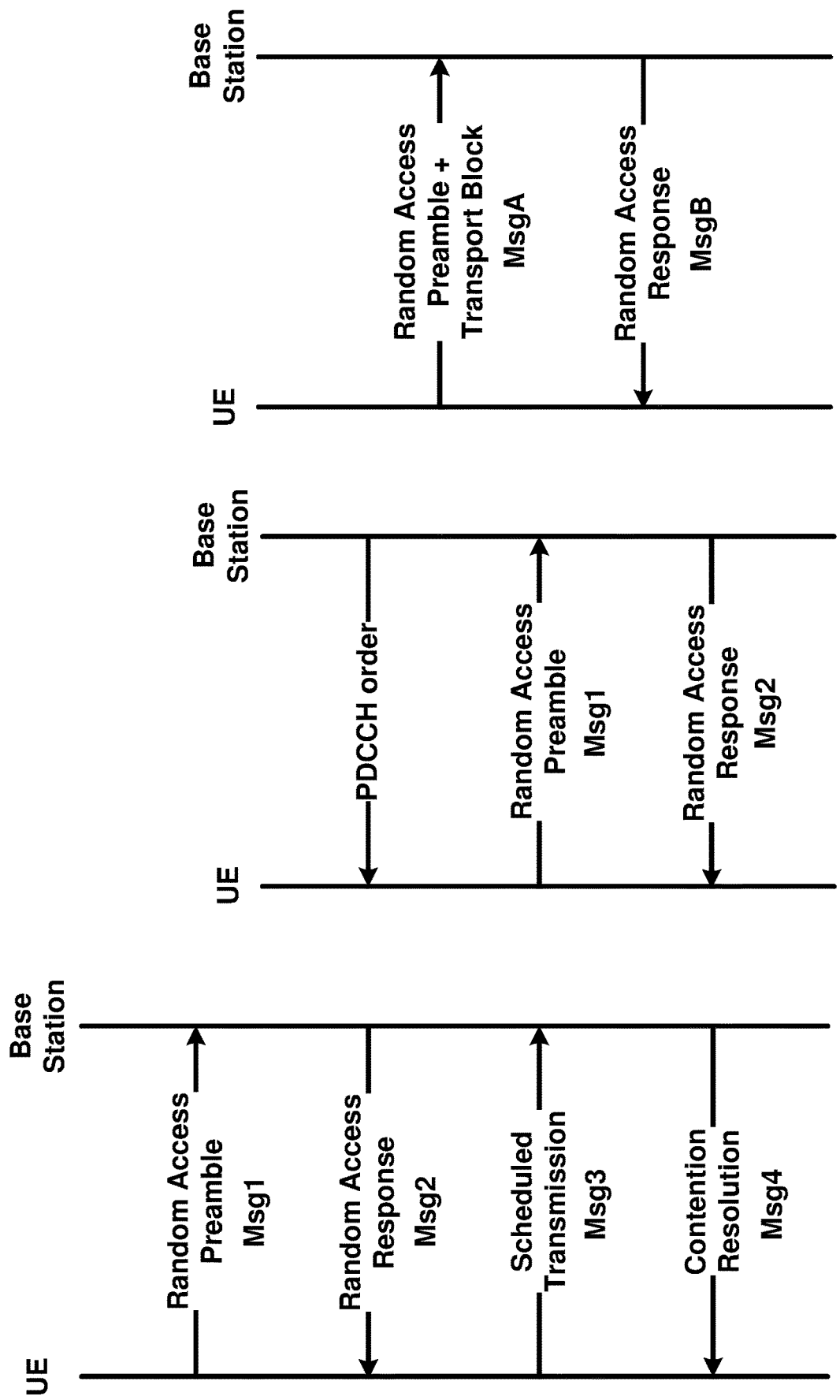
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
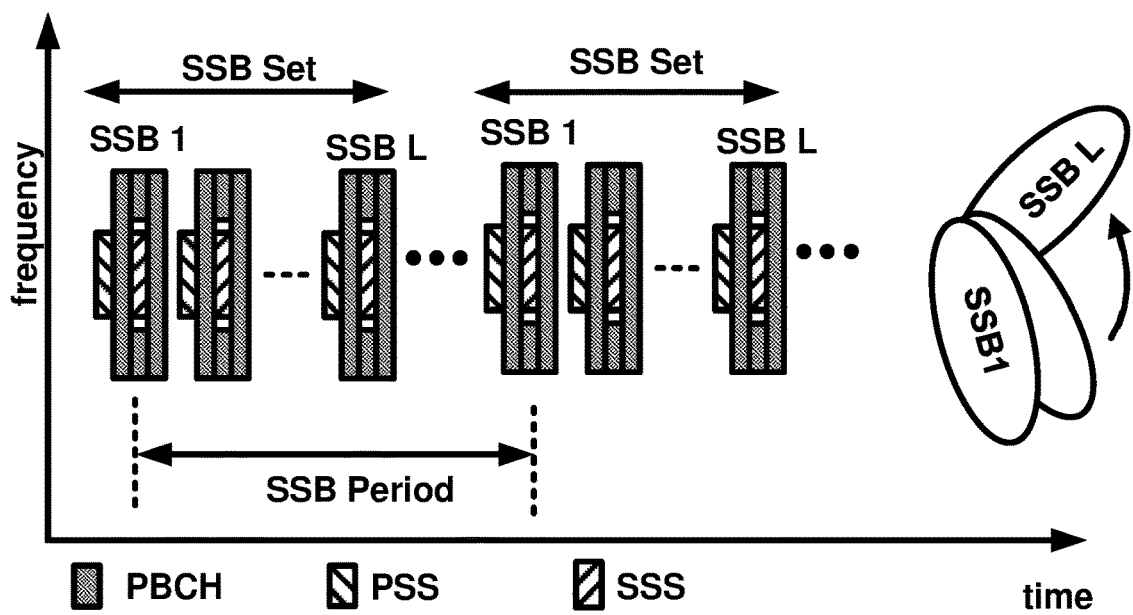
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
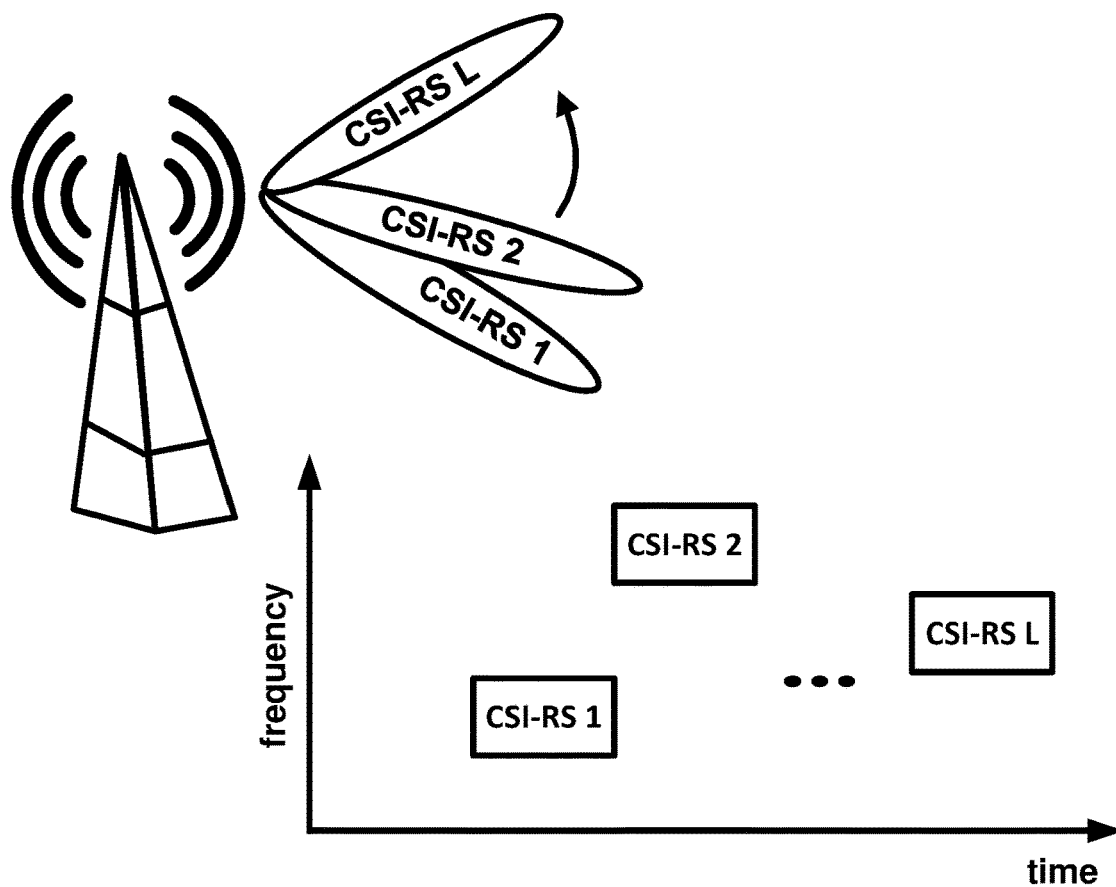
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
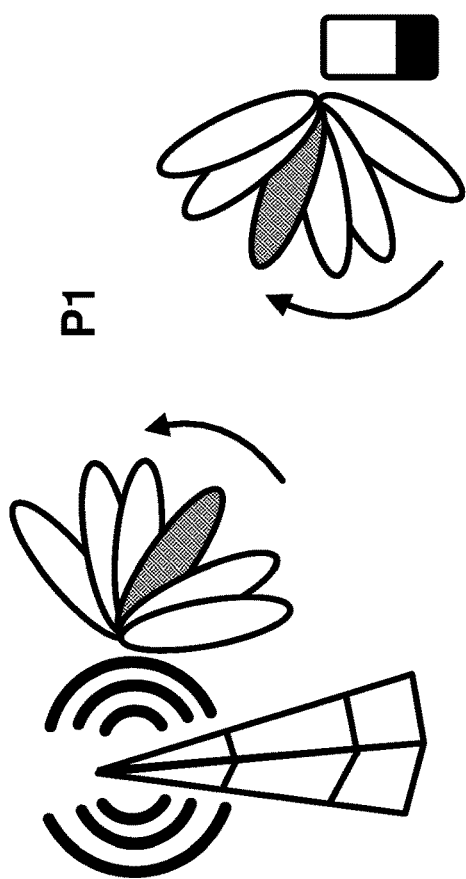
FIG. 14A, FIG. 14B and FIG. 14C show example beam management processes in accordance with several of various embodiments of the present disclosure.
Figure 14C:
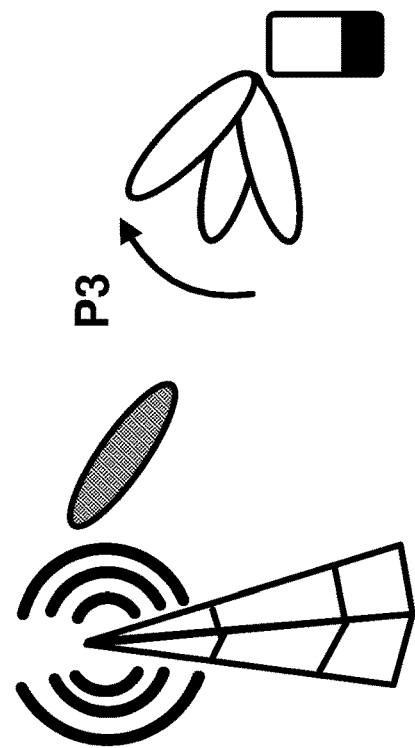
Figure 14B:
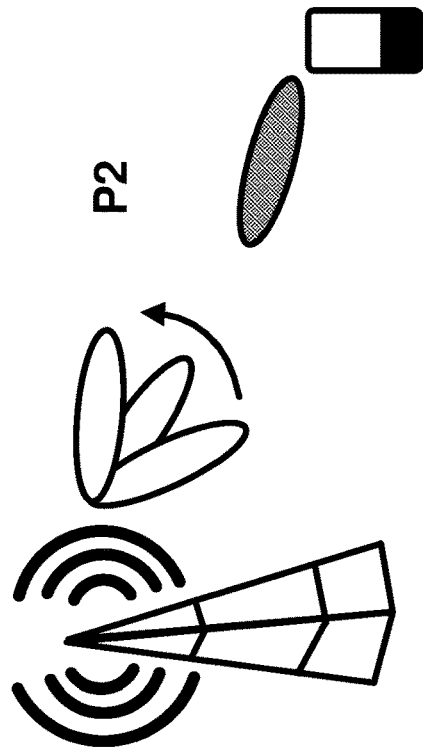

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
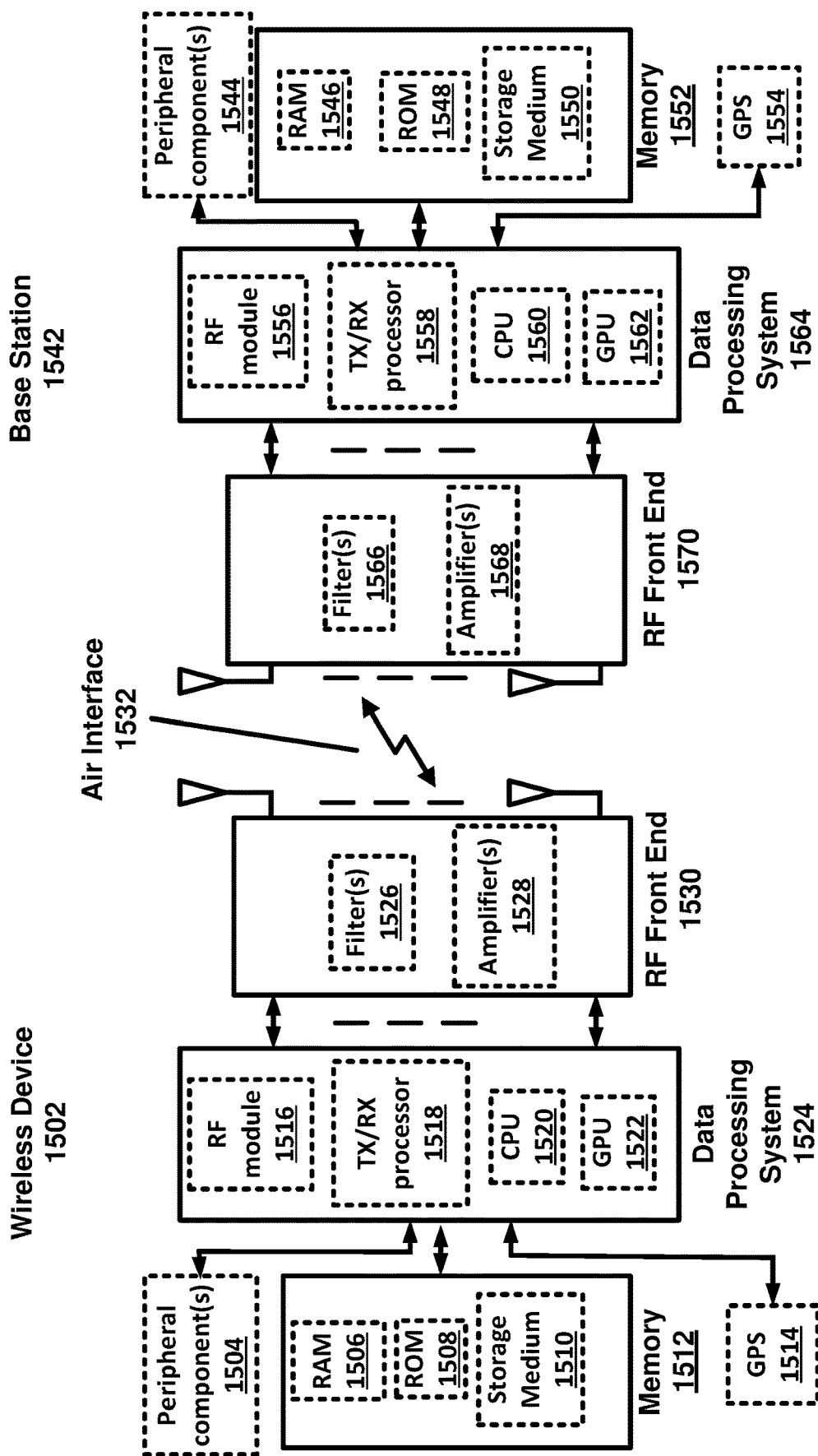
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, an IE PDSCH-ServingCellConfig may be used to configure UE specific PDSCH parameters that may be common across the UE's BWPs of a serving cell. In an example, the PDSCH-ServingCellConfig IE may comprise a pucch-Cell field an ID of a serving cell (e.g., of the same cell group) to use for PUCCH. If the field is absent, the UE may send the HARQ feedback on the PUCCH of the SpCell of this cell group, or on this serving cell if it is a PUCCH SCell. In an example, the field is also absent for the SpCells as well as for a PUCCH SCell.

In an example, if a UE reports HARQ-ACK information in a PUCCH only for a SPS PDSCH release indicated by DCI format 1_0 with counter downlink assignment indicator (DAI) field value of 1, or a PDSCH reception scheduled by DCI format 1_0 with counter DAI field value of 1 on the PCell, or SPS PDSCH reception(s) within the $M_{Ac}$ occasions for candidate PDSCH receptions, the UE may determine a HARQ-ACK codebook only for the SPS PDSCH release or only for the PDSCH reception or only for one SPS PDSCH reception according to corresponding $M_{Ac}$ occasion(s) on respective serving cell(s), where the HARQ-ACK information bits in response to more than one SPS PDSCH receptions that the UE is configured to receive may be ordered according to an example process. The UE may set $N_{cells}^{DL}$ to the number of serving cells configured to the UE. The UE may set $N_c^{SPS}$ to the number of SPS PDSCH configuration configured to the UE for serving cell c. The UE may set $N_c^{DL}$ to the number of DL slots for SPS PDSCH reception on serving cell c with HARQ-ACK information multiplexed on the PUCCH. The UE may set j=0–HARQ-ACK information bit index. The UE may set c=0–serving cell index: lower indexes may correspond to lower RRC indexes of corresponding cell. While $c<N_{cells}^{DL}$, the UE may set s=0–SPS PDSCH configuration index: lower indexes may correspond to lower RRC indexes of corresponding SPS configurations. While $s<N_c^{SPS}$, the UE may set $n_D$=0–slot index. While $n_D<N_c^{DL}$, if a UE is configured to receive a SPS PDSCH in slot $n_D$ for SPS PDSCH configuration s on serving cell c, excluding SPS PDSCH that is not required to be received among overlapping SPS PDSCHs, or based on a UE capability for a number of PDSCH receptions in a slot, or due to overlapping with a set of symbols indicated as uplink by tdd-UL-DL-ConfigurationCommon or by tdd-UL-DL-ConfigurationDedicated, and HARQ-ACK information for the SPS PDSCH is associated with the PUCCH, the j-th HARQ feedback in the codebook may be the HARQ-ACK information bit for this SPS PDSCH reception.

In an example, if a UE is configured to receive SPS PDSCH and the UE multiplexes HARQ-ACK information for one activated SPS PDSCH reception in the PUCCH in slot n, the UE may generate one HARQ-ACK information bit associated with the SPS PDSCH reception and may append it to the $O^{ACK}$ HARQ-ACK information bits.

In an example, if a UE is configured to receive SPS PDSCH and the UE multiplexes HARQ-ACK information for multiple activated SPS PDSCH receptions in the PUCCH in slot n, the UE may generate the HARQ-ACK information and may append it to the $O^{ACK}$ HARQ-ACK information bits.

In an example, a DCI scheduling a downlink transport block may comprise a field (e.g., a One-shot HARQ-ACK request) indicating a transmission of a HARQ feedback codebook (e.g., for a number of transport blocks and/or for all HARQ processes).

In an example, if a UE is provided with an information element (e.g., a pdsch-HARQ-ACK-OneShotFeedback) and the UE detects a DCI format in any PDCCH monitoring occasion that includes a One-shot HARQ-ACK request field with value 1, the UE may include the HARQ-ACK information in a HARQ-ACK codebook (e.g., a Type-3 codebook). In an example, the UE may not expect that the PDSCH-to-HARQ_feedback timing indicator field of the DCI format provides an inapplicable value from dl-DataToUL-ACK.

In an example, the IE SPS-Config may be used to configure downlink semi-persistent transmission. Multiple Downlink SPS configurations may be configured in one BWP of a serving cell. A parameter harq-CodebookID may indicate the HARQ-ACK codebook index for the corresponding HARQ-ACK codebook for SPS PDSCH and ACK for SPS PDSCH release. A parameter harq-ProcID-Offset may indicate the offset used in deriving the HARQ process IDs. A parameter nrofHARQ-Processes may indicate number of configured HARQ processes for SPS DL. A parameter n1PUCCH-AN may indicate HARQ resource for PUCCH for DL SPS. The network may configure the resource as format0 or format1. The PUCCH-Resource may be configured in PUCCH-Config and referred to by its ID. A parameter periodicityExt may be used to calculate the periodicity for DL SPS. If this field is present, the field periodicity may be ignored. A parameter sps-ConfigIndex1 may indicate the index of one of multiple SPS configurations.

In an example, the IE SPS-ConfigIndex may be used to indicate the index of one of multiple DL SPS configurations in one BWP.

In an example, the IE SPS-PUCCH-AN may be used to indicate a PUCCH resource for HARQ ACK and configure the corresponding maximum payload size for the PUCCH resource. In an example, the parameter maxPayloadSize may indicate the maximum payload size for the corresponding PUCCH resource ID. In an example, the parameter sps-PUCCH-AN-ResourceID may indicate the PUCCH resource ID.

In an example, the IE SPS-PUCCH-AN-List may be used to configure the list of PUCCH resources per HARQ ACK codebook.

In an example, for configured downlink assignments without harq-ProcID-Offset, the HARQ Process ID associated with the slot where the DL transmission starts may be derived from the following equation: HARQ Process ID= [floor (CURRENT_slot×10/(numberOfSlotsPerFrame×periodicity))] modulo nrofHARQ-Processes
where CURRENT_slot=[(SFN×numberOfSlotsPerFrame)+slot number in the frame] and numberOfSlotsPerFrame may refer to the number of consecutive slots per frame.

In an example, for configured downlink assignments with harq-ProcID-Offset, the HARQ Process ID associated with the slot where the DL transmission starts may be derived from the following equation: HARQ Process ID=[floor (CURRENT_slot/periodicity)] modulo nrofHARQ-Processes+harq-ProcID-Offset
where CURRENT_slot=[(SFN×numberOfSlotsPerFrame)+slot number in the frame] and numberOfSlotsPerFrame may refer to the number of consecutive slots per frame.

In an example, Semi-Persistent Scheduling (SPS) may be configured by RRC per Serving Cell and per BWP. Multiple assignments may be active simultaneously in the same BWP. Activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when the SPS is configured: cs-RNTI: CS-RNTI for activation, deactivation, and retransmission; nrofHARQ-Processes: the number of configured HARQ processes for SPS; harq-ProcID-Offset: Offset of HARQ process for SPS; and periodicity: periodicity of configured downlink assignment for SPS.

In an example, when the SPS is released by upper layers, the corresponding configurations may be released.

In an example, after a downlink assignment is configured for SPS, the MAC entity may consider sequentially that the Nth downlink assignment occurs in the slot for which:

(numberOfSlotsPerFrame×SFN+slot number in the frame)=[(numberOfSlotsPerFrame×SFNstart time+slotstart time)+N×periodicity×numberOfSlotsPerFrame/10] modulo (1024×numberOfSlotsPerFrame)

where SFNstart time and slotstart time may be the SFN and slot, respectively, of the first transmission of PDSCH where the configured downlink assignment was (re-)initialized.

In an example, the MAC entity of a wireless device may be configured by RRC with a discontinuous reception (DRX) functionality that may control the UE's PDCCH monitoring activity for one or more of the MAC entity's RNTIs (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI).

In an example, RRC may control DRX operation by configuring the following parameters: drx-onDurationTimer: the duration at the beginning of a DRX Cycle; drx-SlotOffset: the delay before starting the drx-onDurationTimer; drx-InactivityTimer: the duration after the PDCCH occasion in which a PDCCH indicates a new UL or DL transmission for the MAC entity; drx-RetransmissionTimerDL (per DL HARQ process except for the broadcast process): the maximum duration until a DL retransmission is received; drx-RetransmissionTimerUL (per UL HARQ process): the maximum duration until a grant for UL retransmission is received; drx-LongCycleStartOffset: the Long DRX cycle and drx-StartOffset which defines the subframe where the Long and Short DRX Cycle starts; drx-ShortCycle (optional): the Short DRX cycle; drx-ShortCycleTimer (optional): the duration the UE shall follow the Short DRX cycle; drx-HARQ-RTT-TimerDL (per DL HARQ process except for the broadcast process): the minimum duration before a DL assignment for HARQ retransmission is expected by the MAC entity; drx-HARQ-RTT-TimerUL (per UL HARQ process): the minimum duration before a UL HARQ retransmission grant is expected by the MAC entity.

In an example, serving Cells may be configured by RRC in two groups. When RRC does not configure a secondary DRX group, there may be only one DRX group. When two DRX groups are configured each group of Serving Cells, which is called a DRX group, is configured by RRC with its own set of parameters: drx-onDurationTimer, drx-InactivityTimer. When two DRX groups are configured, the two groups may share the following parameter values: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In an example, when a DRX cycle is configured, the Active Time for Serving Cells in a DRX group may include the time while: drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer or msgB-ResponseWindow is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment: the MAC entity may start the drx-HARQ-RTT-TimerDL for the corresponding HARQ process in the first symbol after the end of the corresponding transmission carrying the DL HARQ feedback; and stop the drx-RetransmissionTimerDL for the corresponding HARQ process.

In an example, when DRX is configured, if a MAC PDU is transmitted in a configured uplink grant and listen before talk (LBT) failure indication is not received from lower layers: the MAC entity may start the drx-HARQ-RTT-TimerUL for the corresponding HARQ process in the first symbol after the end of the first repetition of the corresponding PUSCH transmission; and stop the drx-RetransmissionTimerUL for the corresponding HARQ process.

In an example, when DRX is configured, if a drx-HARQ-RTT-TimerDL expires: if the data of the corresponding HARQ process was not successfully decoded: the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires: the MAC entity may start the drx-RetransmissionTimerUL for the corresponding HARQ process in the first symbol after the expiry of drx-HARQ-RTT-TimerUL.

In an example, for a DRX group, if a DRX Command MAC CE or a Long DRX Command MAC CE is received: the MAC entity may stop drx-onDurationTimer; and stop drx-InactivityTimer.

In an example, for a DRX group, if drx-InactivityTimer for this DRX Group expires: if the Short DRX cycle is configured: the MAC entity may start or restart drx-ShortCycleTimer for this DRX Group in the first symbol after the expiry of drx-InactivityTimer; and use the Short DRX Cycle for this DRX group.

In an example, for a DRX group, if drx-InactivityTimer for this DRX Group expires: if the Short DRX cycle is not configured: the MAC entity may use the Long DRX cycle for this DRX group.

In an example, for a DRX group, if a DRX Command MAC CE is received: if the Short DRX cycle is configured: the MAC entity may start or restart drx-ShortCycleTimer for this DRX Group in the first symbol after the end of DRX Command MAC CE reception; and use the Short DRX Cycle for both DRX groups.

In an example, for a DRX group, if a DRX Command MAC CE is received: if the Short DRX cycle is not configured: the MAC entity may use the Long DRX cycle for both DRX groups.

In an example, for a DRX group, if drx-ShortCycleTimer for this DRX Group expires: the MAC entity may use the Long DRX for this DRX Group cycle.

In an example, for a DRX group, if a Long DRX Command MAC CE is received: the MAC entity may stop drx-ShortCycleTimer for both DRX groups; and use the Long DRX cycle for both DRX groups.

In an example, for a DRX group, if the Short DRX Cycle is used, and [(SFN×10)+subframe number] modulo (drx-ShortCycle)=(drx-StartOffset) modulo (drx-ShortCycle): the MAC entity may start drx-onDurationTimer after drx-SlotOffset from the beginning of the subframe.

In an example, for a DRX group, if the Long DRX Cycle is used, and [(SFN×10)+subframe number] modulo (drx-LongCycle)=drx-StartOffset: the MAC entity may start drx-onDurationTimer after drx-SlotOffset from the beginning of the subframe.

In an example, for a DRX group, if the DRX group is in Active Time: the MAC entity may monitor the PDCCH on the Serving Cells in this DRX group. If the PDCCH indicates a DL transmission: the MAC entity may start the drx-HARQ-RTT-TimerDL for the corresponding HARQ process in the first symbol after the end of the corresponding transmission carrying the DL HARQ feedback. In an example, when HARQ feedback is postponed by PDSCH-to-HARQ_feedback timing indicating a non-numerical k1 value, the corresponding transmission opportunity to send the DL HARQ feedback may be indicated in a later PDCCH requesting the HARQ-ACK feedback. The MAC entity may stop the drx-RetransmissionTimerDL for the corresponding HARQ process. If the PDSCH-to-HARQ_feedback timing indicates a non-numerical k1 value, the MAC entity may start the drx-RetransmissionTimerDL in the first symbol after the PDSCH transmission for the corresponding HARQ process.

In an example, for a DRX group, if the DRX group is in Active Time: the MAC entity may monitor the PDCCH on the Serving Cells in this DRX group. If the PDCCH indicates a UL transmission: the MAC entity may start the drx-HARQ-RTT-TimerUL for the corresponding HARQ process in the first symbol after the end of the first repetition of the corresponding PUSCH transmission; and the MAC entity may stop the drx-RetransmissionTimerUL for the corresponding HARQ process.

In an example, for a DRX group, if the DRX group is in Active Time: the MAC entity may monitor the PDCCH on the Serving Cells in this DRX group. If the PDCCH indicates a new transmission (DL or UL) on a Serving Cell in this DRX group: the MAC entity may start or restart drx-InactivityTimer for this DRX group in the first symbol after the end of the PDCCH reception.

In an example, DCI format 1_0 may be used for the scheduling of PDSCH in one DL cell. The DCI may indicate Modulation and coding scheme; New data indicator; Redundancy version; HARQ process number; TPC command for scheduled PUCCH; PUCCH resource indicator; P and DSCH-to-HARQ_feedback timing indicator.

In an example, DCI format 1_1 may be used for the scheduling of PDSCH in one cell. The DCI may indicate Carrier indicator; Bandwidth part indicator; Frequency domain resource assignment; Time domain resource assignment; HARQ process number; TPC command for scheduled PUCCH; PUCCH resource indicator; PDSCH-to-HARQ_feedback timing indicator; Modulation and coding scheme.

In an example, DCI format 1_2 may be used for the scheduling of PDSCH in one cell. The DCI may indicate Carrier indicator; Bandwidth part indicator; Frequency domain resource assignment; Time domain resource assignment; Modulation and coding scheme; New data indicator; Redundancy version; HARQ process number; TPC command for scheduled PUCCH; PUCCH resource indicator; and PDSCH-to-HARQ_feedback timing indicator.

In an example, the SPS PDSCHs associated with an SPS configuration may have a fixed PDSCH-to-HARQ timing (e.g., denoted as K1) as indicated by an activation DCI indicating activation of the SPS configuration. In an example, with shorter (e.g., down to 1 slot) SPS periodicities, a large number of the SPS HARQ-ACK feedback may be dropped if the corresponding PUCCH resource collides with at least 1 DL or flexible symbol (e.g., in a TDD scenario).

In an example, an SPS HARQ feedback may be transmitted in a later PUCCH. In an example, a HARQ feedback for a downlink transport block may be dropped at its scheduled timing and may be deferred until a later PUCCH resource (e.g., a first/earliest available valid PUCCH resource). In an example, a valid PUCCH resource may be a PUCCH resource that does not collide with a DL or flexible symbol. In an example, a timing of the later PUCCH resource may be further limited to the maximum configured K1 value from a K1 set. In an example, the UE may discard the HARQ feedback information, if the UE cannot transmit the HARQ feedback information within the configured maximum HARQ-ACK feedback delay.

In an example, the base station may dynamically indicate one or more transmission opportunities for a postponed HARQ feedback to the UE.

In an example, the UE may receive a configuration parameter (e.g., an RRC parameter) indicating a time window, wherein the time window may be used for a K1 value used for determining HARQ feedback of a SPS transmission.

In an example, a UE may transmit HARQ feedbacks for a for group of SPS HARQ processes based on a one-shot HARQ feedback request. In an example, a non-numerical K1 value (e.g., a NN k1) for DL SPS operation in licensed spectrum. In an example, a UE may select a first applicable k1 value from a set of configured K1 values.

In an example, based on intra-UE and/or inter-UE prioritization, low priority HARQ feedback transmission may be dropped/canceled due to overlapping high priority UL channels (e.g., for intra-UE prioritization) or due to UL cancelation indication (e.g., using DCI format 2_4), for example, for HARQ feedback carried on PUSCH. This may lead to low priority HARQ feedback dropping affecting the eMBB PDSCH performance (from single UE but especially from cell load perspective) which may be improved by allowing a later re-transmission of canceled/dropped low priority HARQ feedback.

In an example, the dropped/canceled HARQ feedback transmission due to intra-UE or inter-UE prioritization may be enhanced by re-transmission of HARQ feedback.

In an example, the gNB may indicate a new PUCCH resource for re-transmission of the dropped/cancelled HARQ feedback.

In an example, more than one PUCCH transmission for HARQ feedback within one slot may be enabled by sub-slot based HARQ feedback transmission. In an example, a plurality of HARQ feedback codebooks with different priorities may be simultaneously constructed.

In an example, HARQ feedback for SPS may be dropped when it collides with symbols that cannot be used for uplink transmission. In unpaired spectrum, DL heavy configurations and multiple SPS configurations will cause HARQ feedback being dropped frequently, which may waste resources and degrade system performance. In an example, in case of collision with invalid symbol(s) for UL transmission, HARQ feedback may be postponed for a DL SPS transmission.

In an example, dynamic PUCCH carrier switching may be used, for example for TDD carriers.

In an example, with short SPS periodicity values, the periodicity value may not match with a given semi-static TDD pattern, for example, for the HARQ-ACK feedback timing. The timing of HARQ-ACK feedback for DL SPS may be indicated by PDSCH-to-HARQ_feedback timing indicator field, if present, in the activation DCI. Otherwise, it may be provided by an RRC parameter dl-DataToUL-ACK. In an example, the HARQ feedback timing value (K1) may not indicate valid UL slot for all SPS PDSCH occasions. The UE may defer HARQ feedback transmission to the next UL slot/symbols when it collides with invalid slot/symbols due to mismatch between SPS periodicity and TDD pattern.

In an example, a wireless device may be indicated a set of k values wherein a k value for one SPS transmission may be in a time window configured by RRC. In an example, RRC may configure one or more sets of k values. If more than one sets are configured, one set may be based on the PDSCH-to-HARQ_feedback timing indicator field in the activating DCI.

In an example, a wireless device may be indicated to dynamically switch an uplink control channel carrier. In an example, a wireless device may defer transmission of HARQ feedback for a transport block due to collision (e.g., resource/timing overlap) with a DL or Flexible symbols. In an example, a wireless device may cancel/drop a HARQ feedback due to collision (e.g., resource/timing overlap) with a high priority uplink channel. The wireless device may transmit a deferred or cancelled/dropped HARQ feedback via an uplink resource in a later timing. Existing feedback mechanisms and/or DRX processes may perform inefficiently in response to dynamic uplink carrier switching and/or in response to transmission of deferred/or cancelled/dropped HARQ feedbacks. Example embodiments enhance the existing feedback mechanisms and/or DRX processes.

Figure 16:
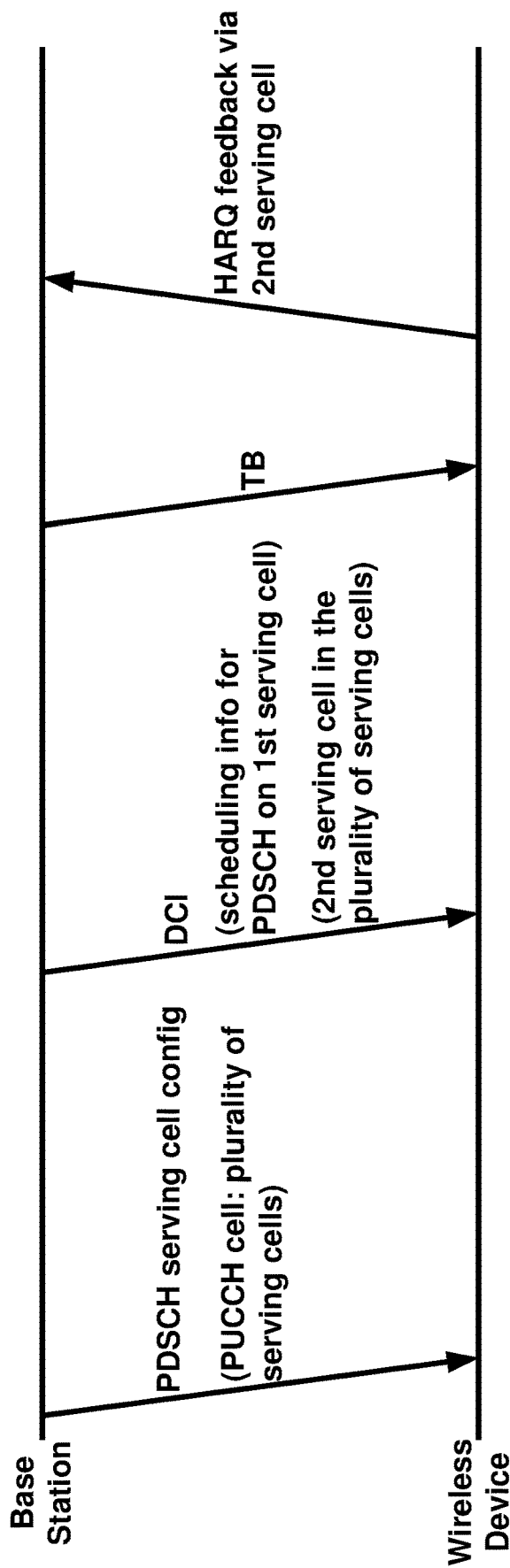
FIG. 16 shows an example process in accordance with several of various embodiments of the present disclosure.

In an example embodiment as shown in FIG. 16, a wireless device may receive one or more messages comprising configuration parameters of a plurality of cells comprising a primary cell and one or more secondary cells. The one or more messages may comprise one or more RRC messages. In an example, the plurality of cells may be provided by one or more base stations. In an example the one or more base stations may comprise a master base station. In an example, the one or more base stations may comprise a master base station and a secondary base station (e.g., in a dual connectivity scenario). The configuration parameters may comprise an information element (e.g., a physical downlink shared channel (PDSCH) serving cell information element (PDSCH-ServingCellConfig)) indicating first configuration parameters of a first serving cell. The information element may be used to configure UE specific PDSCH parameters that may be common across the wireless device's BWPs of the first serving cell. In an example, the first configuration parameters may indicate a plurality of serving cells configured for transmission of HARQ feedback of a downlink transport block received via the first serving cell. For example, a PUCCH-cell field of the information element may indicate the plurality of serving cells that the wireless device may use for transmission of HARQ feedback, of a downlink transport block received via the first serving cell, via a PUCCH of a serving cell in the plurality of serving cells. The wireless device may determine a second serving cell, in the plurality of serving cells, for transmission of HARQ feedback via a PUCCH of the second serving cell. In an example the first configuration parameters (e.g., the PUCCH-cell field) may indicate a respective index (e.g., cell index) for each of the plurality of serving cells. For example, as shown in FIG. 17, the PUCCH-cell field or another field of the first configuration parameters may indicate a sequence of serving cell indexes for the plurality of the serving cells configured for transmission of HARQ feedback for a transport block received via the first serving cell.

In an example, the one or more messages may comprise uplink control channel configuration parameters for the plurality of serving cells (e.g., the plurality of serving cells configured for transmission of HARQ feedback for transport blocks received via the first serving cell). The uplink control channel configuration parameters may comprise common uplink control channel configuration parameters that are common among the plurality of serving cells configured for transmission of a HARQ feedback for transport blocks received via the first serving cell. The common uplink control channel configuration parameters may indicate and/or may be used by the wireless device for determining radio resources of uplink control channel of the plurality of serving cells. The common uplink control channel configuration parameters may be used for determining one or more of uplink control channel radio resources, uplink control channel power level using one or more power control parameters, sub-slot based transmission of uplink control channel, uplink control channel transmission timing, etc.

In an example, the uplink control channel configuration parameters may comprise respective uplink control channel configuration parameters for each of the plurality of serving cells (e.g., the plurality of serving cells configured for transmission of HARQ feedback for transport blocks received via the first serving cell). The respective uplink control channel configuration parameters may be specific to a corresponding serving cell of the plurality of serving cells and may be different from the common uplink control channel configuration parameters that are common among the plurality of serving cells.

The wireless device may receive a downlink control information (DCI) via a downlink control channel. The downlink control information may be a downlink scheduling DCI (e.g., with DCI format 1_0 or DCI format 1_1 or DCI 1_2). The DCI may comprise scheduling information for receiving a downlink transport block via the first serving cell. For example, the DCI may indicate the radio resources and one or more slots/sub-slots for receiving the downlink transport block via the first serving cell. The DCI may indicate a second serving cell in the plurality of serving cells (e.g., the plurality of serving cells configured for transmission of HARQ feedback for transport blocks received via the first serving cell). The wireless device may determine the second serving cell based on the DCI and based on the plurality of serving cells. For example, the DCI may comprise a field, a value of the field indicating the second serving cell in the plurality of serving cells configured for transmission of HARQ feedback. For example, the field may indicate an index (e.g., a cell index or a cell identifier) of the second serving cell. The DCI may further indicate a timing for transmission of HARQ feedback associated with the downlink transport block. For example, the DCI may comprise a PDSCH-to-HARQ feedback timing field indicating a timing duration between the reception of the downlink transport block via the PDSCH and the transmission of the HARQ feedback associated with the downlink transport block.

The wireless device may receive the downlink transport block based on the DCI (e.g., via the radio resources of the first serving cell indicated by the DCI). The wireless device may transmit (e.g., at the timing determined by the wireless device based on the DCI) the HARQ feedback associated with the downlink transport block using an uplink control channel of the second serving cell (e.g., the second serving cell determined by the wireless device from the plurality of serving cells based on the DCI). In an example, the wireless device may transmit the HARQ feedback associated with the downlink transport block using the common uplink control channel configuration parameters that are commonly configured for the plurality of serving cell (e.g., plurality of serving cell configured for transmission of HARQ feedback for transport blocks received via the first serving cell). In an example, the wireless device may transmit the HARQ feedback associated with the downlink transport block using the uplink control channel configuration parameters of the second serving cell (e.g., specific to the second serving cell and not common uplink control channel configuration parameters) indicated by the DCI. In an example, the wireless device may transmit the HARQ feedback associated with the downlink transport block using the common uplink control channel configuration parameters and the uplink control channel configuration parameters of the second serving cell. In an example, the wireless device may transmit the HARQ feedback associate with the downlink transport via the uplink control channel of an active bandwidth part of the second serving cell (e.g., the second serving cell indicated by the DCI).

In an example, the DCI may comprise a field indicating a bandwidth part of the second serving cell wherein the transmission of the HARQ feedback associated with the downlink transport block may be via an uplink control channel of the indicated bandwidth part of the second serving cell. In an example, the indicated BWP of the second serving cell may be different from a current active BWP of the second serving cell. The wireless device may switch the active bandwidth part of the second serving cell based on the bandwidth part of the second serving cell, indicated by the DCI, being different from the current active bandwidth part of the second serving cell.

In an example, the one or more messages may indicate a plurality of uplink control channel groups for the plurality of cells configured for the wireless device. For example, the first configuration parameters of the first serving cell may indicate that the first serving cell is associated with an uplink control channel group in the plurality uplink control channel group. For example, the first configuration parameters of the first serving cell may comprise an identifier of an uplink control channel group indicating the uplink control channel group that the first serving cell is associated with. In an example, the plurality of serving cells, configured for transmission of HARQ feedbacks of downlink transport blocks received via the first serving cell, may be in the same uplink control channel group. In an example, the plurality of serving cells, configured for transmission of HARQ feedback of downlink transport blocks received via the first serving cell, may comprise a first cell in a first uplink control channel group and a second cell in a second uplink control channel group.

In an example, the DCI may comprise a transmit power control (TPC) field indicating a TPC command. The wireless device may determine a power level for transmission of uplink control channel of the second serving cell wherein the wireless device determines the second serving cell indicated by the DCI.

In an example, the wireless device may receive a first DCI comprising scheduling information for receiving a first transport block and a second DCI comprising scheduling for receiving a second transport block. The first DCI may indicate transmission of a first HARQ feedback of the first transport block via a serving cell and at a first timing and the second DCI may indicate transmission of a second HARQ feedback of the second transport block via the serving cell at a second timing. The first timing and the second timing may overlap in one or more symbols. The first DCI may comprise a first TPC field indicating a first power control command and the second DCI may comprise a second TPC field indicating a second power control command. The wireless device may determine a power level for transmission of uplink control channel of the serving cell, indicated by the first DCI and the second DCI and carrying the first HARQ feedback and the second HARQ feedback, based on one of the first power control command and the second power control command. For example, the wireless device may select one of the first power control command and the second power control command, for determining the power level of the uplink control channel of the serving cell, based on the relative reception timing of the first DCI and the second DCI. For example, the wireless device may select the second power control command based on receiving the second DCI later than the first DCI. For example, the wireless device may select one of the first power control command and the second power control command, for determining the power level of the uplink control channel of the serving cell, based on the relative reception timing of the first transport block and the second transport block. For example, the wireless device may select the second power control command based on receiving the second transport block later than the first transport block.

Figure 18:
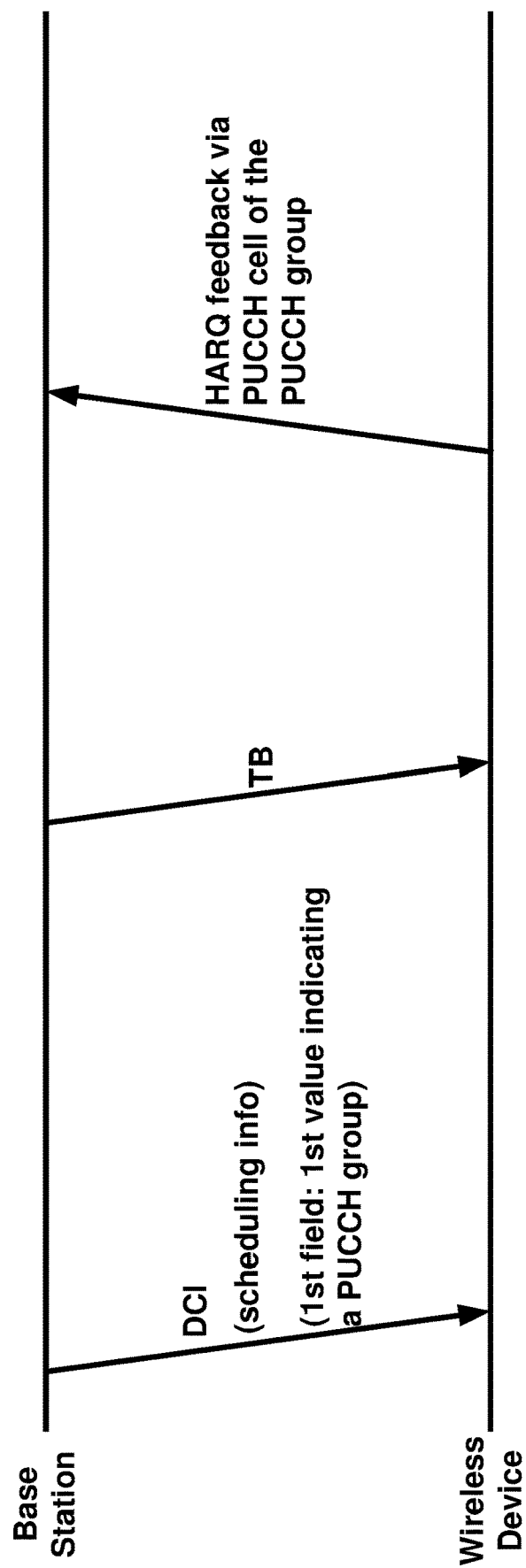
FIG. 18 shows an example process in accordance with several of various embodiments of the present disclosure.

In an example as shown in FIG. 18, the one or more messages may indicate a plurality of uplink control channel groups comprising a first uplink control channel group and a second uplink control channel group. The DCI may indicate one of the first uplink control channel group and the second uplink control channel group. For example, the DCI may comprise a field, a value of the field indicating an identifier for one of the first uplink control channel group or the second uplink control channel group. The wireless device may determine the second serving cell, for transmission of the HARQ feedback associated with the downlink transport block, based on the uplink control channel group indicated by the DCI. The second serving cell may be a cell configured with uplink control channel in the indicated uplink control channel group. For example, the second serving cell may be a primary cell if the uplink control channel group indicated by the DCI is a primary uplink control channel group. For example, the second serving cell may be a secondary cell configured with uplink control channel (e.g., a PUCCH SCell) if the uplink control channel group indicated by the DCI is a secondary uplink control channel group. In an example, the first serving cell, that the transport block is received, may be in the first uplink control channel group. The downlink control information may comprise a field with a value indicating one of: the first uplink control channel group; and the second uplink control channel group. For example, the field may comprise one or more bits, a first value of the one or more bits may indicate the first uplink control channel group (e.g., the uplink control channel group that includes the first serving cell) and a second value of the one or more bits may indicate a second uplink control channel (e.g., the uplink control channel group that does not include the first serving cell or includes a different serving cell).

In an example embodiment, the wireless device may receive a medium access control (MAC) control element (MAC CE) indicating a serving cell for transmission of uplink control channel that carries uplink control information (e.g., HARQ feedback(s)) for transport blocks received via one or more cells (e.g., a group of cells). For example, the MAC CE may comprise a field indicating an identifier of the serving cell. For example, the MAC CE may indicate the one or more cells (e.g., the group of cells) based on one or more identifiers of the one or more cells. For example, the configuration parameters of the one or more cells may comprise the one or more identifiers of the one or more identifiers. For example, configuration parameters of each of the one or more cells may comprise a group identifier that the one or more cells belongs to. The MAC CE may comprise a field, the value of the field may indicate the group identifier.

Figure 19:
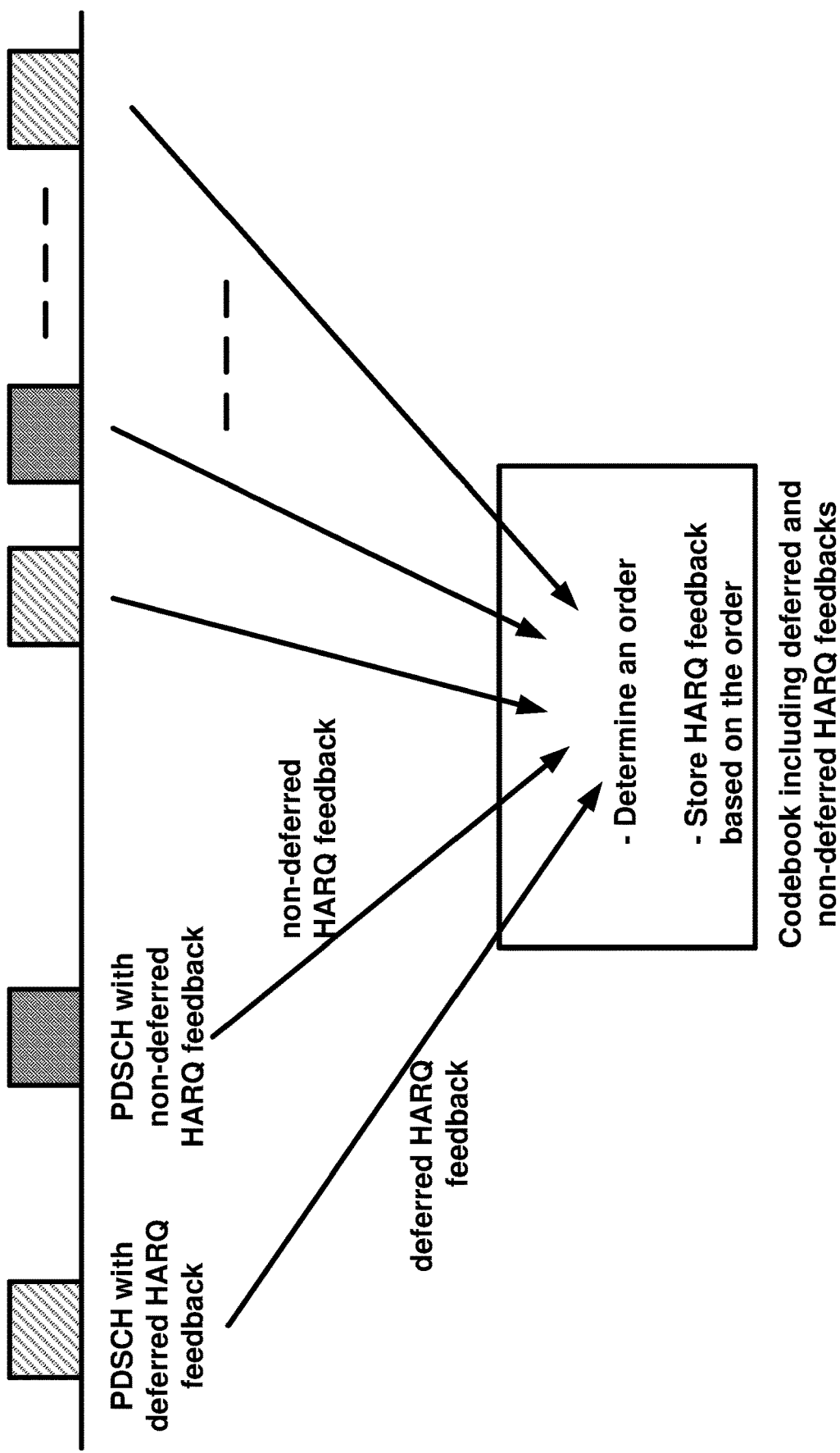
FIG. 19 shows an example process in accordance with several of various embodiments of the present disclosure.
Figure 20:
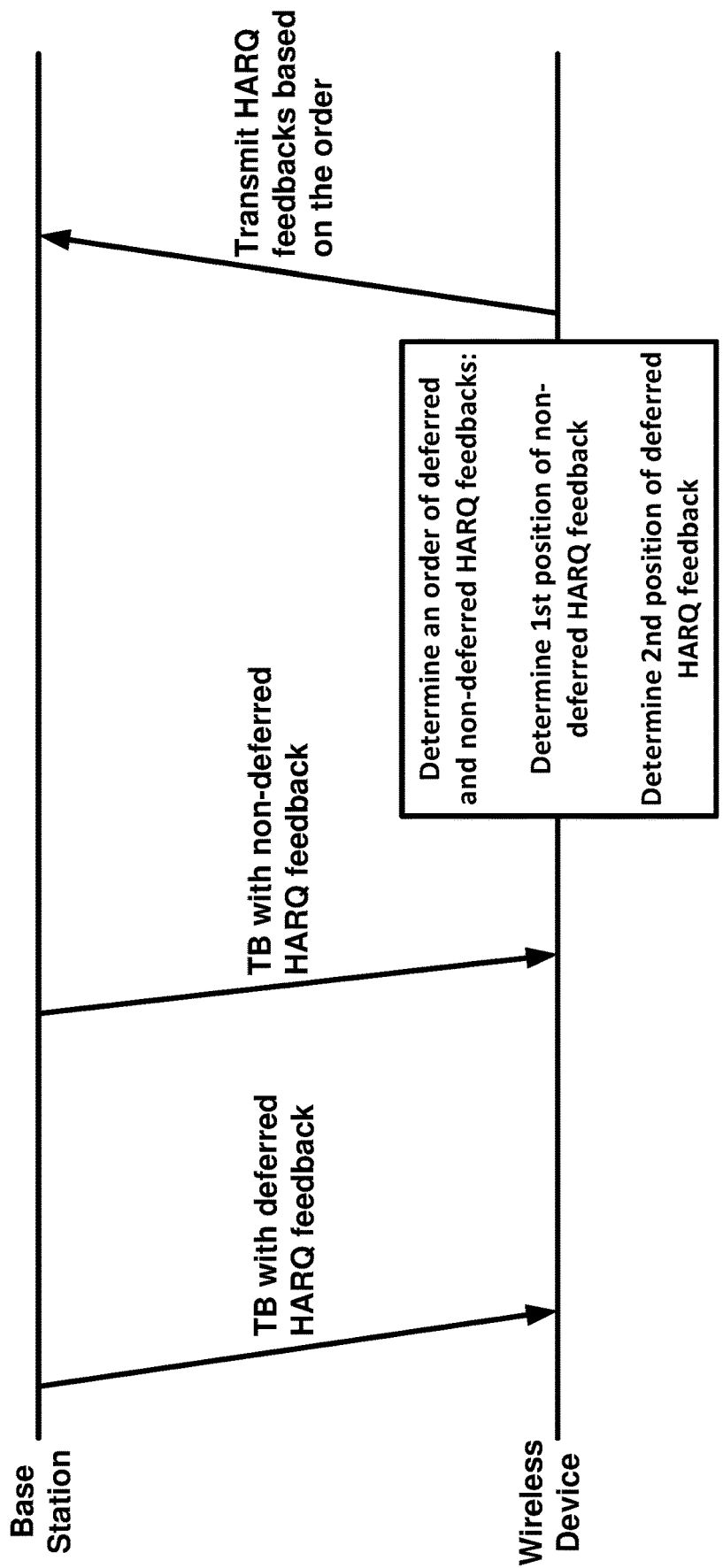
FIG. 20 shows an example process in accordance with several of various embodiments of the present disclosure.

In an example embodiment as shown in FIG. 19 and FIG. 20, a wireless device may receive a plurality of transport blocks via a downlink shared channel (e.g., PDSCH). The plurality of transport blocks may comprise one or more first transport blocks and one or more second transport blocks. The wireless device may defer one or more first HARQ feedbacks associated with the one or more first transport blocks. The one or more first HARQ feedbacks may be referred to as deferred HARQ feedbacks. For example, a HARQ feedback in the one or more first HARQ feedbacks may be deferred based on a timing scheduled for the HARQ feedback colliding with a downlink symbol or a flexible symbol. The wireless device may determine the timing based on a PDSCH-to-HARQ feedback timing field of a DCI (e.g., an SPS activation DCI) and the timing of the reception of the transport block. The wireless device may not defer one or more second HARQ feedbacks associated with the one or more second transport blocks. The one or more second HARQ feedbacks may be referred to as non-deferred HARQ feedbacks. For example, the wireless device may receive one or more DCIs comprising scheduling information for the one or more second transport blocks and the one or more DCIs may indicate a first HARQ feedback timing for transmission of the one or more second HARQ feedbacks. The first HARQ feedback timing may be the timing for transmission of the one or more first HARQ feedbacks (e.g., deferred HARQ feedbacks) and the one or more second HARQ feedbacks (e.g., the non-deferred HARQ feedbacks). In an example, the wireless device may determine the first HARQ feedback timing for transmission of the deferred HARQ feedbacks based on the first HARQ feedback timing being a first/earliest available PUCCH resource after the previously scheduled timings of the one or more first HARQ feedbacks. In an example, the wireless device may determine the first HARQ feedback timing for transmission of the deferred HARQ feedbacks based on an indication from the base station. For example, the indication may be received by the wireless device based on physical layer signaling (e.g., based on a DCI received via PDCCH).

The wireless device may construct a HARQ feedback codebook that includes both the deferred HARQ feedback(s) and the non-deferred HARQ feedback(s). The wireless device may determine an order for the deferred HARQ feedbacks and the non-deferred HARQ feedbacks. The wireless device may construct the HARQ feedback codebook based on the determined order. The wireless device may determine positions of the deferred HARQ feedbacks and the non-deferred HARQ feedbacks based on the order and may construct the HARQ feedback codebook based on the determined positions of the deferred HARQ feedbacks and the non-deferred HARQ feedbacks. The wireless device may transmit the HARQ feedback codebook using an uplink channel. In an example, the wireless device may transmit the HARQ feedback codebook via a PUCCH. In an example, the wireless device may transmit the HARQ feedback codebook via a PUSCH.

In an example, the wireless device may determine first positions of the non-deferred HARQ feedbacks based on a first order. The wireless device may determine second positions of the deferred HARQ feedbacks based on a second order. The wireless device may append the ordered non-deferred HARQ feedbacks (based on the first order and according to the first positions) to the ordered deferred HARQ feedbacks (based on the second order and according to the second positions).

In an example, the one or more first transport blocks and the one or more second transport blocks may be received via one or more cells. For a cell of the one or more cells, the wireless device may determine first positions of first non-deferred HARQ feedbacks for transport blocks, of the one or more second transport blocks, that are received via the cell. The wireless device may determine second positions of second deferred HARQ feedbacks for transport blocks, of the one or more first transport blocks, that are received via the cell. In an example, the second positions of the second HARQ feedbacks may be after the first non-deferred HARQ feedbacks.

In an example, the one or more first transport blocks and the one or more second transport blocks may be received via one or more cells and may be associated with one or more SPS configuration indexes. For a cell of the one or more cells and a SPS configuration index of the one or more SPS configuration indexes, the wireless device may determine first positions of first non-deferred HARQ feedbacks for transport blocks, of the one or more second transport blocks, that are received via the cell and associated with the SPS configuration index. The wireless device may determine second positions of second deferred HARQ feedbacks for transport blocks, of the one or more first transport blocks, that are received via the cell and associated with the SPS configuration index. In an example, the second positions of the second HARQ feedbacks may be after the first non-deferred HARQ feedbacks.

In an example embodiment, a wireless device may determine a first position of a non-deferred HARQ feedback, for a first transport block in a first plurality of transport blocks with non-deferred HARQ feedbacks. The wireless device may determine a second position of a deferred HARQ feedback, for a second transport block in a second plurality of transport blocks with deferred HARQ feedbacks. The first transport block may be associated with a first SPS configuration index. For example, a first activation DCI may indicate activation of a SPS configuration with the first SPS configuration index and may indicate a plurality of SPS resources comprising a first SPS resource for the first transport block. The first SPS configuration may be for a first cell (e.g., a first BWP of the first cell) and the wireless device may receive the first transport block via the first cell/BWP and based on first configuration parameters of the SPS configuration associated with the first SPS configuration index. The wireless device may receive one or more first transport blocks, comprising the first transport bock, via the first cell and the one or more first transport blocks may be associated with the first configuration index. The first transport blocks may be received with a first timing and may have a first relative position (e.g., 1st in the one or more first transport blocks, 2nd in the one or more first transport blocks, 3rd in the one or more first transport blocks) in the one or more first transport blocks. The wireless device may determine the first position of the non-deferred HARQ feedback, for the first transport block in the first plurality of transport blocks with non-deferred HARQ feedbacks, based on the first configuration index, the first cell and the first timing/first relative position of the first transport blocks in the one or more first transport blocks received via the first cell and associated with the first configuration index. The second transport block may be associated with a second SPS configuration index. For example, a second activation DCI may indicate activation of a SPS configuration with the second SPS configuration index and may indicate a plurality of SPS resources comprising a second SPS resource for the second transport block. The second SPS configuration may be for a second cell (e.g., a second BWP of the second cell) and the wireless device may receive the second transport block via the second cell/BWP and based on second configuration parameters of the SPS configuration associated with the second SPS configuration index. The wireless device may receive one or more second transport blocks, comprising the second transport bock, via the second cell and the one or more second transport blocks may be associated with the second configuration index. The second transport blocks may be received with a second timing and may have a second relative position (e.g., 1st in the one or more second transport blocks, 2nd in the one or more second transport blocks, 3rd in the one or more second transport blocks) in the one or more second transport block. The wireless device may determine the second position of the deferred HARQ feedback, for the second transport block in the second plurality of transport blocks with deferred HARQ feedbacks, based on the second configuration index, the second cell and the second timing/second relative position of the second transport blocks in the one or more second transport blocks received via the second cell and associated with the second configuration index. In an example, the second position may be further based on the first position. For example, the second position may be after the first position. For example, the second position may be before the first position.

In an example embodiment, a wireless device may determine a first position of a non-deferred HARQ feedback, for a first transport block, in non-deferred HARQ feedbacks of one or more first transport blocks. The one or more first transport blocks, with non-deferred HARQ feedbacks, may be associated with an SPS configuration index and may be received on a cell. The wireless device may determine a second position of a deferred HARQ feedback, for a second transport block, in deferred HARQ feedbacks of one or more second transport blocks. The one or more second transport blocks, with deferred HARQ feedbacks, may be associated with the SPS configuration index and may be received on the cell. The first transport block may be received with a first timing and may have a first relative position (e.g., 1st in the one or more first transport blocks, 2nd in the one or more first transport blocks, 3rd in the one or more first transport blocks, etc.) in the one or more first transport blocks. The wireless device may determine the first position of the non-deferred HARQ feedback, for the first transport block, in the non-deferred HARQ feedbacks of the one or more first transport blocks, based on the first timing/first relative position of the first transport blocks in the one or more first transport blocks. The second transport block may be received with a second timing and may have a second relative position (e.g., 1st in the one or more second transport blocks, 2nd in the one or more second transport blocks, 3rd in the one or more second transport blocks, etc.) in the one or more second transport blocks. The wireless device may determine the second position of the deferred HARQ feedback, for the second transport block, in the deferred HARQ feedbacks of the one or more second transport blocks based on the second timing/second relative position of the second transport blocks in the one or more second transport blocks. In an example, the second position may be further based on the first position. For example, the second position may be after the first position. For example, the second position may be before the first position.

In an example embodiment, a wireless device may determine a first position of a non-deferred HARQ feedback, for a first transport block, in non-deferred HARQ feedbacks of one or more first transport blocks. The one or more first transport blocks, with non-deferred HARQ feedbacks, may be received on a cell. The wireless device may determine a second position of a deferred HARQ feedback, for a second transport block, in deferred HARQ feedbacks of one or more second transport blocks. The one or more second transport blocks, with deferred HARQ feedbacks, may be received on the cell. The first transport block may be received with a first timing and may have a first relative position (e.g., 1st in the one or more first transport blocks, 2nd in the one or more first transport blocks, 3rd in the one or more first transport blocks, etc.) in the one or more first transport blocks. The first transport block may be associated with a first SPS configuration index. The wireless device may determine the first position of the non-deferred HARQ feedback, for the first transport block, in the non-deferred HARQ feedbacks of the one or more first transport blocks, based on the first timing/first relative position of the first transport blocks in the one or more first transport blocks and the first configuration index associated with the first transport block. The second transport block may be received with a second timing and may have a second relative position (e.g., 1st in the one or more second transport blocks, 2nd in the one or more second transport blocks, 3rd in the one or more second transport blocks, etc.) in the one or more second transport blocks. The second transport block may be associated with a second SPS configuration index. The wireless device may determine the second position of the deferred HARQ feedback, for the second transport block, in the deferred HARQ feedbacks of the one or more second transport blocks, based on the second timing/second relative position of the second transport blocks in the one or more second transport blocks and the second configuration index associated with the second transport block. In an example, the second position may be further based on the first position. For example, the second position may be after the first position. For example, the second position may be before the first position.

The wireless device may determine an ordered plurality of HARQ feedbacks based on positions of the plurality of HARQ feedbacks comprising the first position of the non-deferred HARQ feedback and the second position of the deferred HARQ feedback. The wireless device may transmit the ordered plurality of HARQ feedbacks using an uplink channel. In an example, the wireless device may transmit the ordered plurality of HARQ feedbacks using an uplink control channel. In an example, the wireless device may transmit the ordered plurality of HARQ feedbacks using an uplink shared channel. In an example, the wireless device may transmit the ordered plurality of HARQ feedbacks in a first timing. The wireless device may construct a HARQ feedback codebook comprising the ordered plurality of HARQ feedbacks and may transmit the HARQ feedback codebook in the first timing. The first timing may be a first slot or one or more symbols within a first slot. The transport blocks with deferred HARQ feedbacks may be received on or after a time window or within a time window before the first timing of transmission of the HARQ feedback codebook. The wireless device may determine the deferred HARQ feedbacks for including in the HARQ feedback codebook, based on the transport blocks, corresponding to the deferred HARQ feedbacks, being received on or after the time window before the first timing. The time window may comprise a first number of slots/symbols. In an example, the time window may have a pre-determined/pre-configured value. In an example, the wireless device may receive configuration parameters (e.g., RRC configuration parameters) indicating the time window.

Figure 21:
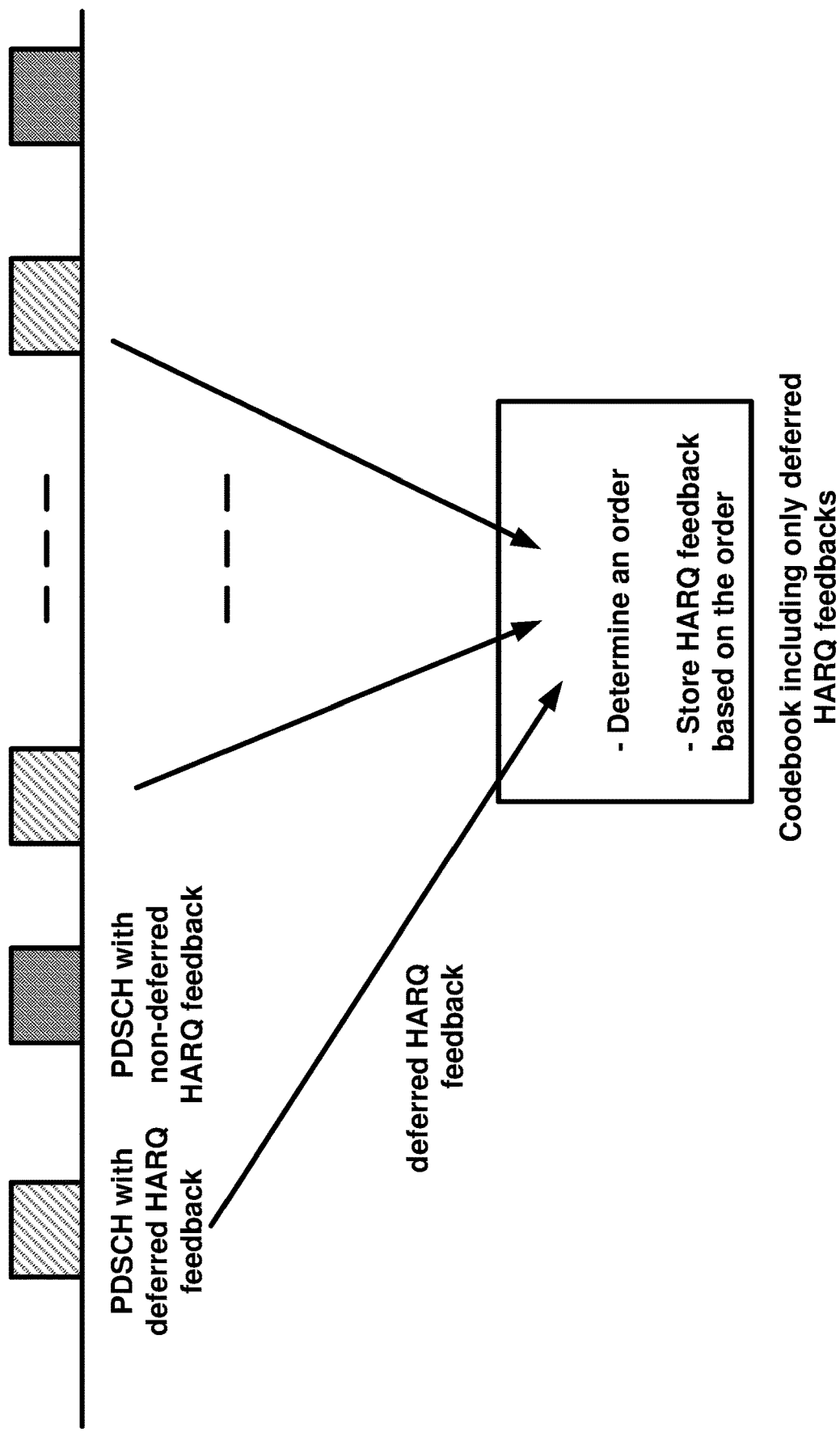
FIG. 21 shows an example process in accordance with several of various embodiments of the present disclosure.
Figure 22:
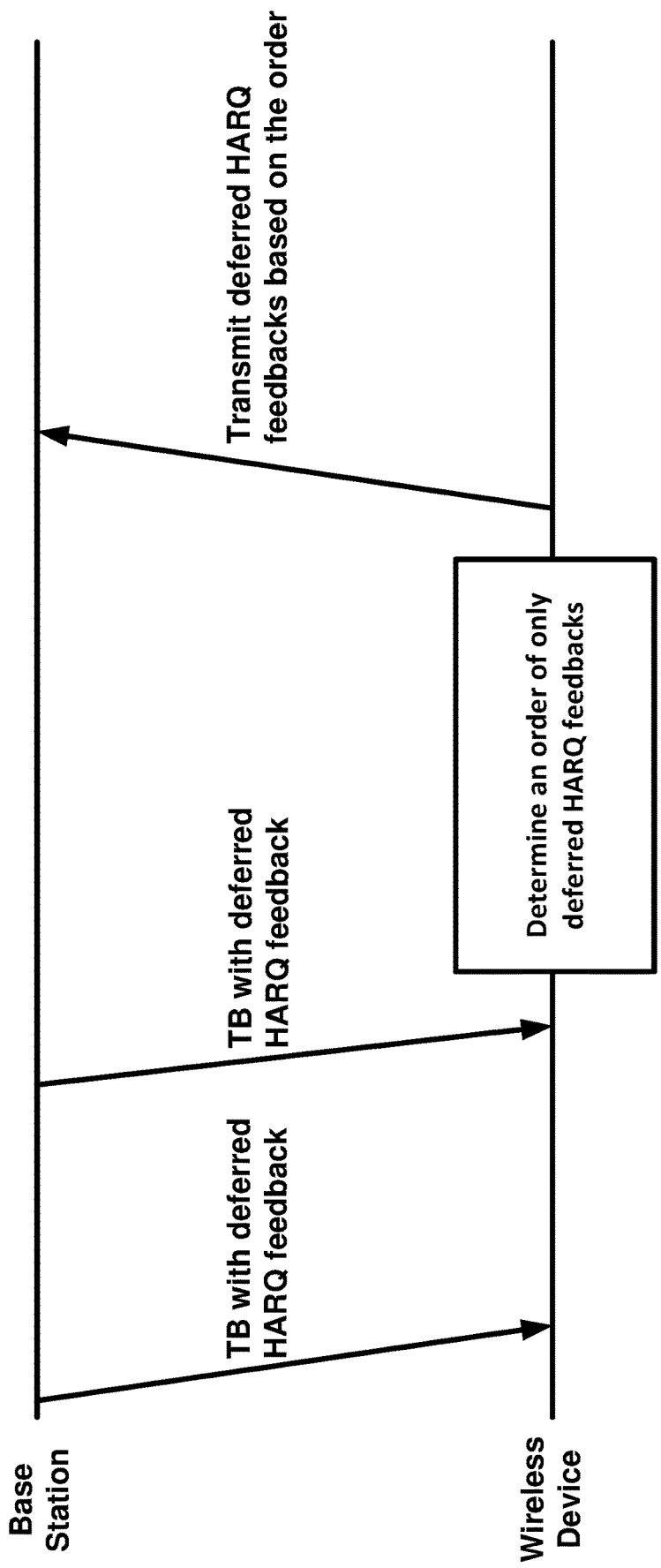
FIG. 22 shows an example process in accordance with several of various embodiments of the present disclosure.

In an example embodiment, as shown in FIG. 21 and FIG. 22, a wireless device may receive a plurality of transport blocks via a downlink shared channel (e.g., PDSCH). The wireless device may defer the HARQ feedbacks associated with the plurality of transport blocks. The plurality of HARQ feedbacks may be referred to as deferred HARQ feedbacks. The wireless device may construct a HARQ feedback codebook comprising the deferred HARQ feedbacks and may transmit the HARQ feedback codebook using an uplink channel (e.g., a PUCCH). In an example, the HARQ feedback codebook may comprise only the deferred HARQ feedbacks. In an example, the HARQ feedback codebook may not comprise a non-deferred HARQ feedback. The wireless device may determine a position of each deferred HARQ feedback, in the deferred HARQ feedbacks, and may determine ordered deferred HARQ feedbacks based on the determined positions of the deferred HARQ feedbacks. The wireless device may construct the HARQ feedback codebook based on the ordered deferred HARQ feedbacks. A deferred HARQ feedback may be associated with a transport block in the plurality of transport blocks. The transport block may be associated with a SPS configuration with a SPS configuration index. For example, the SPS configuration parameters associated with the SPS configuration may indicate the SPS configuration index. For example, an SPS activation DCI indicating the activation of the SPS configuration and activating a plurality of SPS resources, comprising a first SPS resource for the transport block, may indicate the first SPS configuration. The wireless device may receive the transport blocks via a cell (e.g., a BWP of the cell). For example, the SPS configuration may be configured for the cell (e.g., the BWP of the cell). The transport block may be received with a timing in one or more first transport blocks, of the plurality of transport blocks that are associated with the SPS configuration index and received on the cell. The transport block may be received with a relative position (e.g., 1st in the one or more first transport blocks, 2nd in the one or more first transport blocks, 3rd in the one or more first transport blocks, etc.) in the one or more first transport blocks of the plurality of transport blocks that are associated with the SPS configuration index and received on the cell. The position of a deferred HARQ feedback of the transport block, in the deferred HARQ feedbacks of the plurality of transport blocks, may be based on the SPS configuration index, the cell on which the transport block is received and the timing of the transport block in the one or more first transport blocks that are associated with the SPS configuration index and are received on the cell.

The wireless device may transmit the HARQ feedback codebook in the first timing. The first timing may be a first slot or one or more symbols within a first slot. The transport blocks with deferred HARQ feedbacks may be received on or after a time window or within a time window before the first timing of transmission of the HARQ feedback codebook. The wireless device may determine the deferred HARQ feedbacks for including in the HARQ feedback codebook, based on the plurality of transport blocks, corresponding to the deferred HARQ feedbacks, being received on or after the time window before the first timing. The time window may comprise a first number of slots/symbols. In an example, the time window may have a pre-determined/pre-configured value. In an example, the wireless device may receive configuration parameters (e.g., RRC configuration parameters) indicating the time window.

Figure 23:
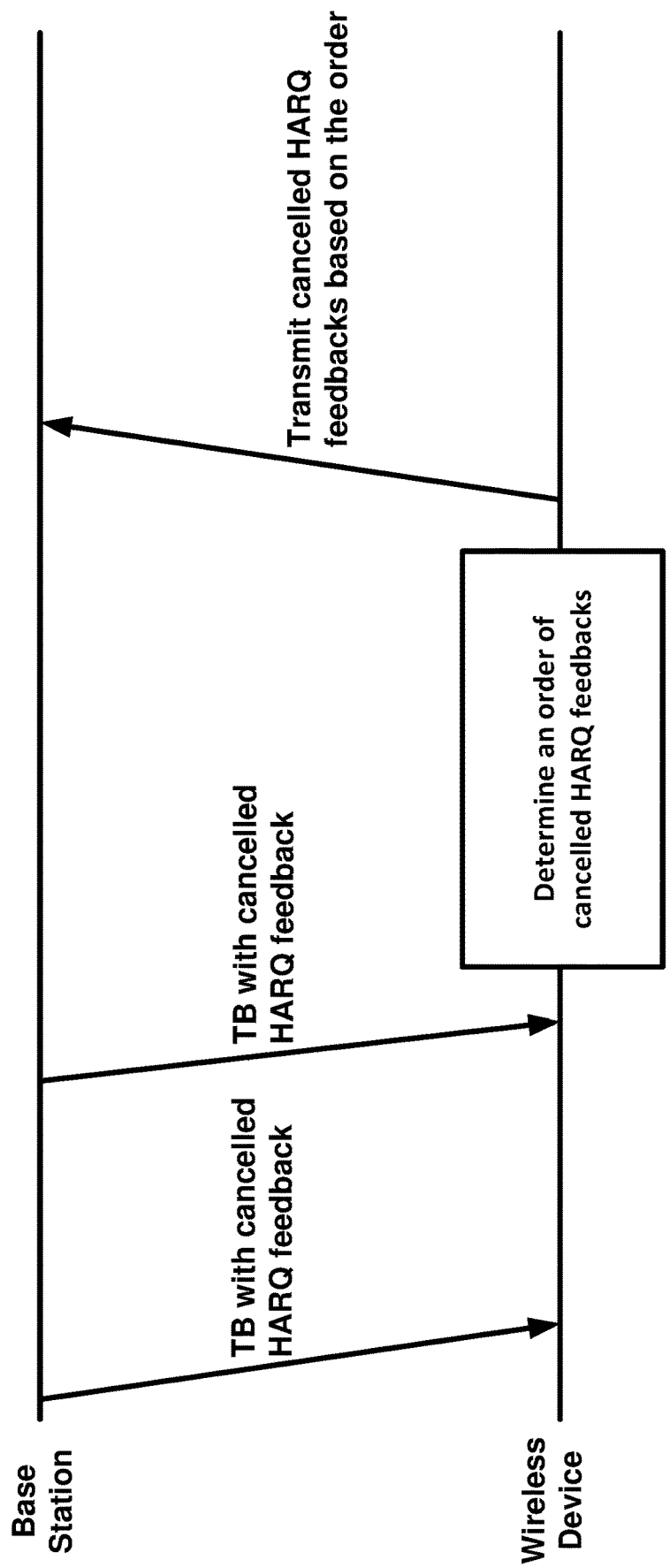
FIG. 23 shows an example process in accordance with several of various embodiments of the present disclosure.

In an example embodiment as shown in FIG. 23, a wireless device may receive a plurality of transport blocks. A plurality of HARQ feedbacks, of the plurality of transport blocks, may be cancelled and/or dropped. For example, at least some of the plurality of HARQ feedbacks may be cancelled/dropped in response to at least some of the plurality of HARQ feedbacks colliding with one or more high priority uplink channels and/or one or more first timings for transmissions of at least some of the plurality of HARQ feedbacks overlapping (in one or more symbols) with one or more second timings for transmissions of high priority uplink channels (e.g., one or more high priority PUSCH, one or more high priority PUCCH, etc.). For example, at least some of the one or more transport blocks, may be associated with lower priority compared to the higher priority associated with the one or more high priority channels. For example, at least some of the one or more transport blocks may be associated with a first service type (e.g., enhanced mobile broadband (eMBB) service type) and the one or more high priority uplink channels may be associated with a second service type (e.g., ultra-reliable low-latency communications (URLLC) type). For example, the wireless device may receive cancellation signaling (e.g., one or more cancellation DCIs) indicating cancellation of one or more channels carrying at least some of the plurality of HARQ feedbacks. The wireless device may drop/cancel transmission of at least some of the plurality of HARQ feedbacks in response to receiving the cancellation signaling.

The wireless device may construct a HARQ feedback codebook comprising the previously cancelled/dropped HARQ feedbacks and may transmit the HARQ feedback codebook using an uplink channel (e.g., a PUCCH). In an example, the HARQ feedback codebook may comprise only the previously cancelled/dropped HARQ feedbacks. In an example, the HARQ feedback codebook may not comprise a non-cancelled/dropped HARQ feedback. The wireless device may determine a position of each previously cancelled/dropped HARQ feedback, in the previously cancelled/dropped HARQ feedbacks, and may determine ordered previously cancelled/dropped HARQ feedbacks based on the determined positions of the previously cancelled/dropped HARQ feedbacks. The wireless device may construct the HARQ feedback codebook based on the ordered previously cancelled/dropped HARQ feedbacks.

A previously cancelled/dropped HARQ feedback may be associated with a transport block in the plurality of transport blocks. The wireless device may receive the transport blocks via a cell (e.g., a BWP of the cell). The transport block may be received with a timing in one or more first transport blocks, of the plurality of transport blocks that are received via the cell (e.g., the BWP of the cell). The transport block may be received with a relative position (e.g., 1st in the one or more first transport blocks, 2nd in the one or more first transport blocks, 3rd in the one or more first transport blocks, etc.) in the one or more first transport blocks of the plurality of transport blocks that are received via the cell (e.g., the BWP of the cell). The transport block may be associated with a HARQ process identifier. For example, a DCI scheduling the transport block may indicate the HARQ process identifier.

In an example embodiment. the position of a previously cancelled/dropped HARQ feedback of the transport block, in the previously cancelled/dropped HARQ feedbacks of the plurality of transport blocks, may be based on the cell/BWP on which the transport block is received and the timing of the transport block in the one or more first transport blocks of the plurality of transport blocks that are received via the cell (e.g., the BWP of the cell).

In an example embodiment, the position of a previously cancelled/dropped HARQ feedback of the transport block, in the previously cancelled/dropped HARQ feedbacks of the plurality of transport blocks, may be based on the cell/BWP on which the transport block is received and the HARQ process identifier associated with the transport block.

In an example embodiment, a wireless device may receive one or more messages (e.g., one or more RRC messages)

comprising configuration parameters. The configuration parameters may comprise discontinuous reception (DRX) configuration parameters. The DRX configuration parameters may comprise a first value of a HARQ round-trip-time (HARQ RTT) timer and a second value of a DRX retransmission timer. The wireless device may receive a downlink transport block. The wireless device may receive a DCI comprising scheduling information for (e.g. indicating radio resources for reception of) the downlink transport block. The DCI may comprise a field indicating a first timing for transmission of HARQ feedback of the transport block. For example, a PDSCH-to-HARQ feedback timing field of the DCI may indicate the first timing for transmission of the HARQ feedback of the transport block. For example, the PDSCH-to-HARQ feedback timing field of the DCI may indicate a duration between the reception of the downlink transport block and the first timing for scheduled transmission of the HARQ feedback of the transport block. The wireless device may determine to drop/cancel the scheduled HARQ feedback of the transport block at a first timing. The wireless device may drop/cancel scheduled transmission of a HARQ feedback at the first timing in response to the first timing overlapping with a second timing of transmission of a high priority uplink channel. For example, the downlink transport block may be associated with a first service type (e.g., an enhanced mobile broadband (eMBB) service type) and the high priority uplink channel may be associated with a second service type (e.g., an ultra-reliable low-latency communications (URLLC) service type). In an example, the wireless device may determine to drop/cancel scheduled transmission of a HARQ feedback in response to receiving a cancellation signaling (e.g., a cancellation DCI) indicating cancellation of transmission of an uplink channel carrying the HARQ feedback. The wireless device may determine to transmit the HARQ feedback at a second timing instead of the first timing.

Figure 24:
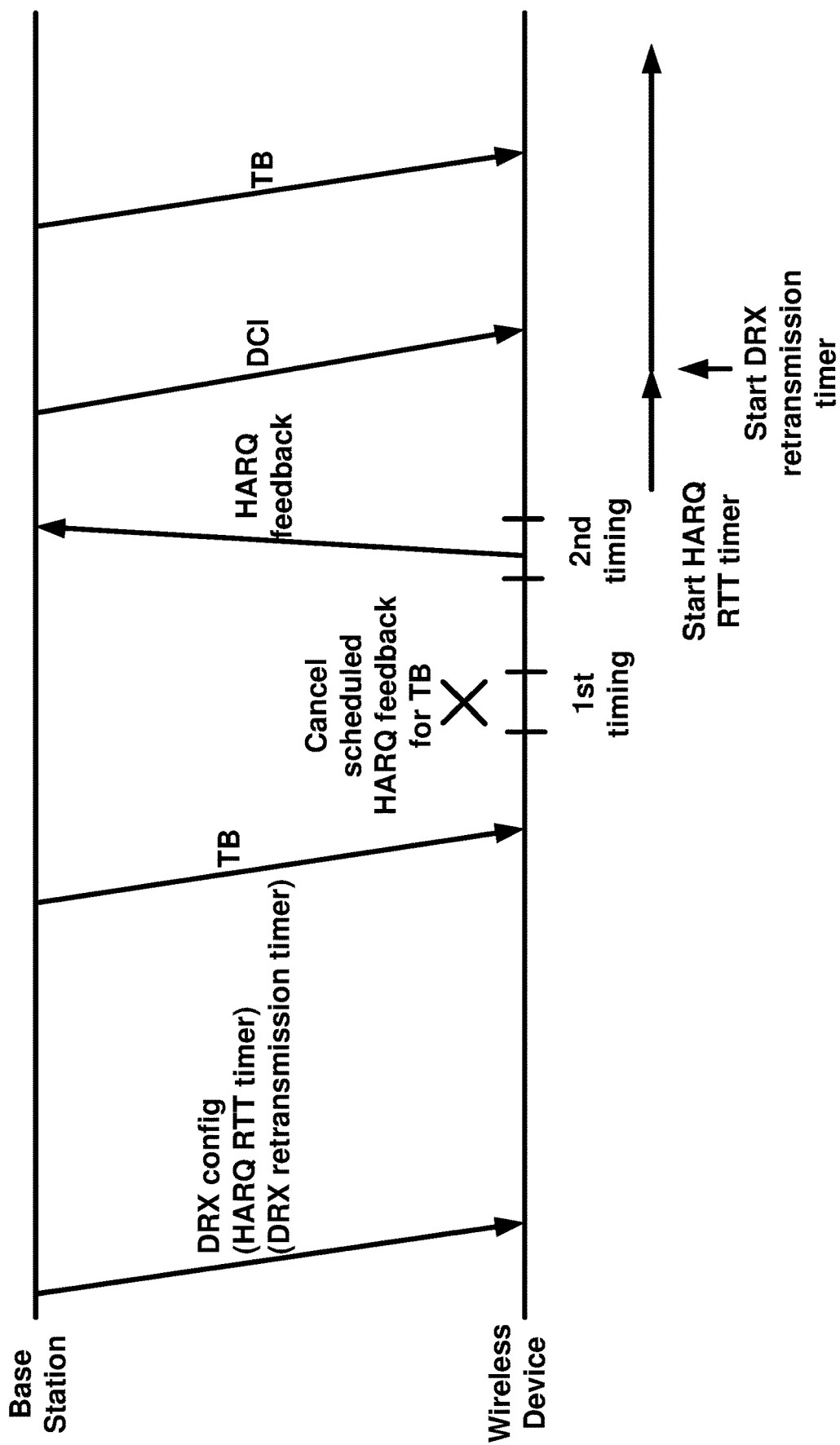
FIG. 24 shows an example process in accordance with several of various embodiments of the present disclosure.

In an example embodiment as shown in FIG. 24, the wireless device may determine to transmit the HARQ feedback at the second timing instead of the first timing based on receiving an indication (e.g., a DCI) indicating the second timing. For example, the wireless device may receive a DCI comprising a field and a value of the field may indicate the second timing. The wireless device may determine that the DCI is for indicating a timing for a cancelled HARQ feedback based on a format of the DCI and/or an RNTI associated with the DCI and/or a value of a field of the DCI. The wireless device may start the HARQ RTT timer with the first value, indicated by the DRX configuration parameters, in a first (e.g., earliest symbol) after the transmission of the HARQ feedback in the second timing. The wireless device may start the DRX retransmission timer with the second value, indicated by the DRX configuration parameters, based on the HARQ RTT timer expiring. The wireless device may be in a DRX Active time and may monitor a control channel while the DRX retransmission timer running. The wireless device may receive a DCI based on monitoring the control channel while the DRX retransmission timer running. The DCI may indicate a retransmission of the transport block. For example, the HARQ feedback, transmitted in the second timing, may be a negative acknowledgement indicating incorrect reception of the transport block. The DCI may comprise scheduling information for retransmission of the transport block and the wireless device may receive the retransmission of the transport block based on the scheduling information indicated by the DCI.

Figure 25:
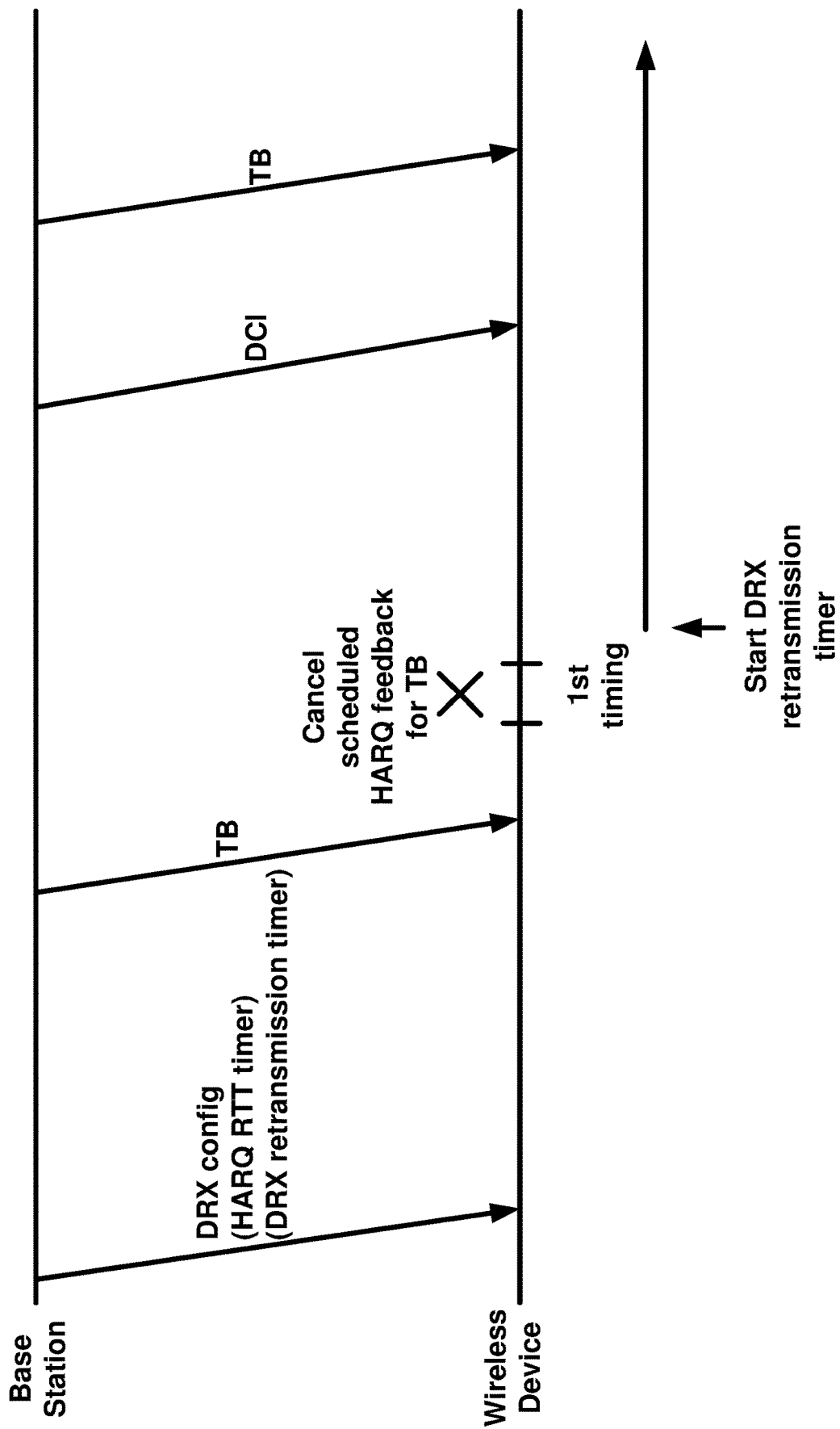
FIG. 25 shows an example process in accordance with several of various embodiments of the present disclosure.

In an example embodiment as shown in FIG. 25, the wireless device may start the DRX retransmission timer, with the second value indicated by the DRX configuration parameters, in a first (e.g., earliest) symbol after the first timing of the scheduled and dropped HARQ feedback. The wireless device may be in a DRX Active time and may monitor a control channel while the DRX retransmission timer running. The wireless device may receive a DCI based on monitoring the control channel while the DRX retransmission timer running. The DCI may indicate a retransmission of the transport block. The DCI may comprise scheduling information for retransmission of the transport block and the wireless device may receive the retransmission of the transport block based on the scheduling information indicated by the DCI.

In an example embodiment, a wireless device may receive one or more messages comprising first configuration parameters, of a first serving cell, indicating a plurality of serving cells for transmission of HARQ feedback of a downlink transport block received via the first serving cell. The wireless device may receive a downlink control information indicating: scheduling information for receiving a transport block via the first serving cell; and a second serving cell in the plurality of serving cells. The wireless device may receive the transport block based on the scheduling information. The wireless device may transmit a first HARQ feedback, associated with the transport block, via an uplink control channel of the second serving cell indicated by the downlink control information.

In an example, the downlink control information may comprise a field with a value indicating the second serving cell.

In an example, the first configuration parameters may comprise a physical downlink shared channel serving cell configuration information element indicating the plurality of serving cells for transmission of HARQ feedback of a downlink transport block received on the first serving cell.

In an example, the one or more messages may comprise second configuration parameters, of uplink control channel, that are common among the plurality of serving cells. In an example, the transmitting the first HARQ feedback may be based on the second configuration parameters, of uplink control channel, that are common among the plurality of serving cells.

In an example, the one or more messages may comprise respective uplink control channel configuration parameters for each of the plurality of serving cells. The transmitting the first HARQ feedback may be based on uplink control channel configuration parameters of the second serving cell.

In an example, the first configuration parameters may comprise a respective index associated with each serving cell in the plurality of serving cell. The downlink control information may comprise a field, the value of the field being the index associated with the second serving cell.

In an example, the transmitting a first HARQ feedback may be via an uplink control channel of an active bandwidth part of the second serving cell indicated by the downlink control information.

In an example, the downlink control information may comprise a second field with a second value indicating a bandwidth part of the second serving cell. In an example, the wireless device may switch an active bandwidth part of the second serving cell based on the bandwidth part of the second serving cell, indicated by the downlink control information, being different from a current active bandwidth part of the second serving cell.

In an example, the one or more messages may indicate a plurality of uplink control channel groups. The plurality of serving cells for transmission of HARQ feedback may be in a same uplink control channel group.

In an example, the one or more messages may indicate a plurality of uplink control channel groups. The plurality of serving cells, for transmission of HARQ feedback, may comprise a first cell in a first uplink control channel group and a second cell in a second uplink control channel group.

In an example, the one or more messages may indicate a first uplink control channel group and a second uplink control channel group. The downlink control information may indicate one of the first uplink control channel group and a second uplink control channel group. The second serving cell may be a cell configured with uplink control channel in the indicated uplink control channel group. In an example, the downlink control information may comprise a field with a value indicating an identifier of the indicated uplink control channel group. In an example, the first serving cell, that the transport block is received, may be in the first uplink control channel group. The downlink control information may comprise a field with a value indicating one of: the first uplink control channel group; and the second uplink control channel group. In an example, the field may comprise one or more bits; a first value of the one or more bits may indicate the first uplink control channel group; and a second value of the one or more bits may indicate the second uplink control channel group.

In an example embodiment, a wireless device may receive a plurality of transport blocks comprising one or more first transport blocks and one or more second transport blocks, wherein: one or more first HARQ feedbacks associated with the one or more first transport blocks may be deferred HARQ feedbacks; and one or more second HARQ feedbacks associated with the one or more second transport blocks may be non-deferred HARQ feedbacks. The wireless device may determine an order for the deferred HARQ feedbacks and the non-deferred HARQ feedbacks. The wireless device may construct a HARQ feedback codebook comprising the deferred HARQ feedbacks and the non-deferred HARQ feedbacks based on the determined order. The wireless device may transmit the HARQ feedback codebook using an uplink channel.

In an example, the wireless device may receive one or more first DCIs comprising scheduling information for the one or more first transport blocks, wherein: the one or more first DCIs indicate one or more first timings for transmission of the one or more first HARQ feedbacks; and the one or more first HARQ feedbacks may be deferred HARQ feedbacks based on the one or more first timings colliding with one or more downlink symbols or flexible symbols.

In an example, the wireless device may receive one or more second DCIs comprising scheduling information for the one or more second transport blocks, wherein: the one or more second DCIs indicate a first HARQ feedback timing; and the first timing is a timing of the transmission of the HARQ feedback codebook.

In an example embodiment, a wireless device may determine: a first position of a non-deferred HARQ feedback, for a first transport block in a first plurality of transport blocks with non-deferred HARQ feedbacks; and a second position of a deferred HARQ feedback, for a second transport block in a second plurality of transport blocks with deferred HARQ feedbacks. The wireless device may determine the first position based on: a first SPS configuration index associated with the first transport block; a first cell on which the first transport block is received; and a first timing of the first transport block in one or more first transport blocks, of the first plurality of transport blocks with non-deferred HARQ feedback, that are associated with the first SPS configuration index and are transmitted on the first cell. The wireless device may determine the second position based on: a second SPS configuration index associated with the second transport block; a second cell on which the second transport block is received; and a second timing of the second transport block in one or more second transport blocks, of the second plurality of transport blocks with deferred HARQ feedbacks, that are associated with the second SPS configuration index and are transmitted on the second cell. The wireless device may determine an ordered plurality of HARQ feedbacks based on the first position and the second position. The wireless device may transmit the ordered plurality of HARQ feedbacks using an uplink channel.

In an example embodiment, a wireless device may determine: a first position of a non-deferred HARQ feedback for a first transport block in one or more first transport blocks with non-deferred HARQ feedbacks that are associated with an SPS configuration index and are received on a cell; and a second position of a deferred HARQ feedback for a second transport block in one or more second transport blocks with deferred HARQ feedbacks that are associated with the SPS configuration index and are received on the cell. The first position may be based on a first timing of the first transport block in the one or more first transport blocks. The second position may be based on a second timing of the second transport block in the one or more second transport blocks. The wireless device may determine an ordered plurality of HARQ feedbacks based on the first position and the second position. The wireless device may transmit the ordered plurality of HARQ feedbacks.

In an example embodiment, a wireless device may determine a first position of a non-deferred HARQ feedback for a first transport block in one or more first transport blocks with non-deferred HARQ feedbacks that are received on a cell; and a second position of a deferred HARQ feedback for a second transport block in one or more second transport blocks with deferred HARQ feedbacks that are received on the cell. The first position may be determined based on: a first SPS configuration index associated with the first transport block; and a first timing of the first transport block in one or more third transport blocks, of the one or more first transport blocks, that are associated with the first SPS configuration index. The second position may be determined based on: a second SPS configuration index associated with the second transport block; and a second timing of the second transport block in one or more fourth transport blocks, of the one or more second transport blocks, that are associated with the second SPS configuration index. The wireless device may determine an ordered plurality of HARQ feedbacks based on the first position and the second position. The wireless device may transmit the ordered plurality of HARQ feedbacks.

In an example, the second position may further be based on the first position. In an example, the second position may be after the first position. In an example, the second position may be before the first position.

In an example, the transmitting the ordered plurality of HARQ feedbacks may be via a PUCCH.

In an example, the transmitting the ordered plurality of HARQ feedbacks may be at a first timing. The transport blocks with deferred HARQ feedbacks may be received on or after a time window before the first timing. In an example, the time window may have a pre-determined/pre-configured value. In an example, the wireless device may receive configuration parameters indicating the time window. In an example, the time window may be a first number of slots/symbols. In an example, the first timing may be a first slot and/or one or more first symbols within a first slot.

In an example embodiment, a wireless device may determine a plurality of positions, for deferred HARQ feedbacks associated with a plurality of transport blocks, a position of a deferred HARQ feedback, associated with a transport block in the plurality of transport blocks, being based on: an SPS configuration index associated with the transport block; a cell on which the transport block is received; and a timing of the transport block in one or more first transport blocks, of the plurality of transport blocks, that are associated with the SPS configuration index and are received on the cell. The wireless device may determine ordered deferred HARQ feedbacks based on the plurality of positions. The wireless device may transmit the ordered deferred HARQ feedbacks.

In an example, a HARQ feedback codebook, comprising the ordered deferred HARQ feedbacks, may comprise only the ordered deferred HARQ feedbacks and may not comprise a non-deferred HARQ feedback.

In an example embodiment, a wireless device may determine a plurality of positions, for a plurality of cancelled/dropped HARQ feedbacks associated with a plurality of transport blocks, wherein a first position of a first cancelled/dropped HARQ feedback, for a first transport block in the plurality of transport blocks, may be based on: a cell on which the first transport block is received; and a timing of the first transport block in one or more first transport blocks of the plurality of transport blocks that are received on the cell. The wireless device may determine an ordered plurality of cancelled/dropped HARQ feedbacks based on the plurality of positions. The wireless device may transmit the ordered plurality of cancelled/dropped HARQ feedbacks.

In an example embodiment, a wireless device may determine a plurality of positions, for a plurality of cancelled/dropped HARQ feedbacks associated with a plurality of transport blocks, wherein a first position of a first cancelled/dropped HARQ feedback, for a first transport block in the plurality of transport blocks, may be based on: a cell on which the first transport block is received; and a HARQ process identifier associated with the transport block. The wireless device may determine an ordered plurality of cancelled/dropped HARQ feedbacks based on the plurality of positions. The wireless device may transmit the ordered plurality of cancelled/dropped HARQ feedbacks.

In an example, a cancelled/dropped HARQ feedback, in the plurality of cancelled/dropped HARQ feedbacks, may be cancelled/dropped in response to overlapping with a high priority uplink channel.

In an example, the wireless device may receive a DCI indicating uplink cancellation, wherein a cancelled/dropped HARQ feedback, in the plurality of cancelled/dropped HARQ feedbacks, is cancelled/dropped in response to the uplink cancellation.

In an example embodiment, a wireless device may receive discontinuous reception (DRX) configuration parameters comprising a first value of a HARQ RTT timer and a second value of a DRX retransmission timer. The wireless device may determine to drop/cancel scheduled transmission of a HARQ feedback, associated with a downlink transport block, at a first timing. The wireless device may transmit the HARQ feedback at a second timing instead of the first timing. The wireless device may start the HARQ RTT timer with the first value in a first/earliest symbol after the second timing. The wireless device may start the DRX retransmission timer based on the HARQ RTT timer expiring. The wireless device may monitor a control channel while the DRX retransmission timer is running. The wireless device may receive a downlink control information, based on the monitoring, indicating a retransmission of the transport block. The wireless device may receive the retransmission of the transport block based on the downlink control information.

In an example, the determining to drop/cancel scheduled transmission of a HARQ feedback at the first timing may be in response to the first timing overlapping with a second timing of transmission of a high priority uplink channel.

In an example, the determining to drop/cancel scheduled transmission of a HARQ feedback at a first timing may be in response to receiving a cancellation signaling indicating cancellation of transmission an uplink channel carrying the HARQ feedback.

In an example, the wireless device may determine the second timing for transmission of the HARQ feedback.

In an example, the wireless device may receive an indication indicating the second timing. In an example, the indication may be via a first downlink control information. In an example, the first downlink control may comprise a field, a value of the field indicating the second timing. In an example, the first downlink control information may comprise a field, a value of the field indicating that the first downlink control information is for indicating the second timing.

In an example embodiment, a wireless device may receive discontinuous reception (DRX) configuration parameters comprising a value of a DRX retransmission timer. The wireless device may determine to drop/cancel scheduled transmission of a HARQ feedback, associated with a downlink transport block, at a first timing. The wireless device may start the DRX retransmission timer in a first (e.g., earliest) symbol after the first timing of the scheduled and dropped HARQ feedback. The wireless device may monitor a control channel while the DRX retransmission timer is running. The wireless device may receive a downlink control information, based on the monitoring, indicating a retransmission of the transport block. The wireless device may receive the retransmission of the transport block based on the downlink control information.

In an example, the determining to drop/cancel scheduled transmission of a HARQ feedback at the first timing may be in response to the first timing overlapping with a second timing of transmission of a high priority uplink channel.

In an example, the determining to drop/cancel scheduled transmission of a HARQ feedback at a first timing may be in response to receiving a cancellation signaling indicating cancellation of transmission of an uplink channel carrying the HARQ feedback.

A wireless device may transmit HARQ feedbacks (e.g., ACKs and/or NACKs) associated with received downlink transport blocks. A HARQ feedback, associated with a downlink TB, may be initially scheduled for transmission in a first timing. The downlink TB may be a semi-statistically scheduled TB (e.g., using a semi-persistent scheduling (SPS) configuration). The wireless device may defer the HARQ feedback, initially scheduled in the first timing, to a second timing, for example because valid uplink control channel resources not being available in the first timing. Existing HARQ feedback including HARQ feedback codebook construction processes may lead to a mismatch between the base station and the wireless resulting in degraded wireless device and wireless network performance, for example, degraded throughput. There is a need to enhance existing HARQ feedback including HARQ feedback codebook construction processes. Example embodiments may enhance existing HARQ feedback including HARQ feedback codebook construction processes.

Figure 26:
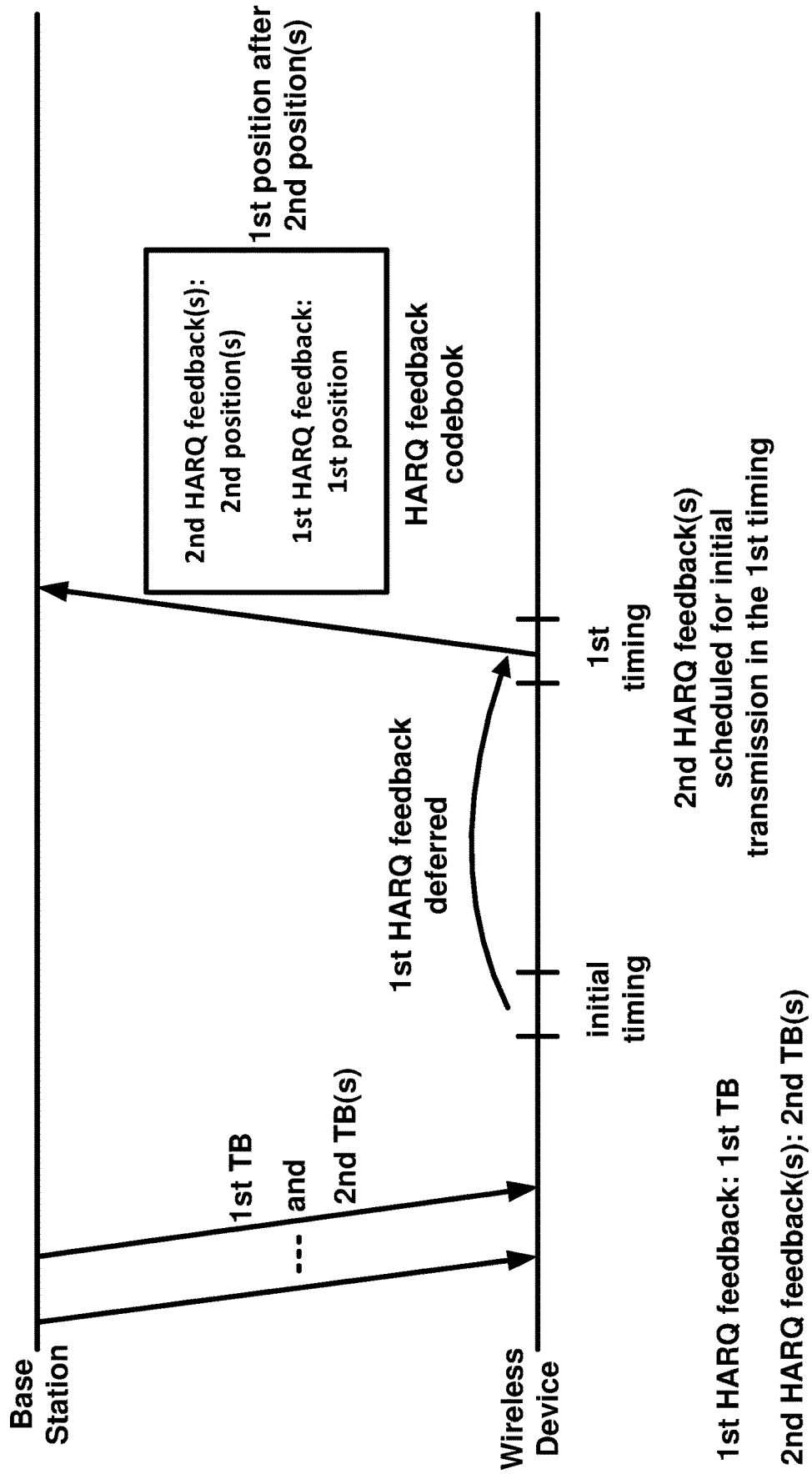
FIG. 26 shows an example process in accordance with several of various embodiments of the present disclosure.

In an example embodiment as shown in FIG. 26, a wireless device may receive one or more messages (e.g., one or more RRC messages) comprising configuration parameters. The configuration parameters may comprise configuration parameters of one or more cells. The configuration parameters may comprise configuration parameters of one or more semi-persistent scheduling (SPS) configurations. In an example, the configuration parameters may comprise uplink control channel configuration parameters. The uplink control channel configuration parameters may be used by the wireless device to determine uplink control channel resources and/or to transmit uplink control information via the uplink control channel resources. The wireless device may receive a plurality of downlink transport blocks (TBs) comprising a first TB and one or more second TBs. The plurality of downlink TBs may be received in one or more timings (e.g., slots, symbols, etc.).

The wireless device may determine a first HARQ feedback (e.g., a positive acknowledgement (ACK) or a negative acknowledgement (NACK)) associated with the first TB. The wireless device may determine an initial timing for transmission of the first HARQ feedback. For example, a DCI scheduling the first TB may comprise a PDSCH-to-HARQ feedback timing field with a value indicating a timing between a timing of reception of the first TB and the initial timing of the HARQ feedback associated with the first TB. The wireless device may determine the initial timing based on the timing of the reception of the first TB and the value of the PDSCH-to-HARQ feedback timing field of the scheduling DCI. In an example, the first TB may be a SPS TB associated with a SPS configuration. An SPS activation DCI, indicating activation of the SPS configuration, may comprise a PDSCH-to-HARQ feedback timing field with a value indicating a timing between a timing of reception of a TB, associated with the SPS configuration, and a corresponding HARQ feedback. The wireless device may determine the initial timing of the first HARQ feedback based on the timing of the reception of the first TB and the value of the PDSCH-to-HARQ feedback timing field of the SPS activation DCI.

The wireless device may determine to defer the first HARQ feedback from the initial timing to a first timing. For example, the wireless device may determine to defer the first HARQ feedback based on valid uplink control channel resources not being available in the initial timing. For example, the initial timing may comprise one or more downlink symbols. For example, the initial timing may comprise one or more flexible symbols. For example, the initial timing may have overlap with timing of a synchronization signal block (SSB). For example, the configuration parameters may comprise one or more PUCCH configuration parameters that may be used by the wireless device to determine valid uplink control channel resources and/or to determine whether valid uplink control channel resources are available in a timing (e.g., slot, sub-slot, one or more symbols, etc.). The wireless device may determine that valid uplink control channel resources are not available for transmission of the first HARQ feedback in the initial timing based on the one or more PUCCH configuration parameters. In an example, the first timing, to which the first HARQ feedback is deferred from the initial timing, may comprise valid uplink control channel resources. The wireless device may determine (e.g., based on the one or more PUCCH configuration parameters) that valid uplink control channel resources are available in the first timing. In an example, the wireless device may determine the first timing as an earliest timing with available uplink control channel resources.

The wireless device may determine one or more second HARQ feedbacks (e.g., one or more positive acknowledgements (ACKs) and/or one or more negative acknowledgements (NACKs)) associated with the one or more second TBs. The wireless device may determine the first timing for transmission of the one or more second HARQ feedbacks. The first timing may be for initial transmission (e.g., without deferral) of the one or more second HARQ feedbacks.

In an example, at least some of the one or more second TBs may be dynamically scheduled via one or more scheduling DCIs. The one or more scheduling DCIs may comprise PDSCH-to-HARQ feedback timing fields with values indicating timings between timings of reception of the at least some of the one or more second TBs and the first timing. The wireless device may determine the first timing based on the timings of the reception of the at least some of the one or more second TBs and values of the PDSCH-to-HARQ feedback timing fields of the corresponding scheduling DCIs.

In an example, at least some of the one or more second TBs may be semi-statically scheduled (e.g., may be SPS TBs) and may be associated with one or more SPS configurations. One or more SPS activation DCIs, indicating activation of the one or more SPS configurations, may comprise PDSCH-to-HARQ feedback timing fields with values indicating timings between the semi-statically scheduled TBs and corresponding HARQ feedbacks. The wireless device may determine the first timing based on the timings of the reception of the at least some of the one or more second TBs, associated with the one or more SPS configurations, and the values of the PDSCH-to-HARQ feedback timing fields of the SPS activation DCIs indicating activation of the one or more SPS configurations.

The wireless device may transmit a HARQ feedback codebook in the first timing. In an example, the wireless device may transmit the HARQ feedback codebook via an uplink control channel and using uplink control channel resources. The HARQ feedback codebook may comprise the first HARQ feedback and the one or more second HARQ feedbacks. Existing HARQ feedback including HARQ feedback construction processes may lead to mismatch between the wireless device and the base stations, e.g., mismatch in terms of the positions of the HARQ feedbacks in the HARQ feedback codebook. Example embodiments enhance the HARQ feedback including HARQ feedback construction processes.

The first HARQ feedback may be associated with a first position in the first HARQ feedback codebook. The one or more second HARQ feedbacks may be associated with one or more second positions in the HARQ feedback codebook. In an example embodiment, the first position of the first HARQ feedback, in the HARQ feedback codebook, may be after one or more second positions of the one or more second HARQ feedbacks in the HARQ feedback codebook (e.g., the first HARQ feedback may be appended to the one or more second HARQ feedbacks). The first position may be after the one or more second positions based on the first HARQ feedback being a deferred HARQ feedback. The first position may be after the one or more second positions based on the first HARQ feedback being a deferred HARQ feedback and the one or more second HARQ feedbacks being non-deferred HARQ feedbacks. The first position may be after the one or more second positions based on the first HARQ feedback being deferred from an initial timing to the first timing and based on the one or more second HARQ feedbacks being scheduled for initial transmission in the first timing. In an example, each HARQ feedback in the HARQ feedback codebook may be associated with an index. In an example, the first position may be based on a first index of the first HARQ feedback in the HARQ feedback codebook and the one or more second positions may be based on one or more second indexes of the one or more second HARQ feedbacks in the HARQ feedback codebook. The first position may be after the one or more second positions based on the first index being larger than the one or more second indexes.

In an example, the first HARQ feedback may be one of one or more first HARQ feedbacks that are deferred from one or more initial timings to the first timing. The one or more first HARQ feedbacks may be associated with one or more first TBs. One or more first positions of the one or more first HARQ feedbacks may be after the one or more second positions of the one or more second HARQ feedbacks (e.g., the one or more first HARQ feedbacks may be appended to the one or more second HARQ feedbacks). The wireless device may determine a first order of the one or more first HARQ feedbacks in the HARQ feedback codebook. The one or more first positions of the one or more first HARQ feedbacks may be based on the first order. The wireless device may determine the first order based on one or more timings that the one or more first TBs are received. The wireless device may determine the first order based on one or more cells that (via which) the one or more first TBs are received. The wireless device may determine the first order based on one or more configuration indexes of one or SPS configurations that the one or more first TBs are associated with. The wireless device may determine the first order based on the one or more timings that the one or more first TBs are received, the one or more cells that (via which) the one or more first TBs are received, and the one or more configuration indexes of one or SPS configurations that the one or more first TBs are associated with.

The wireless device may determine a second order of the one or more second HARQ feedbacks in the HARQ feedback codebook. In an example, the determining of the second order of the one or more second HARQ feedbacks may be independent of the first order of the one or more first HARQ feedbacks. The one or more second positions of the one or more second HARQ feedbacks may be based on the second order. The wireless may determine the second order based on one or more timings that the one or more second TBs are received. The wireless device may determine the second order based on one or more cells that (via which) the one or more second TBs are received. The wireless device may determine the second order based on the one or more timings that the one or more second TBs are received, and the one or more cells that (via which) the one or more second TBs are received. The wireless device may determine the second order based on one or more configuration indexes of one or SPS configurations that the one or more second TBs are associated with. The wireless device may determine the second order based on the one or more timings that the one or more second TBs are received, the one or more cells that (via which) the one or more second TBs are received, and the one or more configuration indexes of one or SPS configurations that the one or more second TBs are associated with.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 27:
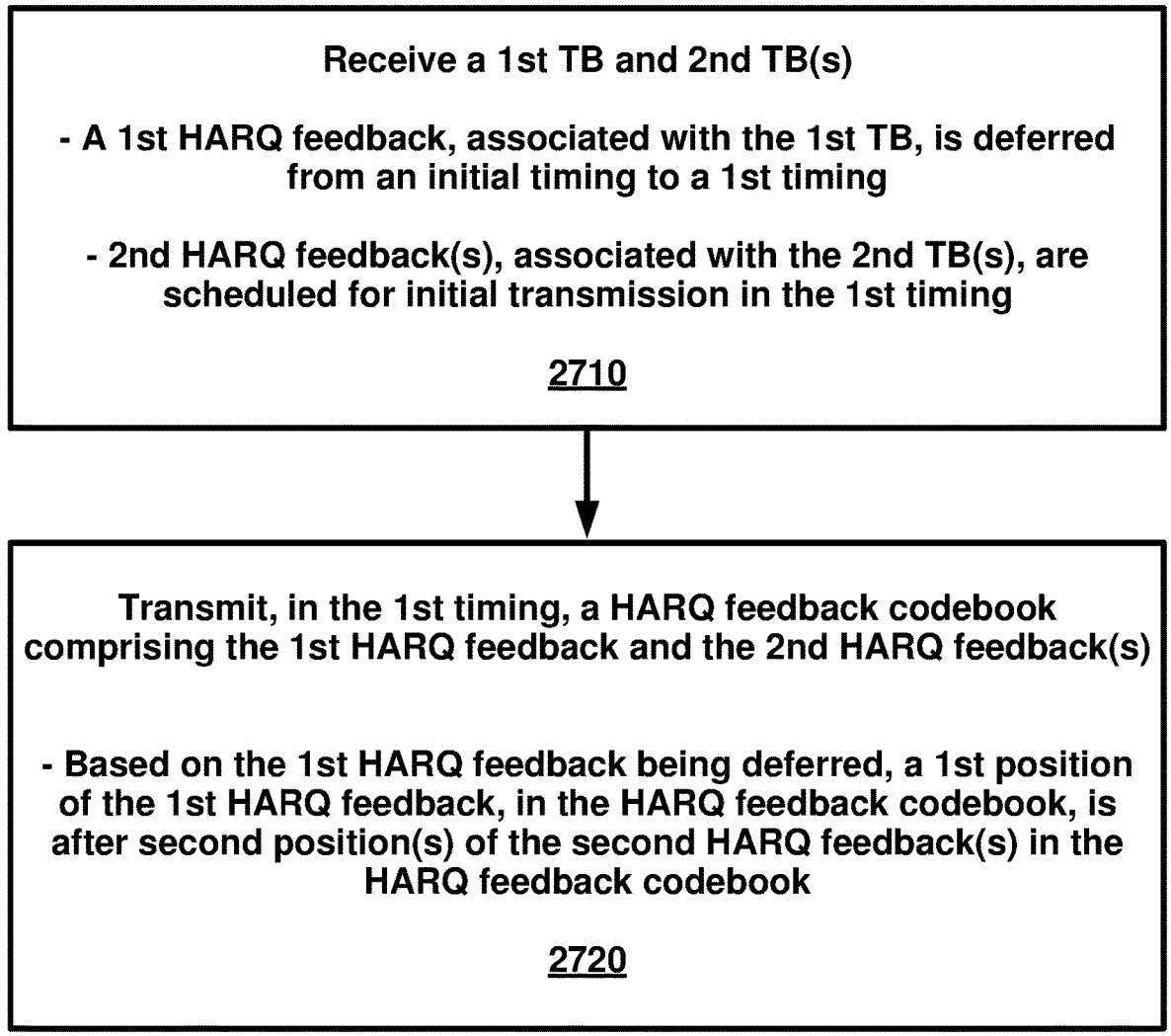
FIG. 27 shows an example flow diagram in accordance with several of various embodiments of the present disclosure.

FIG. 27 shows an example flow diagram in accordance with several of various embodiments of the present disclosure. At 2710, a wireless device may receive a first transport block (TB) and one or more second TBs. A first hybrid automatic repeat request (HARQ) feedback, associated with the first TB, may be deferred from an initial timing to a first timing. One or more second HARQ feedbacks, associated with the one or more second TBs, may be scheduled for initial transmission in the first timing. At 2720, the wireless device may transmit, in the first timing, a HARQ feedback codebook comprising the first HARQ feedback and the one or more second HARQ feedbacks. Based on the first HARQ feedback being deferred, a first position of the first HARQ feedback, in the HARQ feedback codebook, may be after one or more second positions of the one or more second HARQ feedbacks in the HARQ feedback codebook.

In an example embodiment, the first HARQ feedback may be deferred based on valid uplink control channel resources, for transmission of the first HARQ feedback, not being available in the initial timing.

In an example embodiment, the initial timing may comprise one or more downlink symbols.

In an example embodiment, the initial timing may comprise one or more flexible symbols.

In an example embodiment, the one or more second HARQ feedbacks may not be deferred. The one or more second HARQ feedbacks may be non-deferred HARQ feedbacks.

In an example embodiment, one or more first HARQ feedbacks, comprising the first HARQ feedback, may be deferred from one or more initial timings, comprising the initial timing, to the first timing. In an example embodiment, the wireless device may determine a first order of the one or more first HARQ feedbacks in the HARQ feedback codebook. In an example embodiment, one or more first positions, of the one or more first HARQ feedbacks in the HARQ feedback codebook, may be based on the first order. In example embodiment, the one or more first HARQ feedbacks may be associated with one or more first TBs comprising the first TB. The determining the first order may be based on: one or more semi-persistent scheduling (SPS) configuration indexes associated with the one or more first TBs; one or more cells that the one or more first TBs are received; and one or more timings of the one or more first TBs. In an example embodiment, the one or more first HARQ feedbacks may be appended to the one or more second HARQ feedbacks.

In an example embodiment, the wireless device may determine a second order of the one or more second HARQ feedbacks. The one or more second positions may be based on the second order. In an example embodiment, the second order may be based on: one or more cells that the one or more second TBs are received; and one or more timings of the one or more second TBs. In an example embodiment, the first HARQ feedback may be appended to the one or more second HARQ feedbacks. In an example embodiment, the second order may be based on one or more semi-persistent scheduling (SPS) configuration indexes associated with the one or more second TBs.

In an example embodiment, the first HARQ feedback may be appended to the one or more second HARQ feedbacks.

In an example embodiment, the first position may be after the one or more second positions further based on the one or second HARQ feedbacks being scheduled for initial transmission in the first timing.

Figure 28:
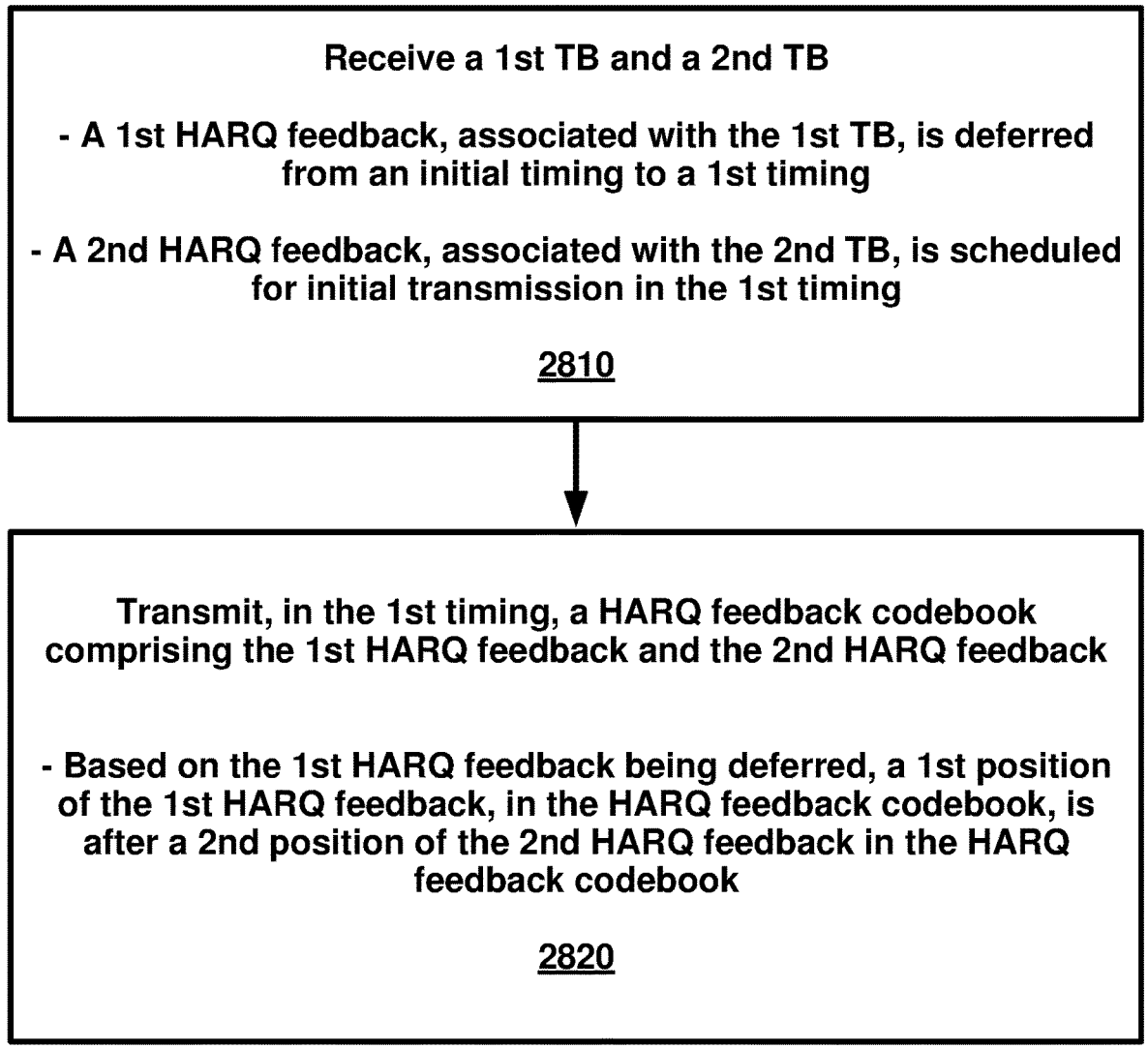
FIG. 28 shows an example flow diagram in accordance with several of various embodiments of the present disclosure.

FIG. 28 shows an example flow diagram in accordance with several of various embodiments of the present disclosure. At 2810, a wireless device may receive a first transport block (TB) and a second TB. A first hybrid automatic repeat request (HARQ) feedback, associated with the first TB, may be deferred from an initial timing to a first timing. A second HARQ feedback, associated with the second TB, may be scheduled for initial transmission in the first timing. At 2820, the wireless device may transmit, in the first timing, a HARQ feedback codebook comprising the first HARQ feedback and the second HARQ feedbacks. Based on the first HARQ feedback being deferred, a first position of the first HARQ feedback, in the HARQ feedback codebook, may be after a second position of the second HARQ feedback in the HARQ feedback codebook.

In an example embodiment, the first HARQ feedback may be deferred based on valid uplink control channel resources, for transmission of the first HARQ feedback, not being available in the initial timing.

In an example embodiment, the initial timing may comprise one or more downlink symbols.

In an example embodiment, the initial timing may comprise one or more flexible symbols.

In an example embodiment, the second HARQ feedback may not be deferred. The second HARQ feedback may be a non-deferred HARQ feedback.

In an example embodiment, the first HARQ feedback may be appended to the second HARQ feedback.

In an example embodiment, the first position may be after the second position further based on the second HARQ feedback being scheduled for initial transmission in the first timing.

Figure 29:
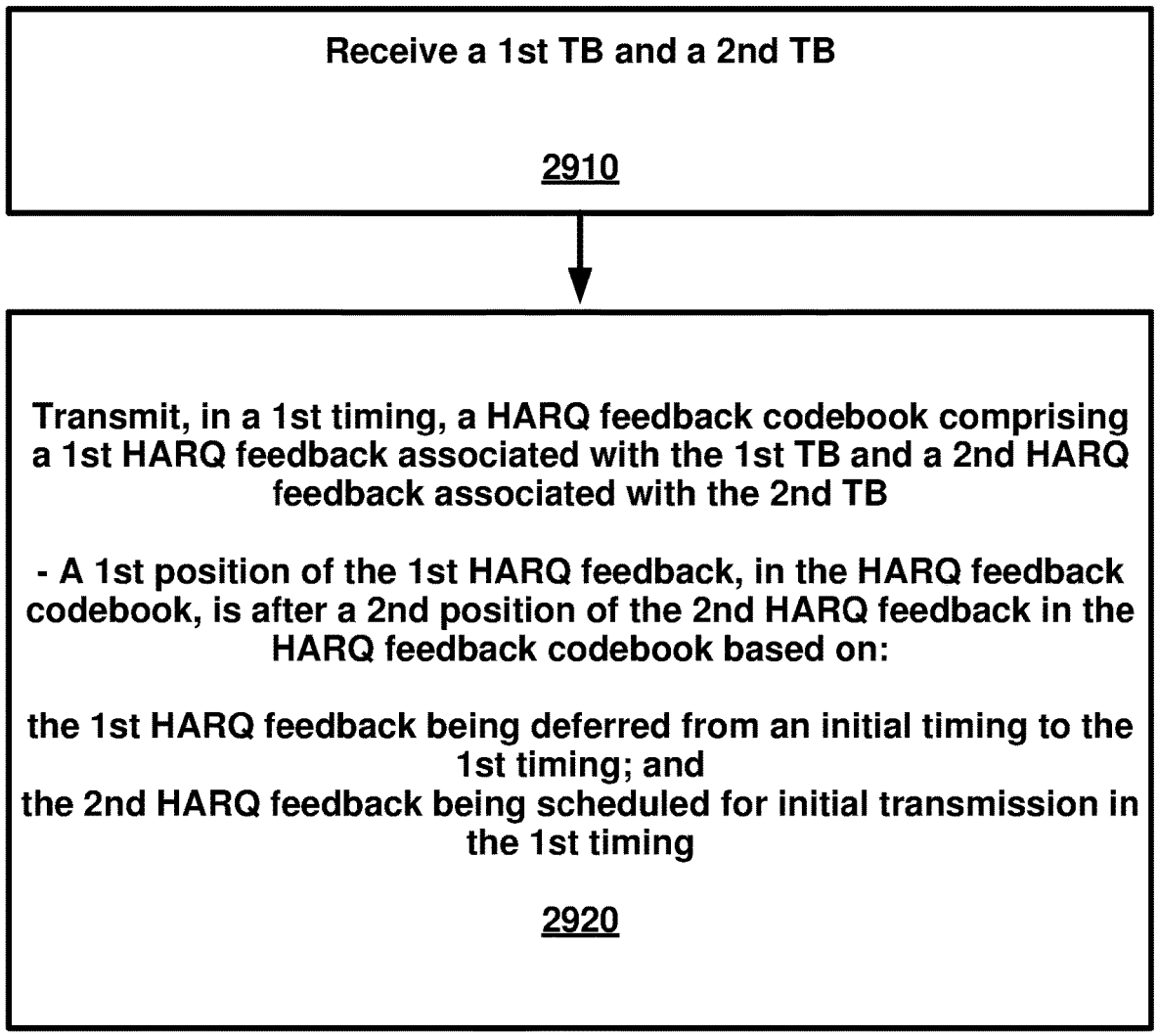
FIG. 29 shows an example flow diagram in accordance with several of various embodiments of the present disclosure.

FIG. 29 shows an example flow diagram in accordance with several of various embodiments of the present disclosure. At 2910, a wireless device may receive a first transport block (TB) and a second TB. At 2920, the wireless device may transmit in a first timing, a hybrid automatic repeat request (HARQ) feedback codebook comprising a first HARQ feedback associated with the first TB and a second HARQ feedback associated with the second TB. A first position of the first HARQ feedback, in the HARQ feedback codebook, may be after a second position of the second HARQ feedback in the HARQ feedback codebook based on: the first HARQ feedback being deferred from an initial timing to the first timing; and the second HARQ feedback being scheduled for initial transmission in the first timing.

Figure 30:
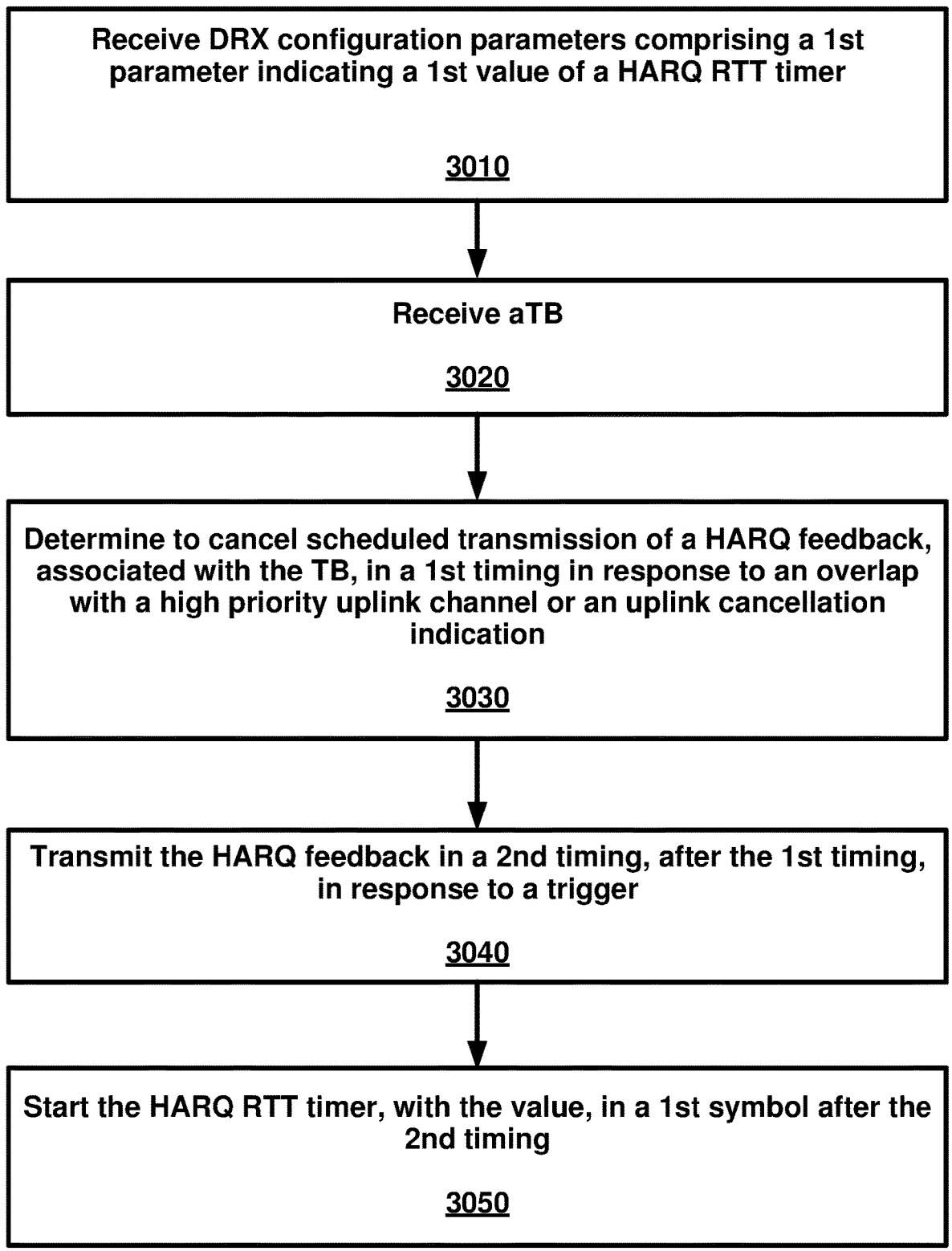
FIG. 30 shows an example flow diagram in accordance with several of various embodiments of the present disclosure.

FIG. 30 shows an example flow diagram in accordance with several of various embodiments of the present disclosure. At 3010, a wireless device may receive discontinuous reception (DRX) configuration parameters comprising a first parameter indicating a first value of a HARQ round trip time (RTT) timer. At 3020, the wireless device may receive a transport block (TB). At 3030, the wireless device may determine to cancel scheduled transmission of a HARQ feedback, associated with the TB, in a first timing in response to an overlap with a high priority uplink channel or an uplink cancellation indication. At 3040, the wireless device may transmit the HARQ feedback in a second timing, after the first timing, in response to a trigger. At 3050, the wireless device may start the HARQ RTT timer, with the value, in a first symbol after the second timing.

In an example embodiment, the DRX configuration parameters, received at 3010, may further comprise a second parameter indicating a second value of a DRX retransmission timer. In an example embodiment, the wireless device may start the DRX retransmission timer in response to expiry of the HARQ RTT timer. In an example embodiment, the wireless device may be in a DRX Active time while the DRX retransmission timer is running. In an example embodiment, the wireless device may monitor a control channel while the DRX retransmission timer is running. In an example embodiment, the wireless device may receive, based on the monitoring, downlink control information comprising a downlink assignment for retransmission of the TB. In an example embodiment, the wireless device may receive the retransmission of the TB based on the downlink assignment.

In an example embodiment, the determining, at 3030, to cancel the scheduled transmission of the HARQ feedback may be based on the first timing overlapping with a second timing of the high priority uplink channel.

In an example embodiment, the determining, at 3030, to cancel the scheduled transmission of the HARQ feedback may be based on the uplink cancellation indication indicating cancellation of an uplink channel scheduled to carry the HARQ feedback.

In an example embodiment, the wireless device may receive a downlink control information indicating the trigger. In an example embodiment, the downlink control information may comprise a field indicating the second timing.

Figure 31:
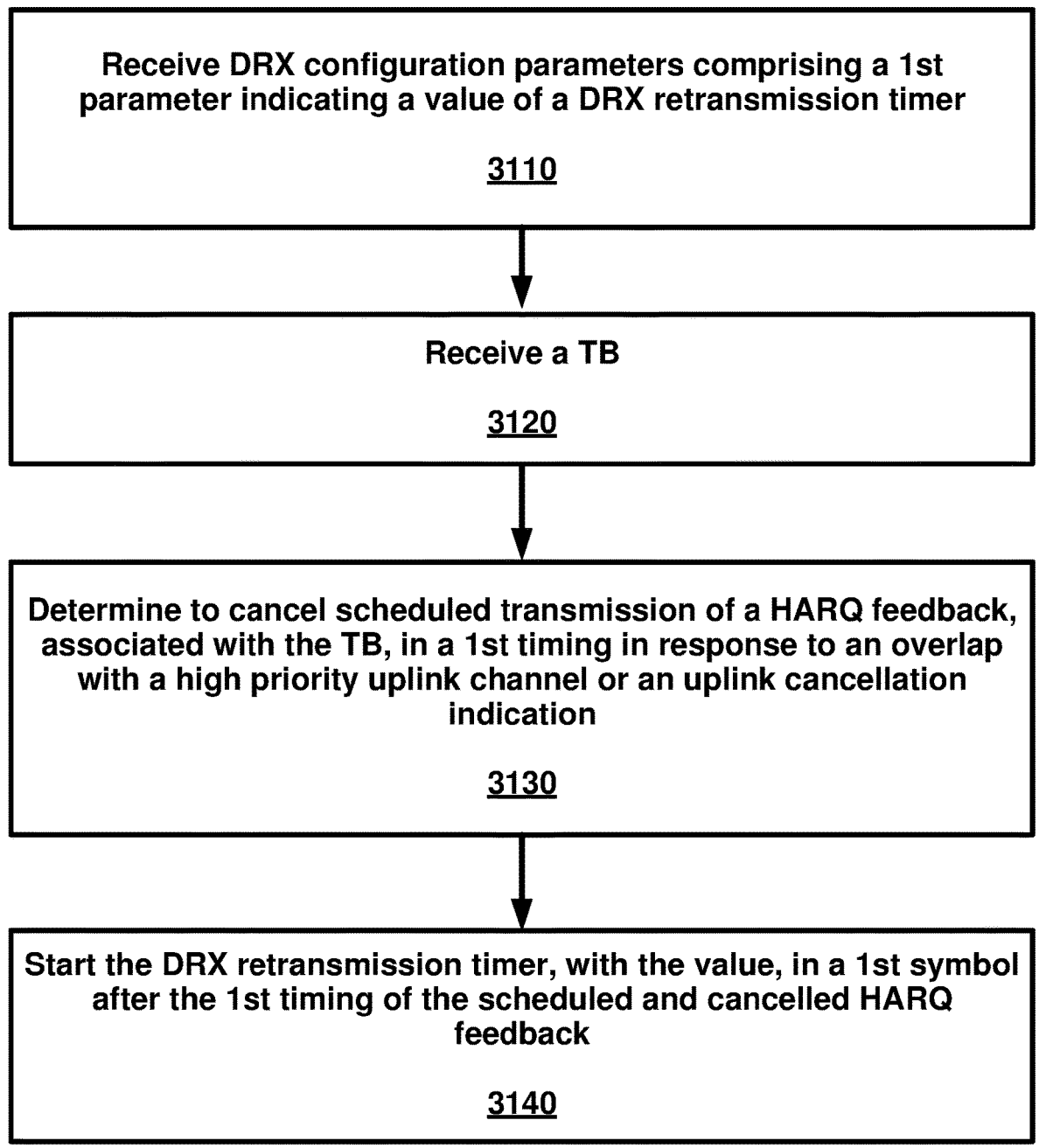
FIG. 31 shows an example flow diagram in accordance with several of various embodiments of the present disclosure.

FIG. 31 shows an example flow diagram in accordance with several of various embodiments of the present disclosure. At 3110, a wireless device may receive discontinuous reception (DRX) configuration parameters comprising a first parameter indicating a value of a DRX retransmission timer. At 3120, the wireless device may receive a transport block (TB). At 3130, the wireless device may determine to cancel scheduled transmission of a HARQ feedback, associated with the TB, in a first timing in response to an overlap with a high priority uplink channel or an uplink cancellation indication. At 3140, the wireless device may start the DRX retransmission timer, with the value, in a first symbol after the first timing of the scheduled and cancelled HARQ feedback.

In an example embodiment, the wireless device may be in a DRX Active time while the DRX retransmission timer is timer running.

In an example embodiment, the wireless device may monitor a control channel while the DRX retransmission timer is running. In an example embodiment, the wireless device may receive, based on the monitoring, downlink control information comprising a downlink assignment for retransmission of the TB. In an example embodiment, the wireless device may receive the retransmission of the TB based on the downlink assignment.

In an example embodiment, the determining, at 3130, to cancel the scheduled transmission of the HARQ feedback may be based on the first timing overlapping with a second timing of the high priority uplink channel.

In an example embodiment, the determining, at 3130, to cancel the scheduled transmission of the HARQ feedback may be based on the uplink cancellation indication indicating cancellation of an uplink channel scheduled to carry the HARQ feedback.

Figure 32:
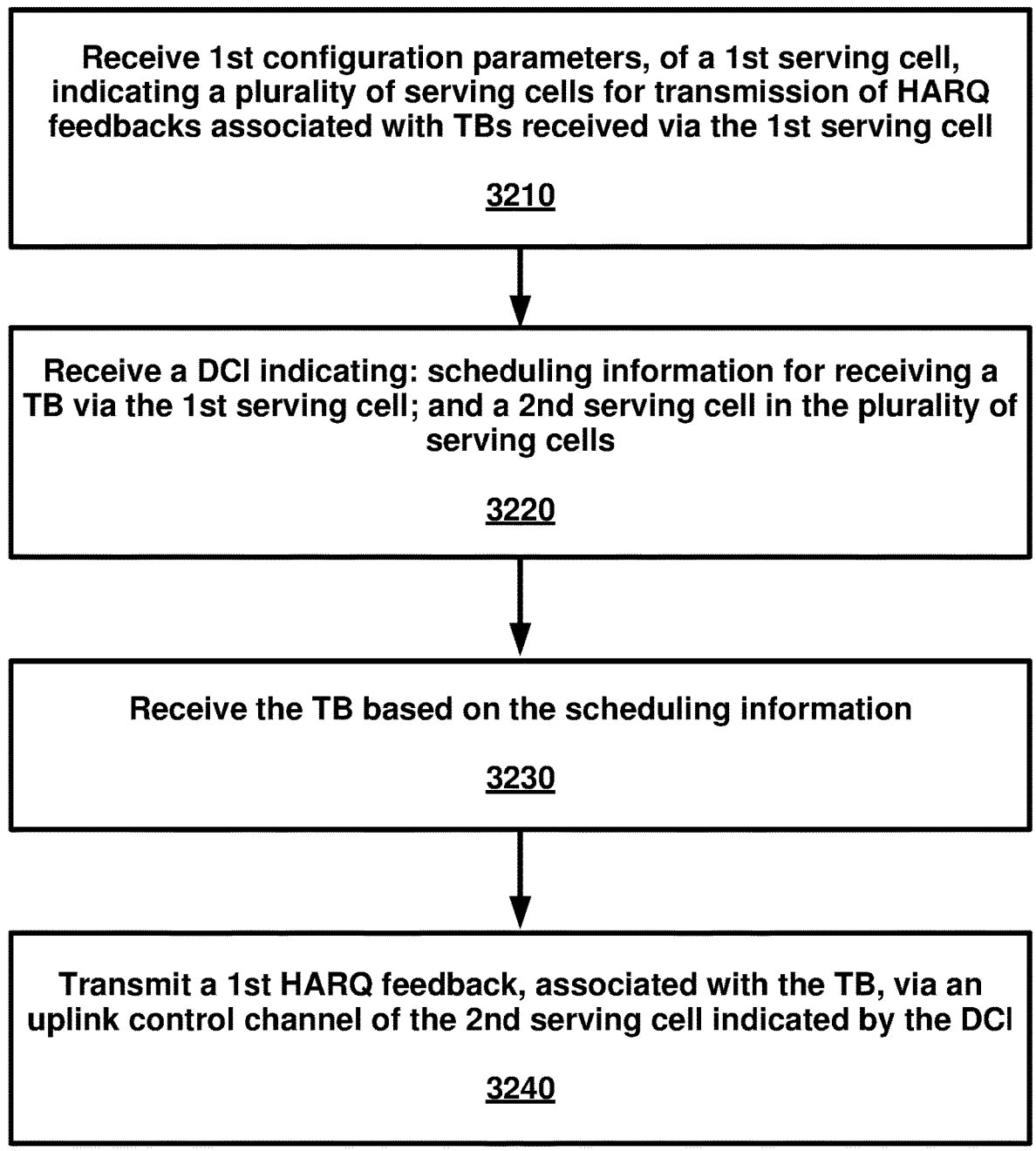
FIG. 32 shows an example flow diagram in accordance with several of various embodiments of the present disclosure.

FIG. 32 shows an example flow diagram in accordance with several of various embodiments of the present disclosure. At 3210, a wireless device may receive configuration parameters, of a first serving cell, indicating a plurality of serving cells for transmission of hybrid automatic repeat request (HARQ) feedbacks associated with transport blocks (TBs) received via the first serving cell. At 3220, the wireless device may receive a downlink control information (DCI) indicating: scheduling information for receiving a TB via the first serving cell; and a second serving cell, in the plurality of serving cells, for HARQ feedback transmission. At 3230, the wireless device may receive the TB based on the scheduling information. At 3240, the wireless device may transmit a first HARQ feedback, associated with the TB, via an uplink control channel of the second serving cell indicated by the DCI.

In an example embodiment, the DCI, received at 3220, may comprise a field with a value indicating the second serving cell.

In an example embodiment, the configuration parameters, received at 3210, may comprise a physical downlink shared channel serving cell configuration information element indicating the plurality of serving cells.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
receiving, by a wireless device and based on one or more downlink control information (DCIs), a first transport block (TB) and one or more second TBs;
determining, based on the one or more DCIs:
an initial timing of a first hybrid automatic repeat request (HARQ) feedback associated with the first TB; and
a first timing of one or more second HARQ feedbacks associated with the one or more second TB s;
determining to defer the first HARQ feedback from the initial timing to the first timing based on the initial timing overlapping with one or more downlink symbols;
transmitting, in the first timing, a HARQ feedback codebook comprising the first HARQ feedback and the one or more second HARQ feedbacks; and
wherein, based on the first HARQ feedback being deferred, a first position of the first HARQ feedback, in an ordered plurality of HARQ feedbacks within the HARQ feedback codebook, is after one or more second positions of the one or more second HARQ feedbacks.

2. The method of claim 1, wherein the determining to defer the first HARQ feedback is based on valid uplink control channel resources, for transmission of the first HARQ feedback, not being available in the initial timing.

3. The method of claim 2, wherein the first timing does not comprise a downlink symbol.

4. The method of claim 2, wherein the initial timing is further based on a timing of receiving the first TB.

5. The method of claim 2, wherein the one or more second HARQ feedbacks are not deferred.

6. The method of claim 1, further comprising determining, in response to determining to defer the first HARQ feedback, the first timing as an earliest timing, after the initial timing, that includes valid uplink control channel resources.

7. The method of claim 1, further comprising determining a first order of one or more first HARQ feedbacks in the HARQ feedback codebook, wherein the one or more first HARQ feedbacks are deferred from one or more initial timings to the first timing.

8. The method of claim 7, wherein one or more first positions, of the one or more first HARQ feedbacks in the HARQ feedback codebook, are based on the first order.

9. The method of claim 7, wherein:
the one or more first HARQ feedbacks are associated with one or more first TBs comprising the first TB; and
the determining the first order is based on:
one or more semi-persistent scheduling (SPS) configuration indexes associated with the one or more first TBs;
one or more cells that the one or more first TBs are received; and
one or more timings of the one or more first TBs.

10. The method of claim 9, wherein the one or more second HARQ feedback are not deferred.

11. The method of claim 9, wherein the one or more first HARQ feedbacks are appended to the one or more second HARQ feedbacks.

12. The method of claim 1, further comprising determining a second order of the one or more second HARQ feedbacks, wherein the one or more second positions are based on the second order.

13. The method of claim 12, wherein the second order is based on:
one or more cells that the one or more second TBs are received; and
one or more timings of the one or more second TBs.

14. The method of claim 13, wherein the one or more second HARQ feedback are not deferred.

15. The method of claim 13, wherein the first HARQ feedback is appended to the one or more second HARQ feedbacks.

16. The method of claim 13, wherein the second order is based on one or more semi-persistent scheduling (SPS) configuration indexes associated with the one or more second TBs.

17. The method of claim 1, wherein the one or more second HARQ feedback are not deferred.

18. The method of claim 1, wherein the first HARQ feedback is appended to the one or more second HARQ feedbacks.

19. The method of claim 1, wherein the first position is after the one or more second positions further based on the one or second HARQ feedbacks being scheduled for initial transmission in the first timing.

20. The method of claim 19, wherein the first HARQ feedback is appended to the one or more second HARQ feedbacks.

21. A wireless device comprising:
one or more processors; and
memory storing instructions that, when executed by the one or more processors, cause the wireless device to:
receive, based on one or more downlink control information (DCIs), a first transport block (TB) and one or more second TBs;
determine, based on the one or more DCIs:
an initial timing of a first hybrid automatic repeat request (HARQ) feedback associated with the first TB; and
a first timing of one or more second HARQ feedbacks associated with the one or more second TBs;
determine to defer the first HARQ feedback from the initial timing to the first timing based on the initial timing overlapping with one or more downlink symbols;
transmit, in the first timing, a HARQ feedback codebook comprising the first HARQ feedback and the one or more second HARQ feedbacks; and
wherein, based on the first HARQ feedback being deferred, a first position of the first HARQ feedback, in an ordered plurality of HARQ feedbacks within the HARQ feedback codebook, is after one or more second positions of the one or more second HARQ feedbacks.

22. The wireless device of claim 21, wherein determining to defer the first HARQ feedback is based on valid uplink control channel resources, for transmission of the first HARQ feedback, not being available in the initial timing.

23. The wireless device of claim 22, wherein the first timing does not comprise a downlink symbol.

24. The wireless device of claim 21, wherein the instructions, when executed by the one or more processors, further cause the wireless device to determine, in response to determining to defer the first HARQ feedback, the first timing as an earliest timing, after the initial timing, that includes valid uplink control channel resources.

25. The wireless device of claim 21, wherein the instructions, when executed by the one or more processors, further cause the wireless device to determine a first order of one or more first HARQ feedbacks in the HARQ feedback codebook, wherein the one or more first HARQ feedbacks are deferred from one or more initial timings to the first timing.

26. The wireless device of claim 25, wherein one or more first positions, of the one or more first HARQ feedbacks in the HARQ feedback codebook, are based on the first order.

27. The wireless device of claim 25, wherein:
the one or more first HARQ feedbacks are associated with one or more first TBs comprising the first TB; and
the determining the first order is based on:
one or more semi-persistent scheduling (SPS) configuration indexes associated with the one or more first TBs;
one or more cells that the one or more first TBs are received; and
one or more timings of the one or more first TBs.

28. The wireless device of claim 21, wherein the instructions, when executed by the one or more processors, further cause the wireless device to determine a second order of the one or more second HARQ feedbacks, wherein the one or more second positions are based on the second order.

29. The wireless device of claim 28, wherein the second order is based on:
one or more cells that the one or more second TBs are received; and
one or more timings of the one or more second TBs.

30. The wireless device of claim 29, wherein the second order is based on one or more semi-persistent scheduling (SPS) configuration indexes associated with the one or more second TBs.

31. The wireless device of claim 21, wherein the one or more second HARQ feedback are not deferred.

32. The wireless device of claim 21, wherein the first HARQ feedback is appended to the one or more second HARQ feedbacks.

33. The wireless device of claim 21, wherein the first position is after the one or more second positions further based on the one or second HARQ feedbacks being scheduled for initial transmission in the first timing.

34. A system comprising:
a base station; and
a wireless device comprising: one or more processors; and memory storing instructions that, when executed by the one or more processors, cause the wireless device to: receive, from the base station and based on one or more downlink control information (DCIs), a first transport block (TB) and one or more second TBs; determine, based on the one or more DCIs: an initial timing of a first hybrid automatic repeat request (HARQ) feedback associated with the first TB; and a first timing of one or more second HARQ feedbacks associated with the one or more second TBs; determine to defer the first HARQ feedback from the initial timing to the first timing based on the initial timing overlapping with one or more downlink symbols; transmit, in the first timing, a HARQ feedback codebook comprising the first HARQ feedback and the one or more second HARQ feedbacks; and wherein, based on the first HARQ feedback being deferred, a first position of the first HARQ feedback, in an ordered plurality of HARQ feedbacks within the HARQ feedback codebook, is after one or more second positions of the one or more second HARQ feedbacks.

* * * * *